United States Patent
Laroia et al.

(10) Patent No.: US 9,510,359 B2
(45) Date of Patent: **\*Nov. 29, 2016**

(54) METHODS AND APPARATUS FOR USE IN PEER TO PEER COMMUNICATIONS DEVICES AND/OR SYSTEMS RELATING TO RATE SCHEDULING, TRAFFIC SCHEDULING, RATE CONTROL, AND/OR POWER CONTROL

(71) Applicant: QUALCOMM Incorporated, San Diego, CA (US)

(72) Inventors: Rajiv Laroia, Far Hills, NJ (US); Junyi Li, Chester, NJ (US); Thomas Richardson, South Orange, NJ (US); Xinzhou Wu, San Diego, CA (US); Aleksandar Jovicic, Jersey City, NJ (US)

(73) Assignee: QUALCOMM Incorporated, San Diego, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 15/013,895

(22) Filed: Feb. 2, 2016

(65) Prior Publication Data

US 2016/0157260 A1 Jun. 2, 2016

Related U.S. Application Data

(60) Continuation of application No. 14/518,692, filed on Oct. 20, 2014, now Pat. No. 9,258,788, which is a division of application No. 13/250,930, filed on Sep. 30, 2011, now Pat. No. 8,902,771, which is a division of application No. 11/930,121, filed on Oct. 31, 2007, now Pat. No. 8,041,375.

(51) Int. Cl.
*H04W 4/00* (2009.01)
*H04W 72/12* (2009.01)
(Continued)

(52) U.S. Cl.
CPC ......... *H04W 72/1242* (2013.01); *H04W 28/22* (2013.01); *H04W 52/18* (2013.01);
(Continued)

(58) Field of Classification Search
None
See application file for complete search history.

(56) References Cited

U.S. PATENT DOCUMENTS

| 5,241,542 A | 8/1993 | Natarajan et al. |
| 5,721,725 A | 2/1998 | Want et al. |

(Continued)

FOREIGN PATENT DOCUMENTS

| CN | 1735224 A | 2/2006 |
| EP | 1172930 A1 | 1/2002 |

(Continued)

OTHER PUBLICATIONS

Cesana M., et al., "Interference Aware (IA) MAC : an Enhancement to IEEE802.11b DCF",VTC2003-Fall,Oct. 9, 2003.

(Continued)

*Primary Examiner* — Kibrom T Hailu
(74) *Attorney, Agent, or Firm* — James K. O'Hare

(57) ABSTRACT

Methods and apparatus related to peer to peer communication networks are described. Embodiments directed to methods and apparatus for establishing traffic data transmission rates and/or transmission power levels between wireless terminals is described. Embodiments direct to methods and apparatus of making decisions whether or not to transmit as a function of the received power of the received response signals are also described. Transmission of pilot signals after granting of a transmission request and a decision to transmit traffic data has been made occurs in some embodiments. Rate information to be used in determining a traffic rate may be received in response to the pilot signal from a peer to peer (P2P) device.

19 Claims, 26 Drawing Sheets

(51) Int. Cl.
*H04W 28/22* (2009.01)
*H04W 52/26* (2009.01)
*H04W 72/04* (2009.01)
*H04W 76/02* (2009.01)
*H04W 52/18* (2009.01)
*H04W 48/08* (2009.01)
*H04W 52/16* (2009.01)
*H04W 92/18* (2009.01)

(52) U.S. Cl.
CPC ....... *H04W52/267* (2013.01); *H04W 72/0473* (2013.01); *H04W 76/023* (2013.01); *H04W 48/08* (2013.01); *H04W 52/16* (2013.01); *H04W 72/12* (2013.01); *H04W 92/18* (2013.01)

(56) References Cited

U.S. PATENT DOCUMENTS

| | | | |
|---|---|---|---|
| 6,366,572 B1 | 4/2002 | Esterberg et al. | |
| 6,556,582 B1* | 4/2003 | Redi | H04W 74/0816 370/443 |
| 6,636,744 B1 | 10/2003 | Da | |
| 7,257,094 B2 | 8/2007 | Shoemake | |
| 7,317,682 B2 | 1/2008 | Gu et al. | |
| 7,463,644 B2 | 12/2008 | Zhu et al. | |
| 7,539,507 B2 | 5/2009 | Grob et al. | |
| 7,626,966 B1* | 12/2009 | Ruiter | H04M 1/725 370/310 |
| 7,636,343 B2 | 12/2009 | Mizukoshi | |
| 8,041,375 B2 | 10/2011 | Laroia et al. | |
| 8,125,961 B2 | 2/2012 | Agrawal et al. | |
| 8,902,771 B2 | 12/2014 | Laroia et al. | |
| 2002/0136274 A1 | 9/2002 | Proctor et al. | |
| 2003/0134654 A1* | 7/2003 | Masuda | H04W 52/40 455/522 |
| 2005/0052995 A1 | 3/2005 | Gu et al. | |
| 2005/0105490 A1* | 5/2005 | Lee | H04L 12/5695 370/331 |
| 2005/0129051 A1 | 6/2005 | Zhu et al. | |
| 2005/0201351 A1 | 9/2005 | Nakao | |
| 2005/0239451 A1 | 10/2005 | Periyalwar et al. | |
| 2006/0018284 A1 | 1/2006 | Rudolf et al. | |
| 2006/0040675 A1 | 2/2006 | Halfmann et al. | |
| 2006/0050742 A1 | 3/2006 | Grandhi et al. | |
| 2006/0165035 A1 | 7/2006 | Chandra et al. | |
| 2006/0165036 A1 | 7/2006 | Chandra et al. | |
| 2006/0203772 A1 | 9/2006 | Laroia et al. | |
| 2007/0105574 A1 | 5/2007 | Gupta et al. | |
| 2007/0111744 A1 | 5/2007 | Kondo | |
| 2007/0133499 A1* | 6/2007 | Wang | H04W 52/322 370/345 |
| 2007/0147332 A1 | 6/2007 | Lappetelainen et al. | |
| 2007/0223406 A1 | 9/2007 | Li et al. | |
| 2007/0242621 A1 | 10/2007 | Nandagopalan et al. | |
| 2008/0005487 A1* | 1/2008 | Hum | G06F 12/0831 711/146 |
| 2008/0225991 A1 | 9/2008 | Proctor et al. | |
| 2009/0017850 A1 | 1/2009 | Jovicic et al. | |
| 2009/0019113 A1 | 1/2009 | Wu et al. | |
| 2009/0109851 A1 | 4/2009 | Li et al. | |
| 2009/0109949 A1 | 4/2009 | Wu et al. | |
| 2009/0109950 A1 | 4/2009 | Richardson et al. | |
| 2009/0296669 A1 | 12/2009 | Uchiyama et al. | |
| 2010/0074105 A1 | 3/2010 | Periyalwar et al. | |
| 2012/0020234 A1 | 1/2012 | Laroia et al. | |
| 2015/0036577 A1 | 2/2015 | Laroia et al. | |

FOREIGN PATENT DOCUMENTS

| | | |
|---|---|---|
| EP | 1432177 A2 | 6/2004 |
| GB | 2285724 A | 7/1995 |
| JP | 8037528 A | 2/1996 |
| JP | 2003258697 A | 9/2003 |
| JP | 2006101400 A | 4/2006 |
| JP | 2006295328 A | 10/2006 |
| JP | 2007067472 A | 3/2007 |
| JP | 2007166373 A | 6/2007 |
| JP | 2009514439 A | 4/2009 |
| JP | 2009533976 A | 9/2009 |
| TW | 200705892 | 2/2007 |
| WO | WO-2005029731 A1 | 3/2005 |
| WO | WO-2005034433 A1 | 4/2005 |
| WO | WO-2005053253 | 6/2005 |
| WO | WO-2006016331 A1 | 2/2006 |
| WO | WO-2006132328 A1 | 12/2006 |
| WO | WO-2007051130 | 5/2007 |
| WO | WO-2007066741 A1 | 6/2007 |
| WO | WO-2007107895 A1 | 9/2007 |
| WO | WO-2007121340 A1 | 10/2007 |

OTHER PUBLICATIONS

Daji Qiao, et al., "Adaptive transmit power control in IEEE 802.11a wireless LANs" 20030422 ; 20030422-20030425, vol. 1, Apr. 22, 2003 (Apr. 22, 2003), pp. 433-437. XP010862163.

Danguen Seong, EE520 Telecommunication Networks, Communication Networks Research Lab., 2000.

Dridi S., et al., "Coupling Latency Time to the Throughput Performance Analysis on Wireless Can Networks", Computing in the Global Information Technology, 2006. ICCGI '06. International Multi-Conference on, 20060801, IEEE, XP031056491, Pi—ISBN 978-0-7695-26904; ISBN 0-7695-2690-X.

International Search Report and Written Opinion—PCT/US2007/083383, International Search Authority—European Patent Office—Aug. 25, 2008.

International Search Report and Written Opinion—PCT/US2007/083385—ISA/EPO—Aug. 7, 2008.

International Search Report and Written Opinion—PCT/US2007/083387—ISA/EPO—Aug. 25, 2008.

Park M., et al., "Wireless channel-aware ad hoc cross-layer protocol with multi-route path selection diversity", Vehicular Technology Conference, IEEE, Oct. 6, 2003, XP010701540, vol. 4, pp. 2197-2201.

Taiwan Search Report—TW097142227—TIPO—Feb. 24, 2012.
Taiwan Search Report—TW097142235—TIPO—Oct. 27, 2012.

* cited by examiner

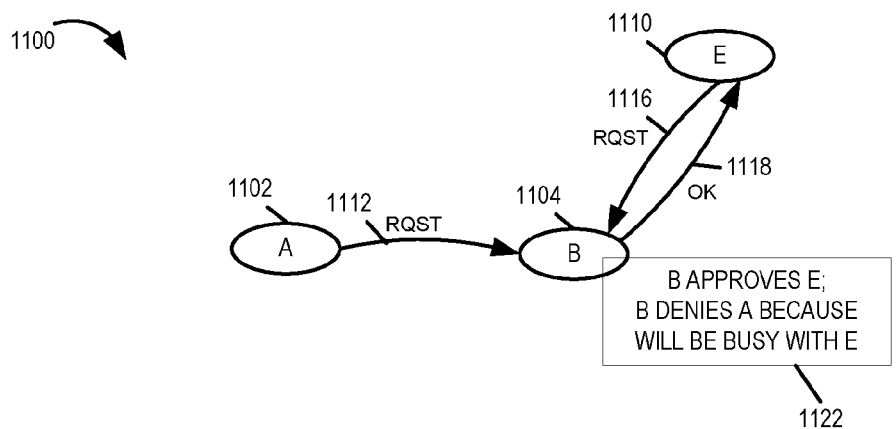
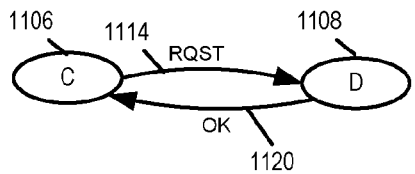
FIGURE 9
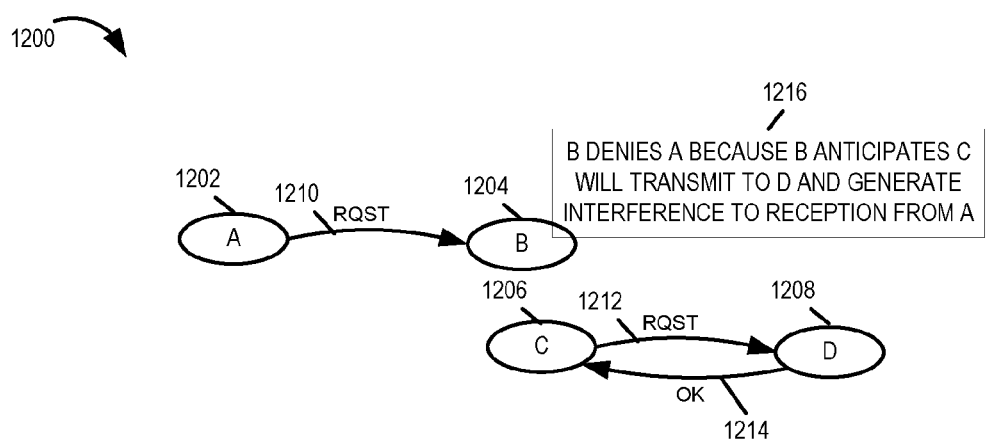
FIGURE 10

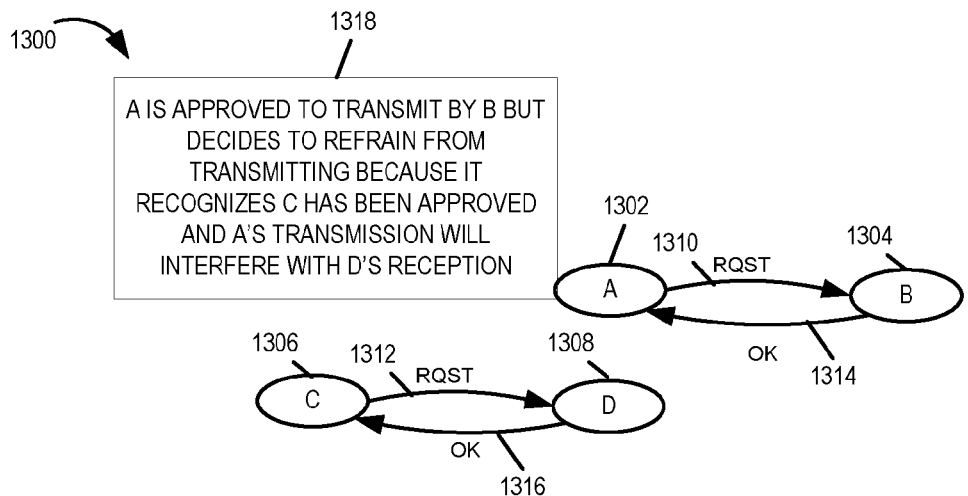
FIGURE 11
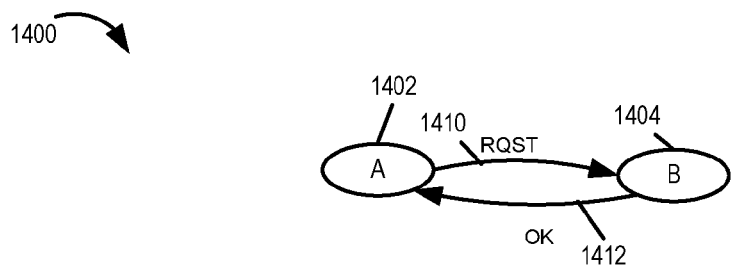
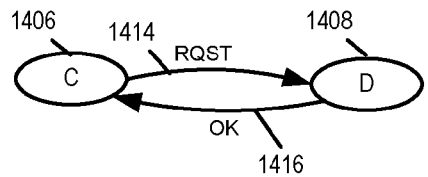
FIGURE 12

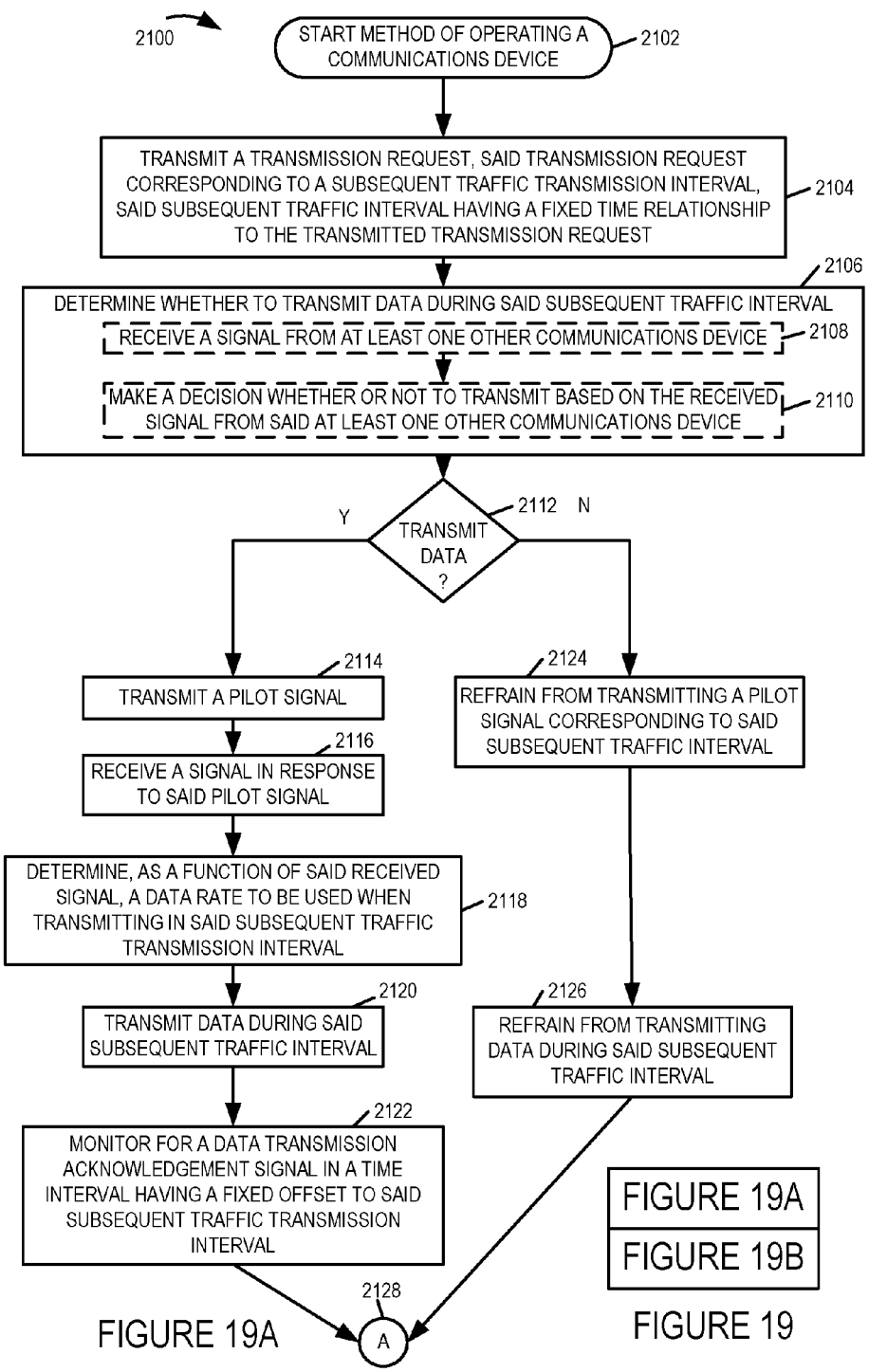

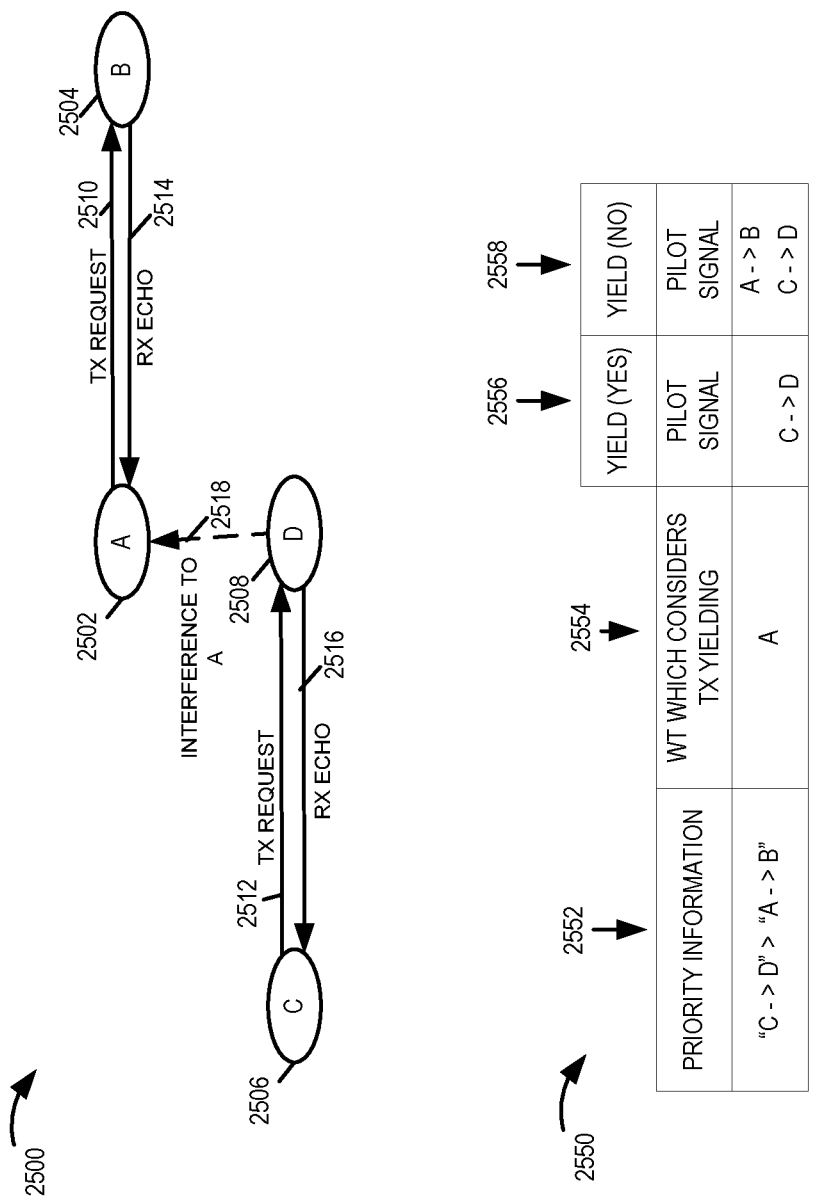

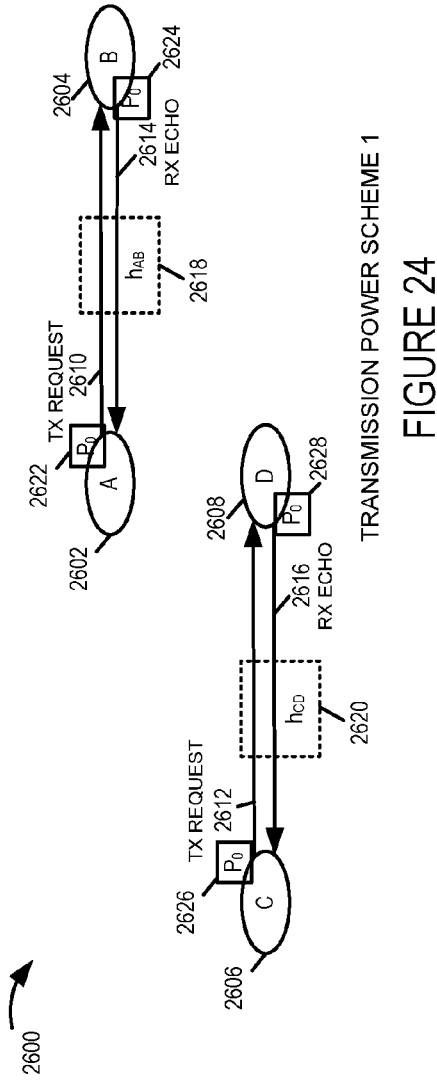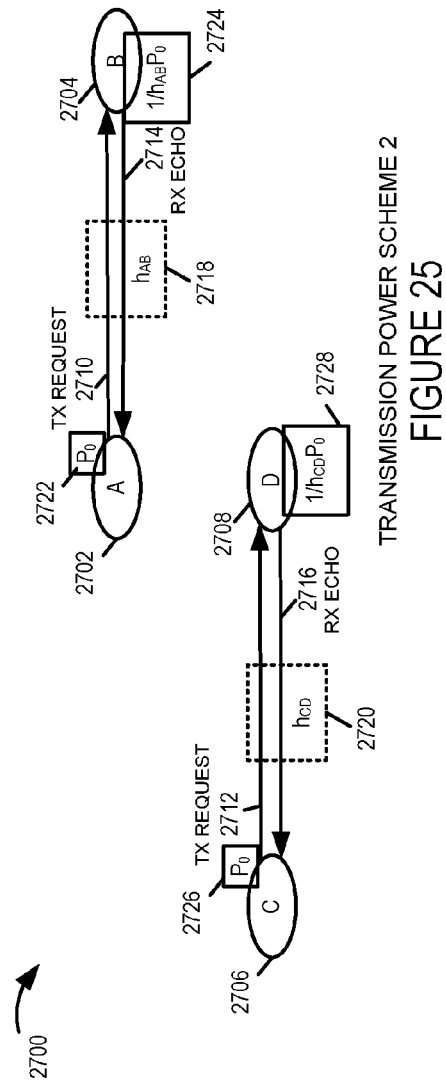

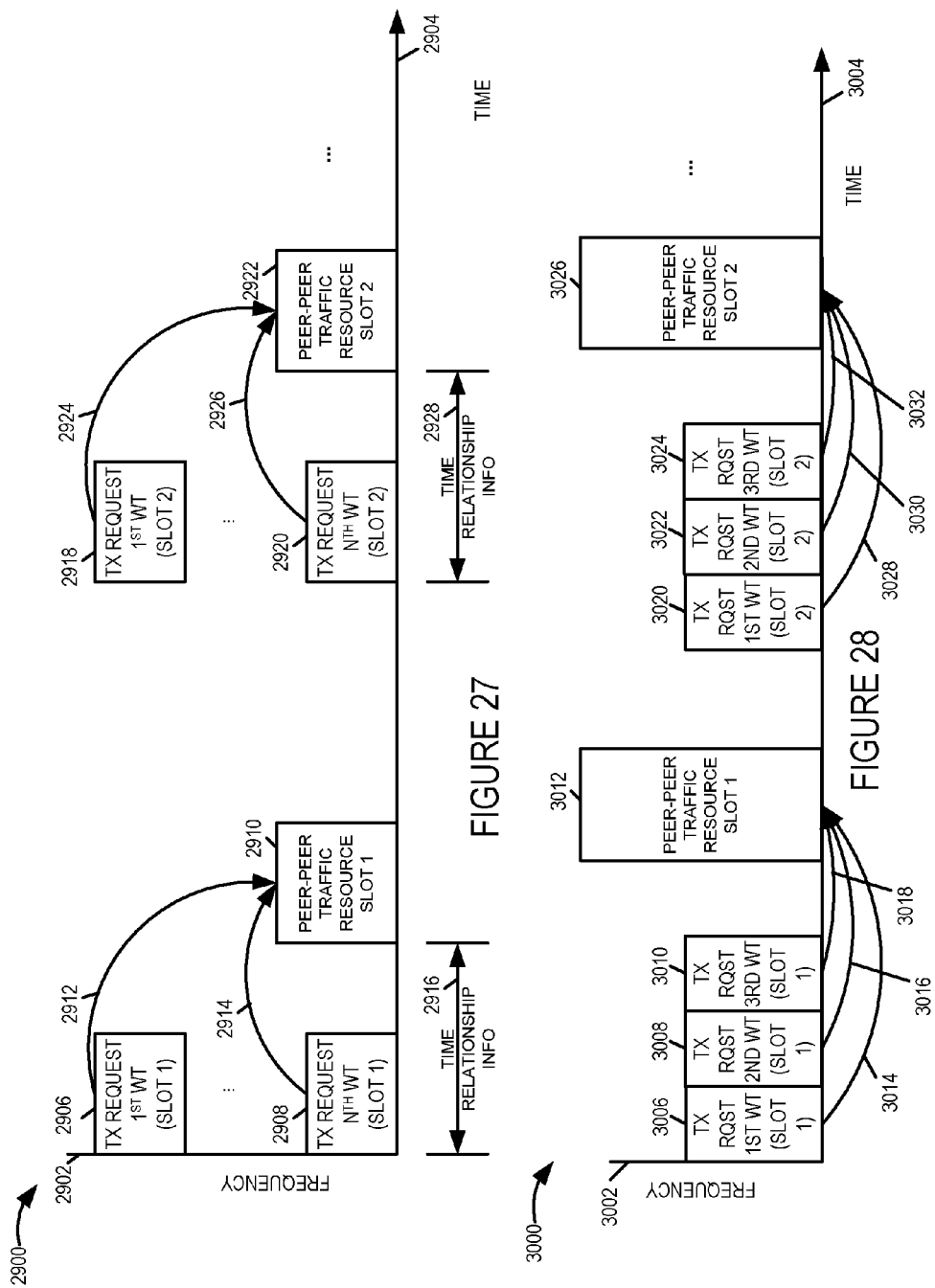

METHODS AND APPARATUS FOR USE IN PEER TO PEER COMMUNICATIONS DEVICES AND/OR SYSTEMS RELATING TO RATE SCHEDULING, TRAFFIC SCHEDULING, RATE CONTROL, AND/OR POWER CONTROL

CROSS REFERENCE TO RELATED APPLICATIONS

This application is a continuation of U.S. application Ser. No. 14/518,692 filed on Oct. 20, 2014 for METHODS AND APPARATUS FOR USE IN PEER TO PEER COMMUNICATIONS DEVICES AND/OR SYSTEMS RELATING TO RATE SCHEDULING, TRAFFIC SCHEDULING, RATE CONTROL, AND/OR POWER which is a division of U.S. application Ser. No. 13/250,930 now U.S. Pat. No. 8,902,771 filed on Sep. 30, 2011 for METHODS AND APPARATUS FOR USE IN PEER TO PEER COMMUNICATIONS DEVICES AND/OR SYSTEMS RELATING TO RATE SCHEDULING, TRAFFIC SCHEDULING, RATE CONTROL, AND/OR POWER CONTROL which is a division of U.S. application Ser. No. 11/930,121 now U.S. Pat. No. 8,041,375 filed on Oct. 31, 2007 for "METHODS AND APPARATUS FOR USE IN PEER TO PEER COMMUNICATIONS DEVICES AND/OR SYSTEMS RELATING TO RATE SCHEDULING, TRAFFIC SCHEDULING, RATE CONTROL, AND/OR POWER CONTROL" all of which is hereby incorporated by reference in its entirety

FIELD

Various embodiments are directed to methods and apparatus for wireless communication and, more particularly, to methods and apparatus for use in peer to peer wireless communication.

BACKGROUND

In a cellular communications network, in which wireless terminals communicate via a base station attachment point, typically a centralized control node or base station node schedules competing users, e.g., wireless terminals, to use available traffic air link resources and/or manages interference in the system. However, in a deployment scenario in which a centralized node and/or base station is no longer in control, such as a peer to peer communications system, the problems of efficient management of traffic air link resources and interference control become more complex.

Accordingly, there is a need for methods and/or apparatus for adjusting traffic data rate and/or traffic data power levels to support efficient use of air link resources. It would be advantageous if at least some methods and apparatus for use in peer to peer communications systems could be provided for adjusting traffic data rate and/or traffic data signal power levels to efficiently utilize air link resources. It would also be beneficial if traffic data rate control and/or traffic data signal power control could be implemented on a slot to slot basis, in systems which support time slots, thus allowing rapid adjustment to changing conditions in the system.

There is also a need for methods and/or apparatus for identifying and/or estimating interference impacts between wireless communications devices corresponding to different connections which would like to use the same shared air link resources and/or making transmission decisions based on such identified or estimated information. Methods and/or apparatus that provide for opportunities at an intended receiver device and/or an intended transmitter device to veto a transmission request would be beneficial.

Methods and apparatus that structure a peer to peer communications system such that a peer to peer communications device can take into consideration interference to/from other users would be advantageous. There is also a need for methods and/or apparatus which link scheduling and data rate control to a corresponding traffic transmission interval. Such linkage would facilitate a peer to peer device to identify and evaluate operations of other devices seeking and/or intending to use the same traffic resource.

SUMMARY

Methods and apparatus related to peer to peer communication networks are described. Various features are directed to data rate determination and/or power control for peer to peer communications, e.g., of peer to peer traffic signals on an individual slot by slot basis. In various embodiments, once a decision has been made for a first peer to peer wireless terminal to transmit traffic signals to a second peer to peer wireless terminal using a particular peer to peer traffic air link resource, the first and second wireless terminal exchange control signaling used in determining traffic data rate and/or traffic signal power levels. The control signaling includes a peer to peer pilot signal and a corresponding rate information signal.

In one but not necessarily all exemplary embodiments, a first peer to peer wireless communications device, having determined to transmit traffic data signals to a second peer to peer wireless communications device, transmits a pilot signal to the second device. Subsequently the first device receives, in response, a corresponding rate information signal from the second device. The first device transmits traffic data to the second communications device at a rate and/or power level determined based on the received rate information signal.

From the perspective of the second peer to peer communications device, the second device, which anticipates to subsequently receive traffic signals from the first device monitors for and receives the pilot signal from the first device. The second device may also receive additional pilot signals from other peer to peer devices which intend to transmit traffic using the same air link peer to peer traffic resource. The second peer to peer wireless communications device performs a rate determination as a function of the received pilot signal or signals. The second peer to peer communications device generates a rate information signal providing information to be used by the first communications device in determining a maximum permitted data traffic transmission rate, and transmits the generated rate information signal to the first communications device.

Thus both the first and second peer to peer communications devices, e.g., intended transmitter device and intended receiver device of the traffic signals, can, and sometimes do, have an input into the determination of the data rate and/or power level of peer to peer traffic signals, thus providing interference management and efficient use of air link resources. In addition, utilizing an individual peer to peer pilot signal and individual data rate and/or power level determination corresponding to an intended individual traffic segment facilitates rapid adjustment to changing conditions in the system thus facilitating efficient use of air link resources.

An exemplary method of operating a first mobile communications device to perform peer to peer communications in accordance with various embodiments comprises: transmitting a pilot signal to a second mobile communications device and receiving a rate information signal from the second mobile communications device providing information to be used in determining a maximum permitted data traffic transmission data rate. The exemplary method further comprises transmitting traffic data to said second mobile communications device at a rate determined based on the received rate information signal. An exemplary first mobile communications device supporting peer to peer communications comprises: a pilot signal generation module for generating a peer to peer pilot signal; a wireless transmitter module for transmitting said generated pilot signal to a second mobile communications device and for transmitting traffic data to said second mobile communications device at a rate determined based on a received rate information signal; and a wireless receiver module for receiving said a rate information signal from the second mobile communications device providing information to be used in determining a maximum permitted data traffic transmission data rate.

An exemplary method of operating a second mobile communications device to perform peer to peer communications comprises: receiving a pilot signal from a first mobile communications device; transmitting a rate information signal to the first mobile communications device providing information to be used by the first mobile communication device in determining a maximum permitted data traffic transmission data rate; and receiving traffic data from the first mobile communications device. An exemplary second mobile communications device supporting peer to peer communications comprises: a wireless receiver module for receiving a pilot signal from a first mobile communications device and for receiving traffic data from the first mobile communications device; and a wireless transmitter module for transmitting a rate information signal to the first mobile communications device providing information to be used by the first mobile communication device in determining a maximum permitted data traffic transmission data rate.

Additional exemplary methods and apparatus related to peer to peer communication networks are also described. A first peer to peer wireless communications device, having previously transmitted a request to a second peer to peer device to transmit traffic data using a corresponding air link resource, monitors during a corresponding monitoring period for a response, e.g., a transmit authorization, from the second device and for responses from other devices. The first device makes a decision whether or not to transmit as a function of the received power of the received response signals. At times, the first device, although authorized to transmit by the second device decides not to transmit and yields the traffic air link resource such as to reduce interference to other peer to peer wireless communications in the vicinity which intend to communicate using the same traffic air link resource.

An exemplary second peer to peer wireless communications device monitors during a monitoring period to receive transmission requests from a first peer to peer communications device, with which the second device has an active connection, and from other peer to peer communications devices, the requests corresponding to a traffic air link resource. Power levels of received request signal(s) are determined. When a request to transmit to the second device and a request to transmit to a third device is received, the second device makes a decision whether to accept the request to transmit to the second device as a function of the power measurements. At times, the second communications device makes a decision not to authorize the request to transmit to second device, e.g., in anticipation of significant interference due to peer to peer communications including the third communications device, and/or in order to reduce interference to other peer to peer communications. Thus, at times, the second communications device, an intended receiver of traffic signals, yields a traffic air link resource.

In various embodiments, corresponding to a peer to peer traffic air link resource, e.g., a peer to peer traffic segment, both the intended transmission device and the intended receiving device have an opportunity to yield the traffic air link resource and deny authorization to transmit. Thus interference considerations at both the transmit end and receive end are taken into consideration, facilitating efficient use of peer to peer traffic air link resources.

An exemplary method of operating a first communications device comprises: monitoring to receive transmission request responses during a monitoring period; determining if a response to a transmission request from the first communications device was received; determining whether a response to a transmission request from a second communications device was received; and when it is determined that a response to a transmission request from the first communications device was received and it is also determined that a response to a transmission request from the second communications device was received, making a decision whether or not to transmit as a function of the received power of the response to the transmission request from the second communications device and, optionally, the transmission power that the first communications device intends to use for its transmission. An exemplary first wireless communications device supporting peer to peer communications comprises: a monitoring module for monitoring to receive transmission request responses during a monitoring period; and a transmission request response module for determining if a response to a transmission request from the first communications device was received and for determining whether a response to a transmission request from a second communications device was received. The first wireless communications device further comprises a transmission decision module for making a decision whether or not to transmit as a function of the received power of the response to the transmission request from the second communications device when it is determined that a response to a transmission request from the first communications device was received and it is also determined that a response to a transmission request from the second communications device was received.

An exemplary method of operating a second communications device comprises: monitoring to receive transmission requests during a monitoring period; if a request to transmit to the second device is received during said monitoring period, determining the power of said received request to transmit to the second device; and if a request to transmit to a third device is received during said monitoring period, determining the power of said received request to transmit to the third device; and when a request to transmit to the second device and request to transmit to the third device has been received, making a decision whether to accept the request to transmit to the second device as a function of the determined power of the received request to transmit to the second device and the determined power of the received request to transmit to the third device. An exemplary second communications device supporting peer to peer communications comprises: a monitoring module for monitoring to receive transmission requests during a monitoring period; a power measurement module for determining the power of a received request to transmit to the second device if a request to transmit to the second device is received during said monitoring period and for determining the power of a received request to transmit to the a third device if a request to transmit to the third device is received during said monitoring period; and a transmission decision module for making a decision whether to accept the request to transmit to the second device as a function of the determined power of the received request to transmit to the second device and the determined power of the received request to transmit to the third device when a request to transmit to the second device and a request to transmit to the third device has been received.

More exemplary methods and apparatus related to peer to peer communication networks are described. A peer to peer traffic transmission request is linked to a subsequent traffic transmission interval having a fixed relationship to the transmitted transmission request. In various embodiments, when a first peer to peer device, which has requested a second device for authorization to use a linked subsequent traffic transmission interval, has been granted its request and has decided to transmit traffic during the subsequent traffic interval, the first and second devices exchange control signaling used in determining the data rate and/or power level of the traffic signals to be communicated. The first device transmits a peer to peer pilot and receives a corresponding rate information signal, prior to transmitting the traffic signal. In some embodiments, the transmitted pilot signal and the received rate information signal are communicated using corresponding air link resources associated with the traffic interval.

An exemplary method of operating a communications device, in some embodiments, comprises: transmitting a transmission request, said transmission request corresponding to a subsequent traffic transmission interval, said subsequent traffic transmission interval having a fixed time relationship to the transmitted transmission request; determining whether to transmit data during said subsequent traffic transmission interval; and when it is determined to transmit traffic data during said subsequent traffic transmission interval, transmitting data. An exemplary communications device, in various embodiments, comprises: a transmission request generation module for generating a transmission request, said transmission request corresponding to a subsequent traffic transmission interval, said subsequent traffic transmission interval having a fixed time relationship to the transmitted transmission request; a transmission decision module for determining whether to transmit data during said subsequent traffic transmission interval; and a wireless transmitter module for transmitting said generated transmission request and for transmitting data when said transmission decision module determines to transmit traffic data during said subsequent traffic transmission interval.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE FIGURES

FIG. 9 is a drawing of an exemplary peer to peer communications system illustrating a case where a peer to peer wireless communications device denies a request for traffic resources because it expects to be occupied communicating with another peer to peer communications device during the traffic portion of the traffic slot.

FIG. 10 is a drawing of an exemplary peer to peer communications system illustrating a case where a peer to peer wireless communications device denies a request for traffic resources because it anticipates another peer to peer device in its vicinity will be transmitting during the traffic portion of the traffic slot and would create too much interference to allow for successful recovery of signals from the requesting device.

FIG. 11 is a drawing of an exemplary peer to peer communications system illustrating a case where a peer to peer wireless communications device, which has been approved to transmit traffic signals, but refrains from transmitting such that it does not interfere with reception of another peer to peer device in its vicinity.

FIG. 12 is a drawing of an exemplary peer to peer communications system illustrating a case where two peer to peer communications devices, which have been authorized to transmit traffic signals during the same time, proceed and transmit traffic signals.

FIG. 23 includes a drawing of two exemplary pairs of connected peer to peer wireless terminals and a corresponding table used for illustrating various features of transmitter yielding in accordance with various embodiments.

FIG. 24 illustrates features of some exemplary embodiments, wherein transmission request signals are transmitted at a fixed power level and response signals are also transmitted at a fixed power level.

FIG. 25 illustrates features of some exemplary embodiments, wherein a transmission request signal is transmitted at a fixed power level and a response signal is transmitted at a power level which is a function of the received power of the request signal.

FIG. 27 is a drawing illustrating features of some embodiments in which a plurality of peer to peer transmission requests corresponding to different frequencies are associated with the same peer to peer traffic air link resource, e.g., same peer to peer traffic segment.

FIG. 28 is a drawing illustrating features of some embodiments in which a plurality of peer to peer transmission requests corresponding to different times in a timing structure are associated with the same peer to peer traffic air link resource, e.g., same peer to peer traffic segment.

DETAILED DESCRIPTION

Figure 1:
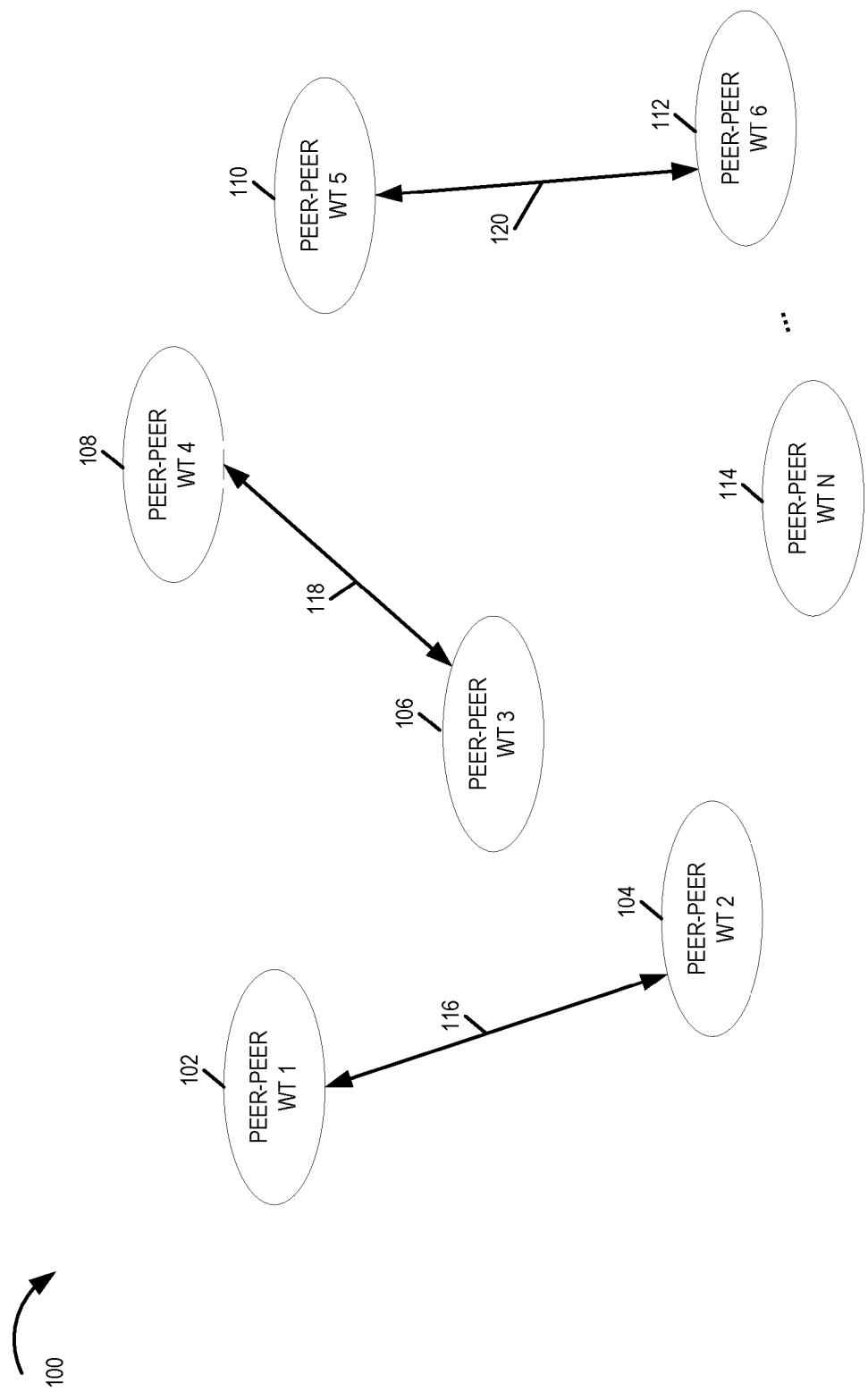
FIG. 1 is a drawing of an exemplary peer to peer wireless communications system in accordance with various embodiments.

FIG. 1 is a drawing of an exemplary peer to peer wireless communications system 100 in accordance with various embodiments. Exemplary wireless communications system 100 includes a plurality of wireless terminals, e.g., mobile nodes, supporting peer to peer communications (peer to peer wireless terminal 1 102, peer to peer wireless terminal 2 104, peer to peer wireless terminal 3 106, peer to peer wireless terminal 4 108, peer to peer wireless terminal 5 110, peer to peer wireless terminal 6 112, . . . , peer to peer wireless terminal N 114). In this example, at the time represented by FIG. 1, peer to peer wireless terminal 1 102 has an active connection with peer to peer wireless terminal 2 104 as indicated by arrow 116; peer to peer wireless terminal 3 106 has an active connection with peer to peer wireless terminal 4 108 as indicated by arrow 118; and peer to peer wireless terminal 5 110 has an active connection with peer to peer wireless terminal 6 112 as indicated by arrow 120.

In accordance with a feature of various embodiments, a decision whether or not to transmit on a peer to peer air link traffic resource, e.g., a peer to peer traffic segment, is performed in a distributed manner with both the transmission node and receiving node having an input into the decision process. In various embodiments, interference considerations regarding other peer to peer communications devices which may desire to transmit on the same peer to peer air link traffic resource are considered in making a transmission decision. In some such embodiments, monitored peer to peer signals from peer to peer devices with which a peer to peer device does not have an active connection are used in the transmission decision process.

In some embodiments, following a transmission request to transmit traffic signals, both the intended receiving device and the intended transmission device have an opportunity to yield to other peer to peer devices and refrain from allowing the requested peer to peer traffic signaling to proceed.

In some embodiments, following the transmission device's decision to transmit traffic and prior to transmission of said traffic, the transmission device transmits a peer to peer pilot signal. In some such embodiments, the peer to peer pilot signal is utilized by the receiving device to determine information, which is to be used to determine a data rate for the traffic data. In some embodiments, the air link resource conveying the traffic signals also conveys data rate information of the traffic.

Figure 2:
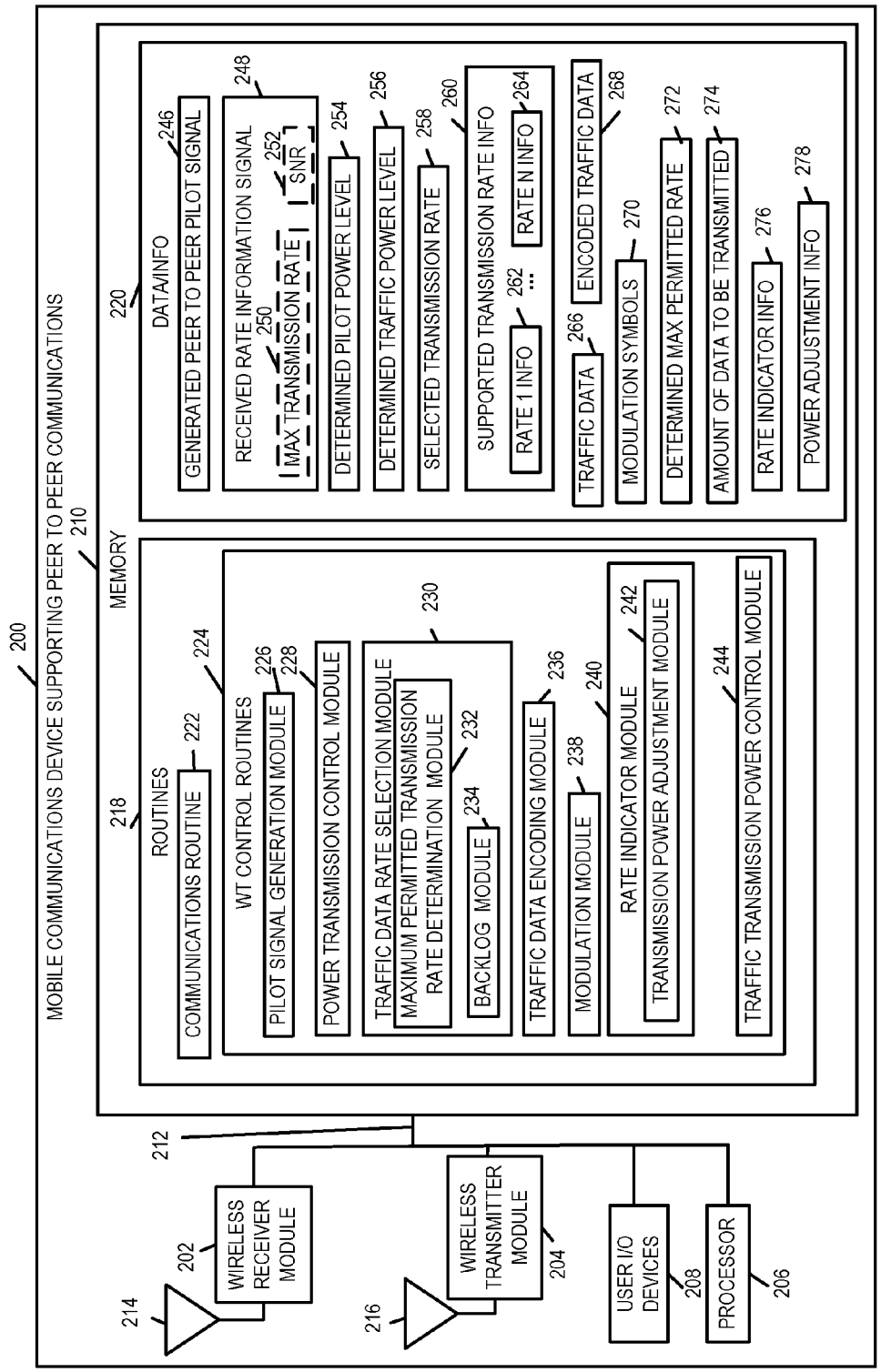
FIG. 2 is a drawing of an exemplary mobile communications device supporting peer to peer communications in accordance with various embodiments.

FIG. 2 is a drawing of an exemplary mobile communications device 200 supporting peer to peer communications in accordance with various embodiments. Exemplary mobile communications device 200 may be any one of the communications devices of system 100 of FIG. 1. Exemplary communications device 200 includes a wireless receiver module 202, a wireless transmitter module 204, user I/O devices 208, a processor 206 and a memory 210 coupled together via a bus 212 over which the various elements may interchange data and information. Wireless receiver module 202, e.g., an OFDM receiver, is coupled to receive antenna 214 via which the communications device 200 receives peer to peer signals from other communications devices. Received peer to peer signals include a received rate information signal 248 from a second mobile communications device supporting peer to peer communications. The received peer to peer signal 248 is, e.g., a response signal corresponding to a previously transmitted generated peer to peer pilot signal 246 from mobile communications 200 directed to said second mobile communications device supporting peer to peer communications.

Wireless transmitter module 204, e.g., an OFDM transmitter, is coupled to transmit antenna 216 via which the communications device 200 transmits peer to peer signals to other communications devices. Transmitted peer to peer signals include peer to peer pilot signals and peer to peer traffic signals. Wireless transmitter module 204 transmits a generated peer to peer pilot signal, e.g., signal 246, to said second mobile communications device. Wireless transmitter module 204 also transmits traffic data to the second mobile communications device at a rate determined based on a received rate information signal, e.g. signal 248. In some embodiments, the same antenna is used for reception and transmission. In some embodiments multiple antennas or multiple antenna elements are used, e.g., as part of a MIMO configuration.

User I/O devices 208 include, e.g., microphone, keypad, keyboard, camera, switches, speaker, display, etc. User I/O device 208 allow a user of mobile communications device 200 to input data/information, access output data/information, and control at least some function of communications device 200, e.g., initiate a peer to peer communications session.

Memory 210 includes routines 218 and data/information 220. The processor 206, e.g., a CPU, executes the routines 218 and uses the data/information 220 in memory 210 to control the operation of the communications device 200 and implement methods, e.g., the method of flowchart 500 of FIG. 4. Routines 218 include a communications routine 222 and wireless terminal control routines 224. The communications routine 222 implements the various communications protocols used by the mobile communications device 200. Wireless terminal control routines 224 include a pilot signal generation module 226, a power transmission control module 228, a traffic data rate selection module 230, a traffic data encoding module 236, a modulation module 238, a rate indicator module 240 and a traffic transmission power control module 244. Traffic data rate selection module 230 includes a maximum permitted transmission rate determination module 232 and a backlog module 234. Rate indicator module 240 includes a transmission power adjustment module 242.

Data/information 220 includes a generated peer to peer pilot signal 246, a received rate information signal 248, a determined pilot power level 254, a determined traffic power level 256, a selected transmission rate 258, supported transmission rate information 260, traffic data 266, encoded traffic data 268, modulation symbols 270, a determined maximum permitted rate 272, an amount of data to be transmitted 274, rate indicator information 276 and power adjustment information 278. Received rate information signal 248, in some embodiments, includes one or more of a communicated maximum transmission rate 250 and a communicated signal to noise ratio 252. Supported transmission rate information 260 includes a plurality of sets of rate information (rate 1 information 262, . . . , rate N information 264). Rate 1 information 262 includes, e.g., a traffic data rate and associated encoding rate, and an associated modulation scheme, e.g., information identifying a QPSK constellation to be used.

Pilot signal generation module 226 generates peer to peer pilot signals, e.g., generated peer to peer pilot signal 246. In various embodiments, a peer to peer pilot signal is generated corresponding to an individual traffic segment in which the mobile communications device 200 intends to transmit traffic signals. In various embodiments, a peer to peer pilot signal is transmitted corresponding to an individual traffic segment in which the mobile communications device intends to transmit traffic signals. Thus, peer to peer pilot signals from mobile communications device 200 may be observed to be transmitted at some times and not transmitted at other times, e.g., in response to intended peer to peer traffic signals transmissions. This approach is in contrast to a base station transmitting its pilot signals on a repetitive schedule irrespective of traffic segment usage information. This approach of the peer to peer pilot signal transmission being linked to traffic segments which are to be used to convey traffic signals by the mobile communications device 200, can reduces overall interference and/or conserve battery power. For example, for a particular segment, if mobile communications device 200 has no traffic to transmit or is not authorized to transmit traffic or decides to yield and not transmit traffic, communications device 200 does not transmit a peer to peer pilot signal for that particular traffic segment.

Power transmission control module 228 controls transmission of a generated pilot signal to be at first power level and controls transmission of traffic data to be at a predetermined power level relative to the first power level. Determined pilot power level is the first power level to be used for transmission of generated peer to peer signal 246, while determined traffic power level 256 is the level to be used for traffic data.

Traffic data rate selection module 230 selects a transmission rate from a plurality of supported transmission rates as a function of information included in a received rate information signal. For example, traffic data selection module 230 selects the rate indicated in selected transmission rate 258 from supported transmission rate information 260 as a function of information communicated in received rate information signal 248. In various embodiments, the selected data rate to be used for peer to peer traffic signals corresponds to a particular coding rate and a particular modulation scheme.

Traffic data encoding module 236 encodes traffic data to be transmitted in accordance with the selected rate. Traffic data 266 is an input to the encoding module 236 and encoded traffic data 268 is an output. Modulation module 238 generates modulation symbols conveying encoded traffic data to be transmitted in accordance with the selected rate. Encoded traffic data 268 is an input to modulation module 238, while modulation symbols 270 is an output of module 238.

Traffic data rate selection module 230 includes a maximum permitted transmission rate determination module 232 and a backlog module 234. Maximum permitted transmission rate determination module 232 determines a maximum permitted rate, e.g., determined maximum permitted rate 272. Backlog module 234 tracks the amount of data to be transmitted, e.g., information 274.

In various embodiments, the traffic data rate selection module 230 selects a transmission data rate as a function of the amount of data to be transmitted and the determined maximum transmission rate. In some embodiments, the traffic data rate selection module 230 selects, at times, a transmission rate lower than the determined maximum transmission rate when the amount of data to be transmitted is less than the amount of data which can be transmitted in a traffic segment if data were to be transmitted at the determined maximum permitted transmission rate.

Rate indicator module 240 includes a rate indicator, e.g., a rate indicator corresponding to rate indicator information 276, with the traffic data, e.g., the rate indicator is communicated in the same segment as the traffic data. Rate indicator module 240 includes transmission power adjustment module 242 for adjusting transmission power levels of modulation symbol values conveying encoded traffic data. Power adjustment information 278 is an output from transmission power adjustment module 242. Thus, the rate indicator may be communicated by the location of energy adjustments applied to a set of modulation symbols conveying encoded traffic signals. In some other embodiments, the rate indicator for the traffic segment is communicated by other means, e.g., a first subset of the air link resources of the traffic segment is dedicated to convey the rate indicator and a second subset of the air link resources of the traffic segment is dedicated to convey the encoded traffic signals.

Traffic transmission power control module 244 determines a transmission power level to be used for transmitting traffic data, e.g., determined traffic power level 256. This is, e.g., an average power level to be associated with the constellation. In various embodiments, the determined transmission power level for transmitting traffic data is in the range of A to $P_{max}$ where A is a non-zero power level and $P_{max}$ is a predetermined function of the pilot transmission power level, where A and $P_{max}$ are different. In some embodiments, the traffic transmission power control module 244 determines the transmission power level as a function of the amount of data to be transmitted 274. In some embodiments, the traffic transmission power module 244 determines the power level as a function of the determined maximum permitted transmission rate 272.

Figure 3:
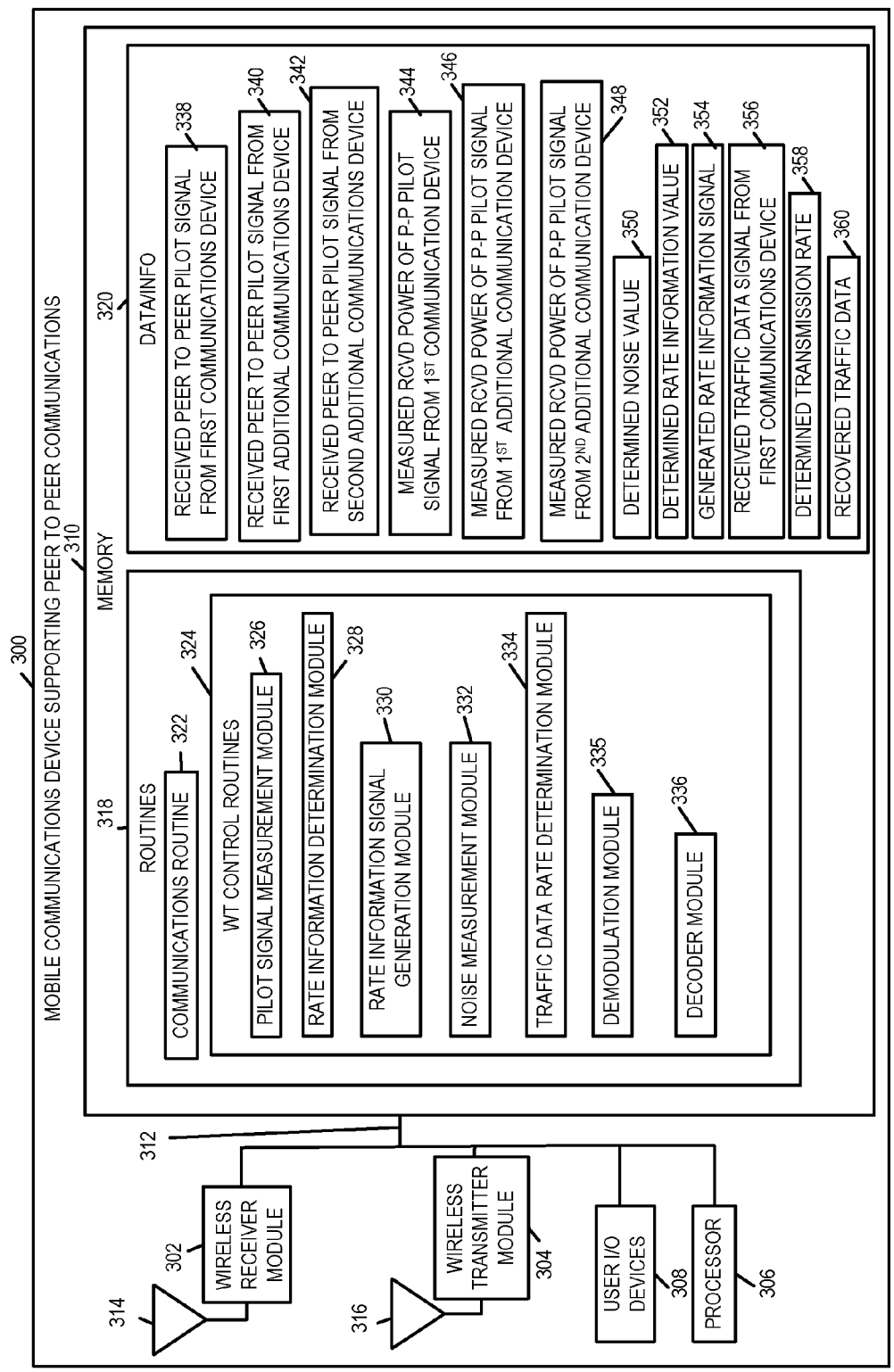
FIG. 3 is a drawing of an exemplary mobile communications device supporting peer to peer communications in accordance with various embodiments.

FIG. 3 is a drawing of an exemplary mobile communications device 300 supporting peer to peer communications in accordance with various embodiments. Exemplary communications device 300 may be any of the exemplary peer to peer wireless terminals of FIG. 1. Exemplary communications device 300 includes a wireless receiver module 302, a wireless transmitter module 304, user I/O devise 308, a processor 306 and a memory 310 coupled together via a bus 312 over which the various elements may interchange data and information. Wireless receiver module 302, e.g., an 01-DM receiver, is coupled to receive antenna 314 via which the communications device 300 receives peer to peer signals from other communications devices. Received peer to peer signals include received peer to peer pilot signals, e.g., a received peer to peer pilot signal from a first communications device 338, a received peer to peer pilot signal from a first additional communications device 340 and received peer to peer pilot signal form a second additional communications device 342. Received peer to peer signals also include a received traffic data signal from first communications device 356.

Wireless transmitter module 304, e.g., an OFDM transmitter, is coupled to transmit antenna 316 via which the communications device 300 transmits peer to peer signals to other communications devices. Transmitted peer to peer signals include a generated rate information signal 354, the generated rate information signal being generated in response to the received peer to peer pilot signal from the first communications device 338. The rate information signal transmitted to the first communications device, e.g., a first mobile communications device supporting peer to peer communications, provides information to be used by the first mobile communications device in determining a maximum permitted data traffic transmission data rate. In some embodiments, the same antenna is used for reception and transmission. In some embodiments multiple antennas or multiple antenna elements are used, e.g., as part of a MIMO configuration.

User I/O devices 308 include, e.g., microphone, keypad, keyboard, camera, switches, speaker, display, etc. User I/O device 308 allow a user of mobile communications device 300 to input data/information, access output data/information, and control at least some function of communications device 300, e.g., initiate a peer to peer communications session.

Memory 310 includes routines 318 and data/information 320. The processor 306, e.g., a CPU, executes the routines 318 and uses the data/information 320 in memory 310 to control the operation of the communications device 300 and implement methods, e.g., the method of flowchart 600 of FIG. 5. Routines 318 include a communications routine 322 and wireless terminal control routines 324. The communications routine 322 implements the various communications protocols used by the mobile communications device 300. Wireless terminal control routines 324 include a pilot signal measurement module 326, a rate information determination module 328, a rate information signal generation module 330, a noise measurement module 332, a traffic data rate determination module 334, a demodulation module 335, and a decoder module 336.

Data/information 320 includes a received peer to peer pilot signal from a first communications device 338, a received peer to peer pilot signal from a first additional communications device 340, a received peer to peer signal from a second additional communications device 342, information storing a measured received power of the peer to peer pilot signal from the $1^{st}$ communications device 344, information storing a measured received power of the peer to peer pilot signal from the $1^{st}$ additional communications device 346, information storing a measured received power of the peer to peer pilot signal from the $2^{nd}$ additional communications device 348, a determined noise value 350, a determined rate information value 352, a generated rate information signal 354, a received traffic data signal from the first communications device 356, a determined transmission rate 358 and recovered traffic data 360.

Pilot signal measurement module 326 measures the received power of received pilots signals. For example pilot signal measurement module 326 measures received peer to peer pilot signals (338, 340, 342) and obtains measured received power information (344, 346, 348), respectively.

Rate information determination module 328 determines a value, e.g., value 352, to be used in a transmission rate determination operation as a function of the measured received pilot signal power and measured noise value, e.g., as a function of measured received power of peer to peer pilot signal from $1^{st}$ communications device 344 and determined noise value 350.

Rate information signal generation module 330 generates a rate information signal which communicates the determined value. For example, rate information signal generation module 330 generates rate information signal 354 which communicates determined rate information value 352. In various embodiments, the determined rate information value 352 is one of a signal to noise ratio and a maximum transmission rate.

Noise measurement module 332 determines a measured noise value as a function of additional received pilot signals. For example, noise measurement module 332 determines determined noise value 350 as a function of received peer to peer pilot signal from a first additional communications device 340 and received peer to peer pilot signal from a second additional communications device 342, e.g., by utilizing the corresponding measured received power of the pilots signals (346, 348) in determining a noise level value.

Traffic data rate determination module 334 determines from information included with the received traffic data the transmission rate of the received traffic data. For example, module 334 obtains determined transmission rate 358 from received traffic signal from first communications device 356. In some embodiments, a determined traffic data rate corresponds to a particular coding rate and a particular modulation constellation utilized, wherein at least some of the potential different traffic data rates correspond to different coding rates and wherein at least some of the potential different traffic data rates correspond to different modulation constellations. In some embodiments, the traffic data rate is communicated via adjustments in power levels associated with different positions in the traffic communications segment. In some embodiments, the traffic data rate is communicated via a first subset of traffic segment air link resources and the traffic data signals are communicated via a second subset of the traffic segment air link resources.

Demodulation module 335 demodulates received peer to peer signals, based on the determined transmission rate, to obtain recovered encoded signals conveying traffic data. Decoder module 336 processes the recovered encoded signals based on the determined transmission rate to obtain recovered traffic data 360. In some embodiments, the demodulation and decoding are performed jointly, e.g., in a single module. In some embodiments some of the modules, e.g., the demodulation module 335 and/or the decoder module 336 are included as part of the wireless receiver module 302.

Figure 4:
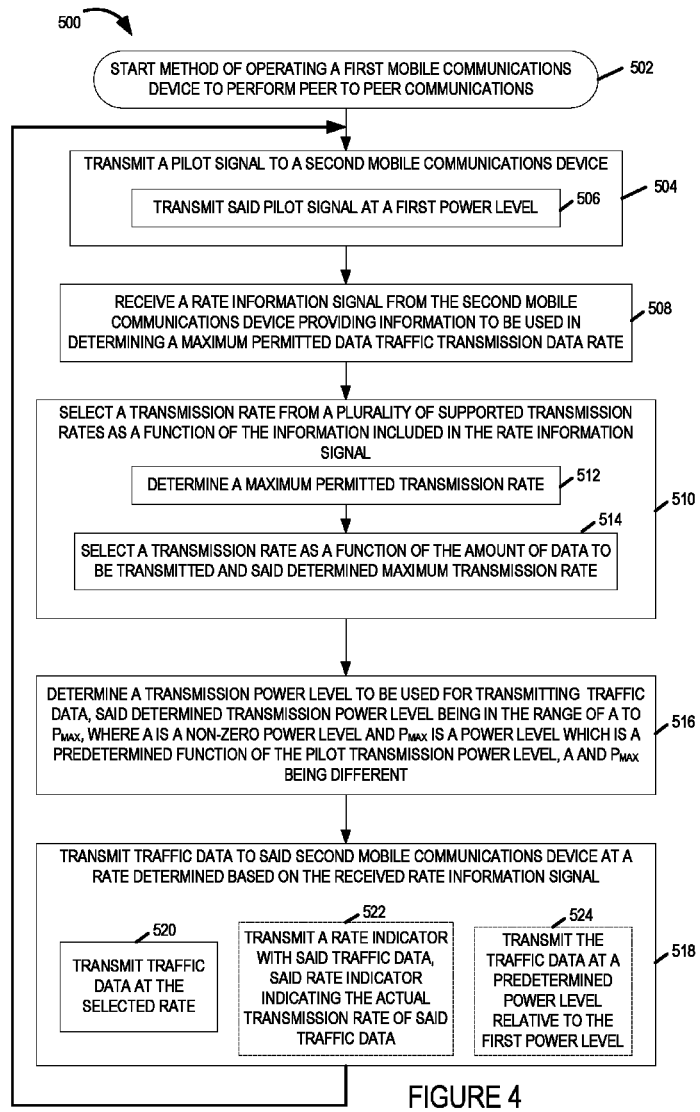
FIG. 4 is a flowchart of an exemplary method of operating a first mobile communications device to perform peer to peer communications in accordance with various embodiments.

FIG. 4 is a flowchart 500 of an exemplary method of operating a first mobile communications device to perform peer to peer communications in accordance with various embodiments. Operation starts in step 502, where the mobile communications device is powered on and initialized and proceeds to step 504.

In step 504, the first mobile communications device transmits a pilot signal to a second mobile communications device. Step 504 includes sub-step 506 in which the first mobile communications device transmits said first pilot signal at a first power level.

Operation proceeds from step 504 to step 508. In step 508, the first mobile communications device receives a rate information signal from the second mobile communications device providing information to be used in determining a maximum permitted data traffic transmission data rate. In various embodiments, the rate information signal includes one of a maximum transmission rate and a signal to noise ratio (SNR). In some embodiments, the rate information signal includes one of an estimated interference value and an estimated signal to interference ratio (SIR).

Operation proceeds from step 508 to step 510. In step 510, the first mobile communications device selects a transmission rate from a plurality of supported transmission rates as a function of the information included in the rate information signal. Step 510 includes sub-steps 512 and 514. In sub-step 512, the first mobile communications device determines a maximum permitted transmission rate. Operation proceeds from sub-step 512 to sub-step 514. In sub-step 514 the first mobile communications device selects a transmission rate as a function of the amount of data to be transmitted and said determined maximum transmission rate. In some embodiments, the selected transmission rate is lower than the determined maximum transmission rate when the amount of data to be transmitted is less than the amount of data which can be transmitted at the determined maximum permitted transmission data rate.

Operation proceeds from step 510 to step 516. In step 516, the mobile communications device determines a transmission power level to be used for transmitting traffic data, said determined transmission power level being the range of A to $P_{max}$, where A is a non-zero power level and $P_{max}$ is a power level which is a predetermined function of the pilot transmission power level, A and $P_{max}$ being different. In various embodiments, the determined transmission power level is a function of the amount of data to be transmitted. In some embodiments, determining the power level is also performed as a function of a maximum transmission rate indicated by information included in the received rate information signal.

Operation proceeds from step 516 to step 518. In step 518, the first mobile communications device transmits traffic data to said second mobile communications device at a rate determined based on the received rate information signal. Step 518 includes sub-step 520, and in some embodiments includes one or more of sub-steps 522 and 524. In sub-step 520, the first mobile communications device transmits traffic data at the selected rate. In sub-step 522, the first mobile communications device transmits a rate indicator with said traffic data, said rate indicator indicating the actual transmission rate of said traffic data. In sub-step 524, the first mobile communications device transmits the traffic data at a predetermined power level relative to the first power level.

Figure 5:
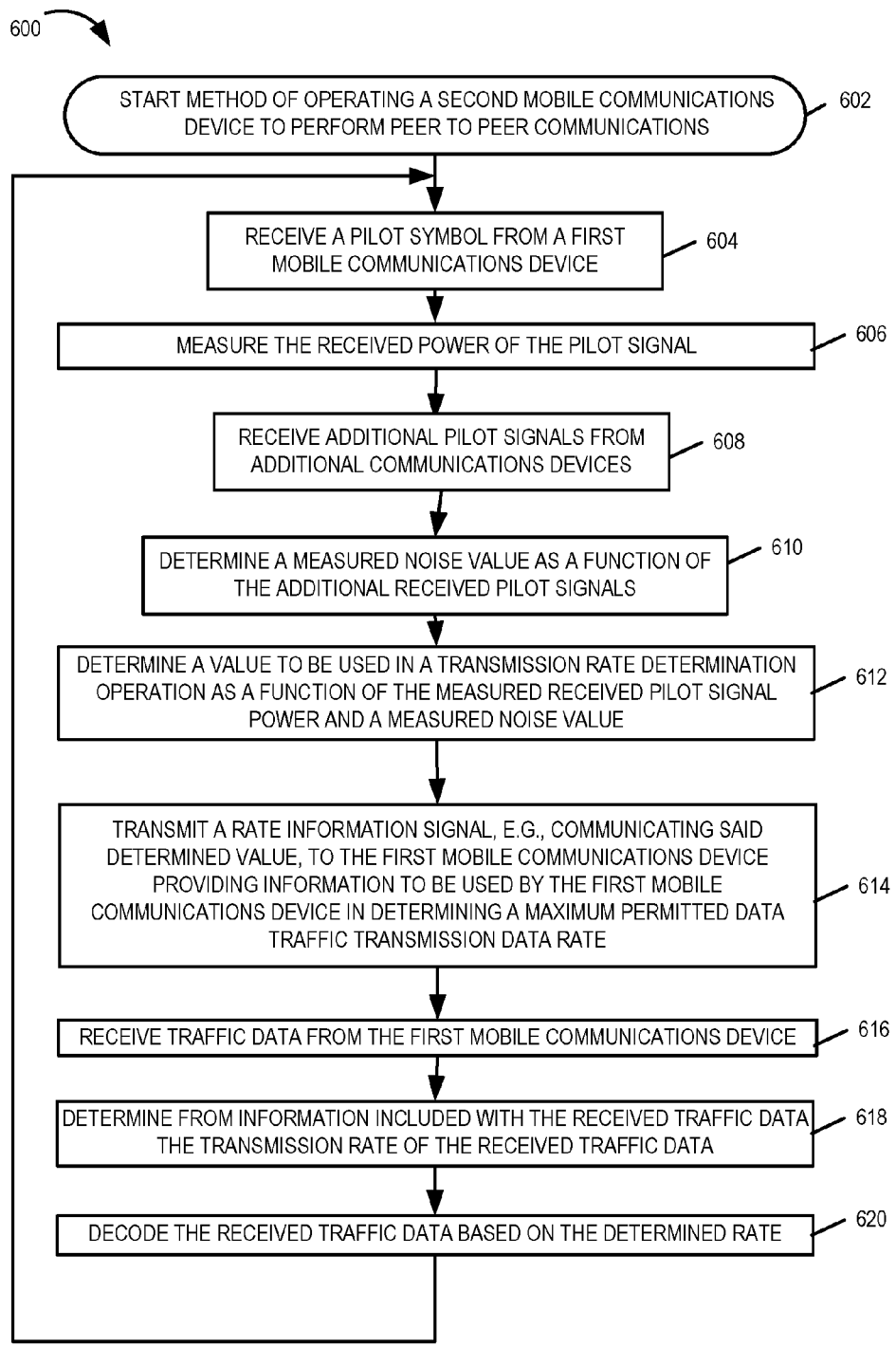
FIG. 5 is a flowchart of an exemplary method of operating a second mobile communications device to perform peer to peer communications in accordance with various embodiments.

FIG. 5 is a flowchart 600 of an exemplary method of operating a second mobile communications device to perform peer to peer communications in accordance with various embodiments. The second mobile communications device may be any of the peer to peer communications devices of system 100 of FIG. 1. Operation starts in step 602, where the second mobile communications device is powered on and initialized and proceeds to step 606. In step 606, the second mobile communications device receives a pilot symbol from a first mobile communications device. Operation proceeds from step 604 to step 606, in which the second mobile communications device measures the received power of the pilot signal.

Operation proceeds from step 606 to step 608. In step 608, the second mobile communications device receives additional pilot signals from additional communications devices. Then, in step 610 the second mobile communications device determines a measured noise value as a function of the additional received pilot signals. Operation proceeds from step 610 to step 612.

In step 612, the second mobile communications device determines a value to be used in a transmission rate determination operation as a function of the measured received pilot signal power and a measured noise value. In some embodiments, the determined value is one of a signal to noise ratio and a maximum transmission rate. Operation proceeds from step 612 to step 614.

In step 614, the second mobile communications device transmits a rate information signal, e.g., a rate information signal communicating said determined value of step 612, to the first mobile communications device providing information to be used by the first mobile communications device in determining a maximum permitted data traffic transmission data rate. Operation proceeds from step 614 to step 616.

In step 616, the second mobile communications device receives traffic data from the first mobile communications device. Operation proceeds from step 616 to step 618. In step 618, the second mobile communications device determines from information included with the received traffic data the transmission data rate of the received traffic data, and in step 620, the second mobile communications device decodes the received traffic data based on the determined rate.

Figure 6:
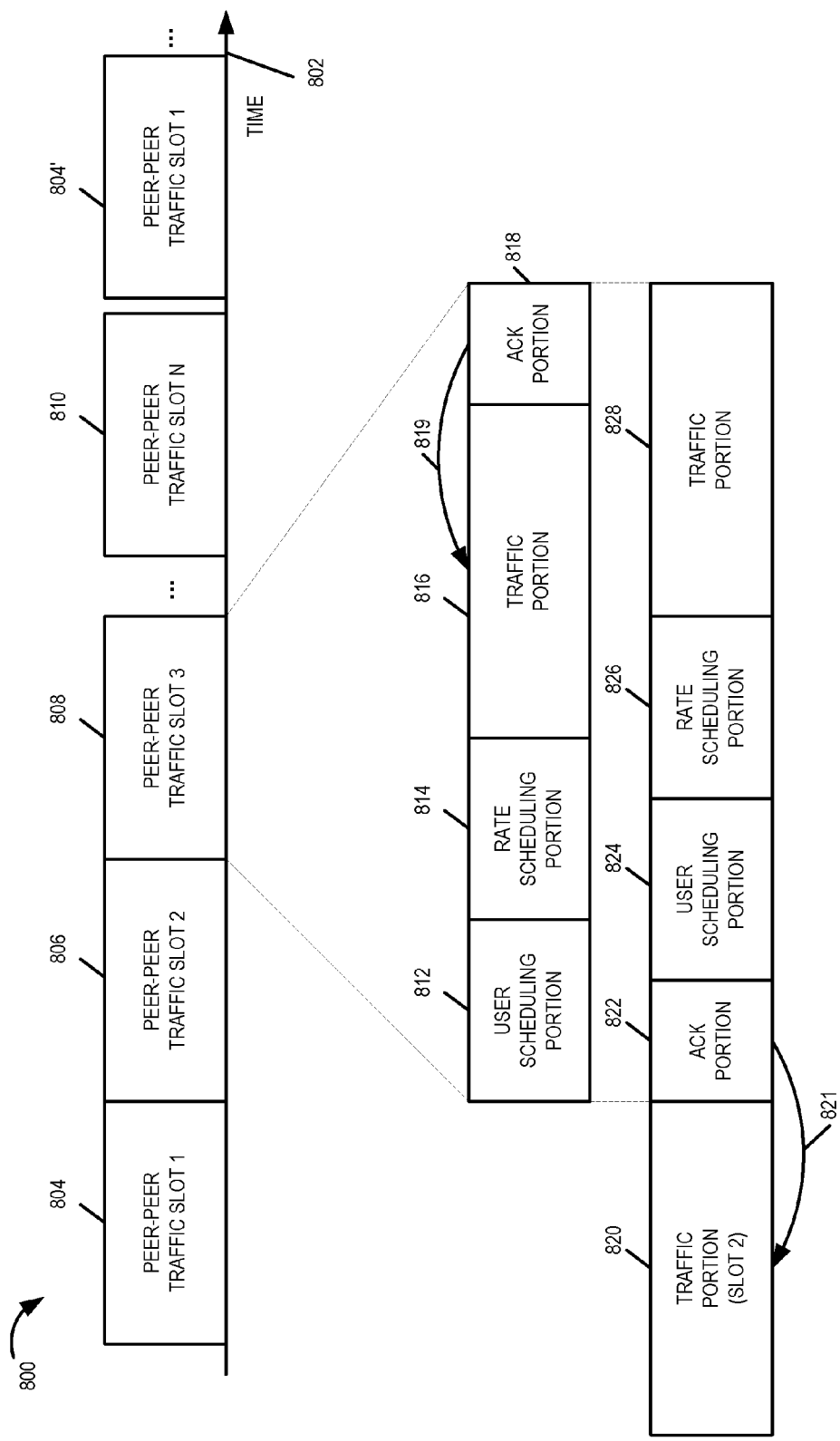
FIG. 6 is a drawing of exemplary peer to peer traffic slots in accordance with various embodiments.

FIG. 6 is a drawing 800 of exemplary peer to peer traffic slots in accordance with various embodiments. Drawing 800 illustrates an exemplary sequence of peer to peer traffic slots (peer to peer traffic slot 1 804, peer to peer traffic slot 2 806, peer to peer traffic slot 3 808, . . . , peer to peer traffic slot N 810) along time axis 802. In this exemplary embodiment, the sequence repeats as part of a recurring timing structure as indicated by peer to peer traffic slot 1 804' following peer to peer traffic slot 810.

The exemplary drawing 800 is, e.g., a logical representation. In some embodiments, logical structure communications resources are mapped to physical air link resources. For example, peer-to-peer traffic slot 808 is shown to include user scheduling portion 812, rate scheduling portion 814, traffic portion 816, and acknowledgment portion 818, and those portions are adjacent to each other. The physical air link resources associated with those portions may have time gaps between them, e.g., to allow processing time. In some embodiments, tone hopping is implemented as part of the mapping.

Each exemplary peer to peer traffic slot includes a user scheduling portion, a rate scheduling portion, a traffic portion and an acknowledgement portion. In one exemplary embodiment, an exemplary peer to peer traffic slot, e.g., peer to peer traffic slot 3 808 includes user scheduling portion 812, rate scheduling portion 814, traffic portion 816 and acknowledgement portion 818. Acknowledgement portion 818 corresponds to traffic portion 816 as indicated by arrow 819. In another exemplary embodiment, exemplary peer to peer traffic slot 3 808 includes acknowledgment portion 822, user scheduling portion 824, rate scheduling portion 826, and traffic portion 828. Acknowledgment portion 822 corresponds to traffic portion 820 of peer to peer traffic slot 2 806 as indicated by arrow 821.

This exemplary representation of FIG. 6 may be, and in some embodiments is, a logical representation of slots. For example, the air link resources corresponding to logical peer to peer traffic slot 1 804 may include a set of tone-symbols some of which are non-contiguous.

Figure 7:
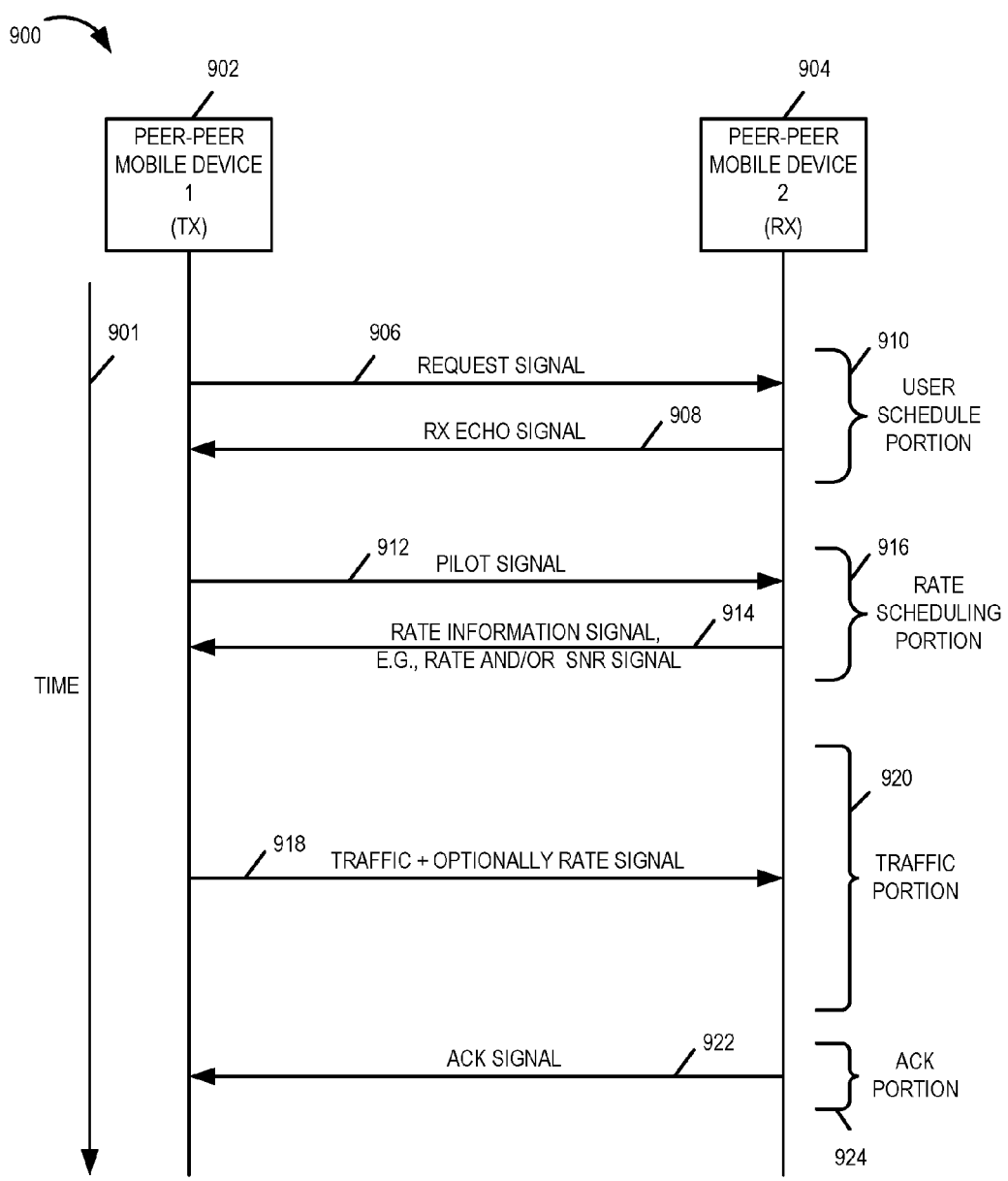
FIG. 7 is a drawing illustrating exemplary peer to peer mobile communications devices and exemplary signaling exchanged between the devices to support peer to peer traffic in accordance with various embodiments.

FIG. 7 is a drawing 900 illustrating peer to peer mobile communications devices (902, 904) and exemplary signaling exchanged between the devices (902, 904) to support peer to peer traffic in accordance with various embodiments. The communications devices (902, 904) may be any of the peer to peer wireless terminals of FIG. 1. In this example, peer to peer mobile device 1 902 desires to transmit traffic signals to peer to peer mobile device 2 904. Line 901 indicates time; and there is a user scheduling portion 910, followed by a rate scheduling portion 916, followed by a traffic portion 920, followed by an acknowledgment portion 924.

During the user scheduling portion 910, peer to peer mobile device 1 902 generates and transmits request signal 906. Peer to per mobile device 2, the intended recipient of request signal 906 receives request signal 906, processes the signal, considers the request, and sends an RX echo signal 908, if it approves of the request. If it does not approve the request, the peer to peer mobile device 2 904 does not send a response.

During rate scheduling portion 916, the peer to peer mobile communications device 1 902 sends pilot signal 912. Peer to peer mobile device 2 904 receives the pilot signal 912, measure the received signal strength, and generates a rate information signal 914. The rate information signal 914 communicates, e.g., a rate, an SNR value, an interference value, or an SIR value, so that peer to peer mobile device 1 902 can determine a maximum allowable data rate to be used during subsequent traffic portion 920. Peer to per mobile device 2 904 transmits the generated rate information signal 914 to peer to peer mobile device 1 902.

Peer to peer mobile device 1 902 receives the rate information signal 914 and determines a maximum allowed transmission rate to be used for traffic portion 920. Peer to peer mobile device 1 902 determines an actual data rate to use as a function of the determined maximum allowed transmission rate, wherein the actual data rate is less than or equal to the maximum allowed transmission rate. In various embodiments, the peer to peer mobile device 1 902 also considers (i) the amount of traffic data waiting to be communicated and/or (ii) its power status, e.g., remaining battery power and/or mode of operation, in determining the actual transmission data rate to use for the traffic.

Peer to peer mobile device 1 902 generates and transmits traffic signals 918 during traffic portion 920. The traffic signals communicate data at the determined actual data rate. In some embodiments, the traffic signals also carry an indication of the actual data rate. In one such embodiment, the rate information is communicated using a subset of the resources allocated for the traffic, e.g., the traffic resource includes a first portion, e.g., a first set of OFDM tone symbols, allocated to carry rate information, and a second portion, e.g., a second set of OFDM tone symbols, allocated to carry the traffic, e.g., user data, wherein the first and second sets are non-overlapping. In another such embodiment, the rate information is communicated using the same resources carrying traffic, e.g., the rate information is communicated via varying the transmit power of modulation symbols carrying traffic signals, e.g., some OFDM tone-symbols carrying the traffic are scaled at a first power level and others are scaled at a second power level, and the rate information is communicated by which positions are scaled at which levels.

Peer to peer mobile device 2 904 receives traffic signals 918 during traffic portion 920 and recovers the data being communicated. In some embodiments, rate information is also communicated with the traffic data. In some such embodiments, peer to peer mobile device 2 904 recovers the communicated rate information being communicated, and then decodes the traffic data signals. The peer to peer mobile device 2 904 determines whether or not the communicated data of the traffic signals 918 has been successfully recovered and generates a positive or negative acknowledgement signal.

During acknowledgment portion 924, the peer to peer mobile device 2 904 transmits the generated ACK signal 922 to mobile peer to peer to peer device 1 902. Peer to peer mobile device 1 902 receives the ACK signal 922, and updates transmission queue information based on the information conveyed by ACK signal 922.

Note that if peer to peer mobile device 1 902 does not receive an RX echo signal or subsequently decides not to proceed with transmission, the device 902 does not transmit pilot signal 912 and can terminate operation with regard to this traffic slot. Similarly, if peer to peer mobile device 904 decides not to proceed with transmission after it receives the request signal 906, the mobile device 904 does not transmit an RX echo signal and can terminate operation with regard to this traffic slot.

The process is repeated for additional traffic slots, e.g., as a function of traffic transmission needs of peer to per mobile device 1 902.

Figure 8:
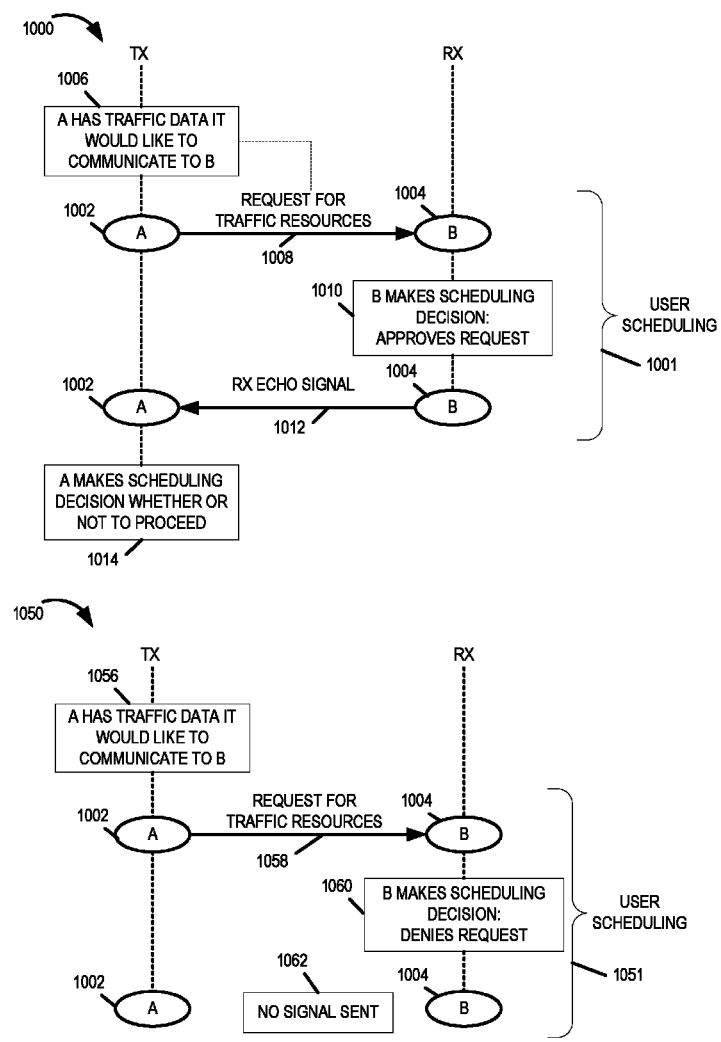
FIG. 8 includes exemplary decentralized user scheduling decisions in an exemplary peer to peer communications system in accordance with various embodiments.

FIG. 8 includes exemplary decentralized user scheduling decisions in an exemplary peer to peer communications system in accordance with various embodiments. Drawing 1000 of FIG. 8 illustrates a case where a first peer to peer mobile communications node 1002 requests traffic resources and is granted by a second peer to peer communications device 1004. Drawing 1050 of FIG. 8 illustrates a case where a first peer to peer mobile communications node 1002 requests traffic resources and is denied by a second peer to peer communications device 1004. The peer to peer device 1002, 1004 may be any of the peer to peer communications device of system 100 of FIG. 1.

In drawing 1000, peer to peer device A 1002 has traffic data that it would like to communicate to peer to peer device B 1004 in a traffic portion of a traffic slot as indicated by block 1006. Peer to peer device A 1002 generates and transmits request signal 1008 to peer to peer device B 1004. Peer to peer device B 1004 makes a scheduling decision and approves the request as indicated by block 1010. Peer to peer device B 1004 generates and transmits RX echo signal 1012 to peer to peer device A. Peer to peer device A 1002 receives and recovers the RX echo signal and recognizes that it is permitted to use the traffic portion of the traffic slot to transmit traffic data to peer to peer device B 1004. Block 1014 indicates that peer to peer device A 1002 makes a decision as to whether or not to proceed and transmit the traffic data. Thus both peer to peer device B 1004 and peer to peer device A 1002 are involved in the decision process as to whether to proceed with the traffic signaling, and both have an opportunity to deny the traffic data communication. Note that the request signal 1008 and the response signal 1012 occur during the user scheduling portion 1001 of the traffic slot.

In drawing 1050, peer to peer device A 1002 has traffic data that it would like to communicate to peer to peer device B 1004 in a traffic portion of a traffic slot as indicated by block 1056. Peer to peer device A 1002 generates and transmits request signal 1058 to peer to peer device B 1004. Peer to peer device B 1004 makes a scheduling decision and denies the request as indicated by block 1060. Peer to peer device B 1004 does not send a response signal as indicated by block 1062. Peer to peer device A 1002 recognizes that it has not received and recovered a response signal, and therefore recognizes that it is not permitted to use the traffic portion of the traffic slot to transmit traffic data to peer to peer device B 1004. Note that the request signal 1058 and monitoring for the response signal occur during the user scheduling portion 1051 of the traffic slot.

FIG. 9 is a drawing of an exemplary peer to peer communications system 1100 illustrating a case where a peer to peer wireless communications device denies a request for traffic resources because it expects to be occupied communicating with another peer to peer communications device during the traffic portion of the traffic slot. Exemplary peer to peer communications system 1100 includes five exemplary peer to peer mobile communications devices (device A 1102, device B 1104, device C 1106, device D 1108 and device E 1110). The peer to peer devices (1102, 1104, 1106, 1108, 1110) may be any of the peer to peer wireless terminals of FIG. 1. During the user scheduling portion of a traffic slot, device A 1102 sends a traffic request signal 1112 to device B 1104; device C 1106 sends a traffic request signal 1114 to device D 1108; device E 1110 sends a traffic request signal 1116 to device B 1104. Device B 1104 considers the two request and decides to grant device E permission and sends acknowledgment signal 1118 to device E 1110; however, device B denies device A 1102 because device B expects it will be busy receiving traffic signals from device E during the traffic portion, as indicated by block 1122. Therefore, device B 1104 does not send a response to device A. Device D 1108 decides to grant device C 1106 permission and sends acknowledgment signal 1120 to device C 1106.

FIG. 10 is a drawing of an exemplary peer to peer communications system 1200 illustrating a case where a peer to peer wireless communications device denies a request for traffic resources because it anticipates another peer to peer device in its vicinity will be transmitting during the traffic portion of the traffic slot and would create too much interference to allow for successful recovery of signals from the requesting device. Exemplary peer to peer communications system 1200 includes four exemplary peer to peer mobile communications devices (device A 1202, device B 1204, device C 1206, and device D 1208. The peer to peer communications devices (1202, 1204, 1206, 1208) may be any of the peer to peer wireless terminals of FIG. 1. Note that device B 1204 is very close to device C 1206.

During the user scheduling portion of a traffic slot, device A 1202 sends a traffic request signal 1210 to device B 1204; device C 1206 sends a traffic request signal 1212 to device D 1208. Device B 1204 considers the request 1210 and decides deny device A 1202 because device B 1204 anticipates that device C 1206 will transmit to device D 1208 during the traffic portion of the traffic slot and generate interference to reception of traffic signal from device A 1202 such that device B 1204 would be unable to successfully recover traffic signals from device A 1202 (or the achievable data rate would be too low, e.g., below an acceptable or predetermined threshold data rate, from device A 1202 to device B 1204 in the presence of communication from device C 1206 to device D 1208), as indicated by block 1216. Here, in one embodiment, it is assumed that the communication from device A 1302 to device B 1304 is of lower priority than the communication from device C 1306 to device D 1308. Note that although the request 1212 is sent by device C 1206 to device D 1208, the request is received by device B 1204, because the request signal 1212 is transported in a shared wireless medium using a common control resource, which is monitored by device B 1204. Device D 1208 receives the request 1212 and grants device C 1206 permission to transmit traffic signals during the traffic portion of the traffic slot.

FIG. 11 is a drawing of an exemplary peer to peer communications system 1300 illustrating a case where a peer to peer wireless communications device, which has been approved to transmit traffic signals, refrains from transmitting such that it does not interfere with reception of another peer to peer device in its vicinity. Exemplary peer to peer communications system 1300 includes four exemplary peer to peer mobile communications devices (device A 1302, device B 1304, device C 1306, and device D 1308. The peer to peer mobile communications devices (1302, 1304, 1306, 1308) may be any of the peer to peer wireless terminals of FIG. 1. Note that device A 1302 is very close to device D 1308.

During the user scheduling portion of a traffic slot, device A 1302 sends a traffic request signal 1310 to device B 1304; device C 1306 sends a traffic request signal 1312 to device D 1308. Device B 1304 considers the request 1310 and decides to grant device A 1302 permission to transmit traffic signals during the traffic portion of the traffic slot and sends authorization signal 1314 to device A 1302. Device D 1308 considers the request 1312 and decides to grant device C 1306 permission to transmit traffic signals during the traffic portion of the traffic slot and sends authorization signal 1316 to device C 1306. Device A 1302, which is approved to transmit by device B 1304, decides to refrain from transmitting because it recognizes that device C 1306 has been authorized to transmit by device D 1308 and that transmission from device A 1302 will interfere with device D's reception of traffic signals from device C 1306. Here, in one embodiment, it is assumed that the communication from device A 1302 to device B 1304 is of lower priority than the communication from device C 1306 to device D 1308. Note that although the authorization signal 1316 is sent by device D 1308 to device C 1306, the signal is received by device A 1302, because the authorization signal 1316 is transported in a shared wireless medium using a common control resource, which is monitored by device A 1302.

FIG. 12 is a drawing of an exemplary peer to peer communications system 1400 illustrating a case where two peer to peer communications devices, which have been authorized to transmit traffic signals during the same time, proceed and transmit traffic signals. Exemplary peer to peer communications system 1400 includes four exemplary peer to peer mobile communications devices (device A 1402, device B 1404, device C 1406, and device D 1408. The peer to peer mobile communications devices (1402, 1404, 1406, 1408) may be any of the exemplary peer to peer wireless terminals of FIG. 1. Note that both device A 1402 and device B 1404 are far away from device C 1406 and device D 1408.

During the user scheduling portion of a traffic slot, device A 1402 sends a traffic request signal 1410 to device B 1404; device C 1406 sends a traffic request signal 1414 to device D 1408. Device B 1404 considers the request 1410 and decides to grant device A 1402 permission to transmit traffic signals during the traffic portion of the traffic slot and sends authorization signal 1412 to device A 1402. Device D 1408 considers the request 1414 and decides to grant device C 1406 permission to transmit traffic signals during the traffic portion of the traffic slot and sends authorization signal 1416 to device C 1406. Both device A 1402 and device C 1406 proceed to transmit traffic signals during the traffic portion of the traffic slot in this example. However, note that device A 1402 and/or device C 1406 could, and sometimes does, in some embodiments, refrain from transmitting traffic signals under such a scenario if its need for transmission changes to null since the original request (1410, 1414) but before the actual traffic transmission starts.

Figure 13:
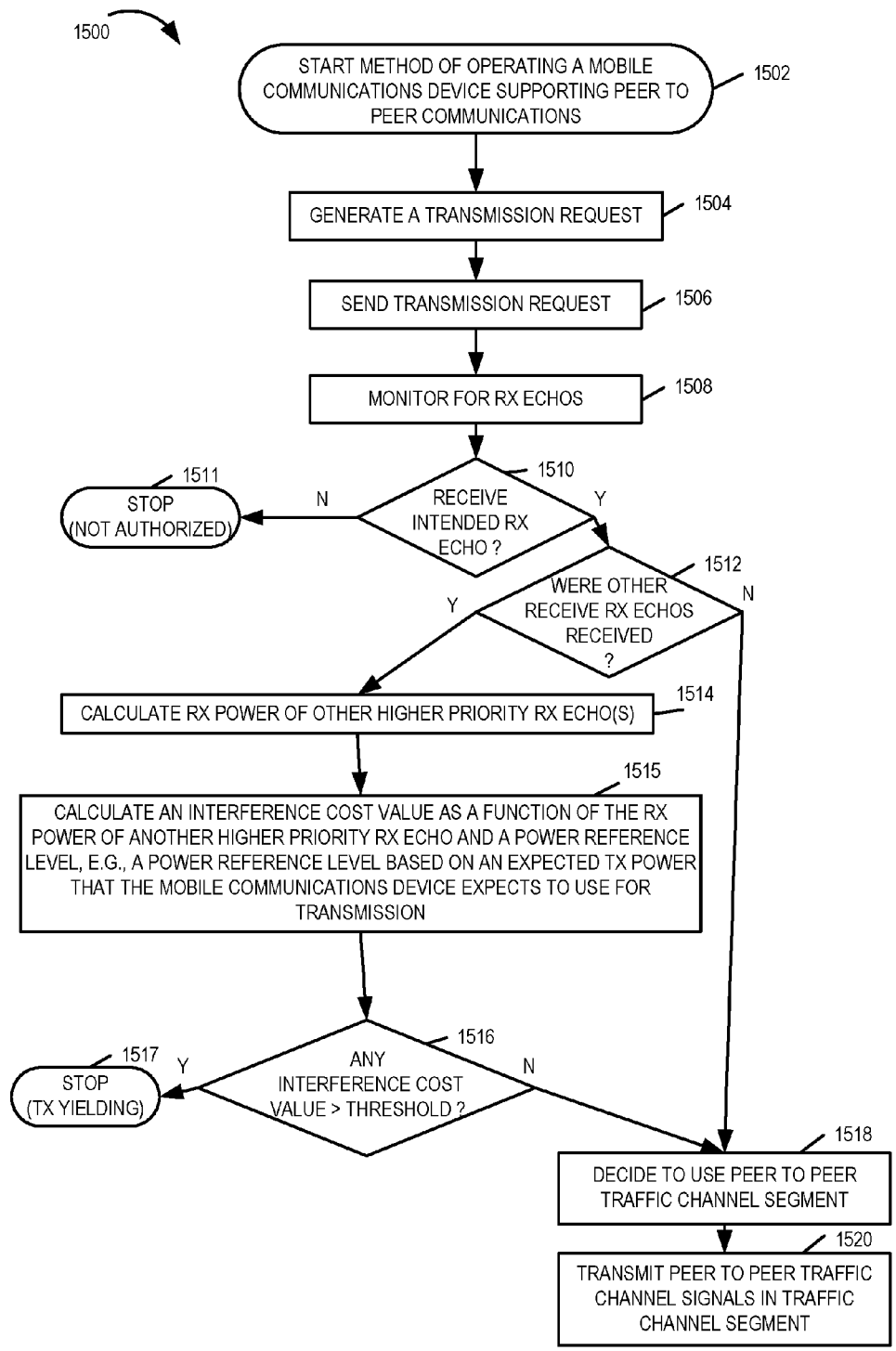
FIG. 13 is a flowchart of an exemplary method of operating a mobile communications device supporting peer to peer communications in accordance with various embodiments.

FIG. 13 is a flowchart 1500 of an exemplary method of operating a mobile communications device supporting peer to peer communications in accordance with various embodiments. Operation starts in step 1502, where the mobile communications device is powered on and initialized. Operation proceeds from start step 1502 to step 1504, in which the mobile communications device generates a transmission request. Then, in step 1506, the mobile communications device sends, e.g., transmits over a wireless communications channel, the generated transmission request. Operation proceeds from step 1506 to step 1508. In step 1508, the mobile communications device monitors for RX echos. The RX echo is a response signal from a peer to peer communications device which received a transmission request notifying the peer to peer communications device which sent a transmission request that it is ok to use a corresponding to air link resource to transmit peer to peer traffic signals. In this exemplary embodiment, if a peer to peer device receiving a request does not grant the request it does not send an RX echo signal.

Operation proceeds from step 1508 to step 1510. In step 1510 the mobile communications device determines if it received the intended RX echo, wherein the intended RX echo is the affirmative response signal from the peer to peer communications device to which the transmission request of step 1506 was sent. If the intended RX echo is not received, then operation proceeds from step 1510 to step 1511 where the mobile communications device stops, with regard to this transmission request since it has not been able to determine that it is authorized to transmit traffic channel signals on the traffic channel resources corresponding to the request of step 1506. The mobile communications device may not have received the intended RX echo because the peer to peer device to which the request was send decided not to authorize transmission of traffic signals and intentionally did not send the signal, or because of poor channel conditions either the request or the RX echo could not be successfully recovered.

Returning to step 1510, in step 1510 if the intended RX echo was received, then operation proceeds from step 1510 to step 1512. In step 1512, the mobile communications device checks as to whether other RX echos were received. For example, other peer to peer communication devices may have been granted permission to transmit peer to peer traffic signals using the same air link traffic channel resources, and thus other RX echo signal may have been communicated and detected. If other RX echos were received then operation proceeds from step 1512 to step 1514; otherwise operation proceeds from step 1512 to step 1518.

Returning to step 1514, in step 1514 the mobile communications device calculates the RX power of other higher priority echo(s) Operation proceeds from step 1514 to step 1515. In step 1515, the mobile communications device calculates an interference cost value as a function of the RX power of another higher priority RX echo and a power reference level, e.g., a power reference level based on an expected TX power that the mobile communications device expects to use for transmission in the present traffic slot. In some embodiments, the power reference level has been determined by the mobile communications device. In some embodiments, the power reference level is a predetermined level, e.g., one of a plurality of stored predetermined transmission power levels. In some embodiments, the power reference level is the TX power level that the mobile communications device intends to use for transmission in the present traffic slot. Thus, in step 1515, the mobile communication device calculates an interference cost value as a function of the RX power of an echo of higher priority and its own intended TX power. For example, the interference cost value is, in some embodiments, proportional to the multiplication of the RX power of a higher priority echo and its own intended TX power. If the mobile communication device receives multiple higher priority RX echoes, the mobile may, and in some embodiments does, calculate multiple interference cost values, one for each received higher priority RX echo. An interference cost value is, in some embodiments, a prediction of the signal to interference ratio of a corresponding higher priority communication assuming that the mobile communication device decides to transmit its traffic at the intended TX power and is the main interference to the higher priority communication. Then, in step 1516, the mobile communications device determines if any interference cost value associated with a higher priority RX echo is greater than a threshold. If a interference cost value is determined to be greater than a threshold, then operation proceeds from step 1516 to step 1517, where the mobile communications device stops with regard to this transmitted request of step 1506 since the mobile communications device is yielding the traffic channel resource. This allows the higher priority peer to peer communications device pair to use the resource without interference from this mobile communications device.

If there is not a higher priority RX echo which has an associated interference cost value that has exceeded a threshold, then operation proceeds from step 1516 to step 1518. In step 1518 the mobile communications device decides to use the peer to peer traffic channel segment associated with the transmission request. Then in step 1520, the mobile communications device transmits peer to peer traffic channel signals in the traffic channel segment.

Figure 14:
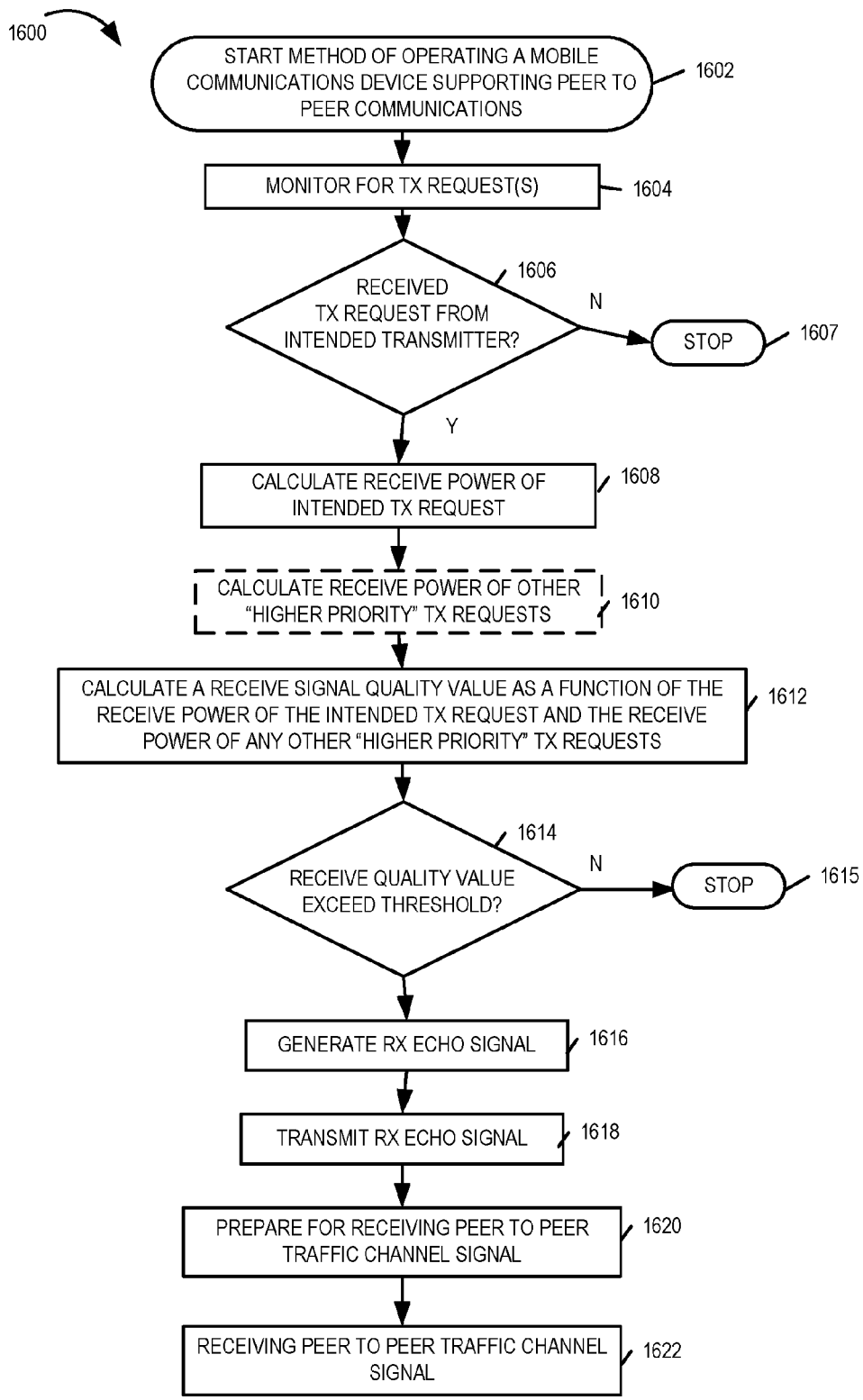
FIG. 14 is a flowchart of an exemplary method of operating a mobile communications device supporting peer to peer communications in accordance with various embodiments.

FIG. 14 is a flowchart 1600 of an exemplary method of operating a mobile communications device supporting peer to peer communications in accordance with various embodiments. Operation starts in step 1602 where the mobile communications device is powered on and initialized and proceeds to step 1604.

In step 1604, the mobile communications device monitors for transmission request(s) to use a peer to peer traffic channel resource, which are referred to as TX request(s). Different peer to peer devices may be, and sometimes, are requesting to use the same peer to peer traffic channel air link resources. The monitoring of step 1604 refers to requests corresponding to that peer to peer traffic channel air link resource, e.g., a single segment. Assume that the mobile communications device has an established peer to peer connection with another peer to peer device. A received request from that another peer to peer device is considered a received intended request.

Operation proceeds from step 1604 to step 1606. In step 1606, the mobile communications device checks if it has received a TX request from an intended transmitter. If it has not received a request form an intended transmitter, then operation proceeds from step 1606 to step 1607, in which operations stop with regard to this peer to peer traffic channel air link resource for the mobile communications device. If it has received a TX request from the intended transmitter, then operation proceeds from step 1606 to step 1608. In step 1608, the mobile communications device calculates the receive power of the intended TX request. Operation proceeds from step 1608 to step 1610. In step 1610, the mobile communications device calculates a receive power of other "higher priority" TX requests. In this exemplary embodiment, the requests are associated with priorities, and different requests corresponding to the same peer to peer traffic channel air link resource will have different priority levels. Operation proceeds from step 1610 to step 1612. At times, there will not be a higher priority TX request, and in such a scenario, operation proceeds from step 1608 to step 1612.

In step 1612 the mobile communications device calculates a receive signal quality value as a function of the receive power of the intended TX request and the receive power of any other "higher priority" TX requests. For example, an exemplary receive quality value=(receive power of intended TX request)/(Σreceive power of other "higher priority" TX requests). Operation proceeds from step 1612 to step 1614.

In step 1614, the mobile communications device checks if the receive quality value exceeds a threshold. If the receive quality value does not exceed the threshold, then operation proceeds from step 1614 to step 1615, where operation stops with regard to this peer to peer traffic channel resource for the mobile communications device.

However, if the receive quality value exceeds the threshold, then operation proceeds from step 1614 to step 1616 in which the wireless communications device generates an RX echo signal. Then, in step 1618, the mobile communications device transmits the RX echo signal to the peer to peer communications device which sent the intended RX request. This RX echo signal serves as a positive acknowledgment signal. Operation proceeds from step 1618 to step 1620. In step 1620, the mobile communications device prepares for receiving a peer to peer traffic channel signal 1620 using the peer to peer traffic channel resource associated with the intended request. In some embodiments, preparation includes switching the mobile communications device from a TX mode of operation to an RX mode of operation. Operation proceeds from step 1620 to step 1622 in which the mobile communications device receives a peer to peer traffic channel signal.

Operation may have proceed to step 1607 because a TX request was not sent to the mobile communications device or the mobile communications device was not able to recover the request, e.g., due to poor channel conditions.

In some embodiments, operation may have proceeded to step 1615 because the power of the intended received request was too low, even though there were not other "higher priority" TX requests received. In some embodiments, operation may have proceeded to step 1615 because the mobile communications device expects transmissions from higher priority requests to create too much interference to significantly limit the data rate of or even prevent successful recovery of peer to peer traffic signals corresponding to its intended received TX request, and thus the mobile communications device decides to yield the peer to peer traffic channel resource.

In various embodiments, the flowchart 1600 represents a flow corresponding to a single peer to peer traffic channel resource, e.g., segment. Thus, operation can proceed from one of steps 1607, 1615 and 1622 back to step 1604 to start operations corresponding to the next potential peer to peer traffic channel resource, e.g., segment.

Figure 15:
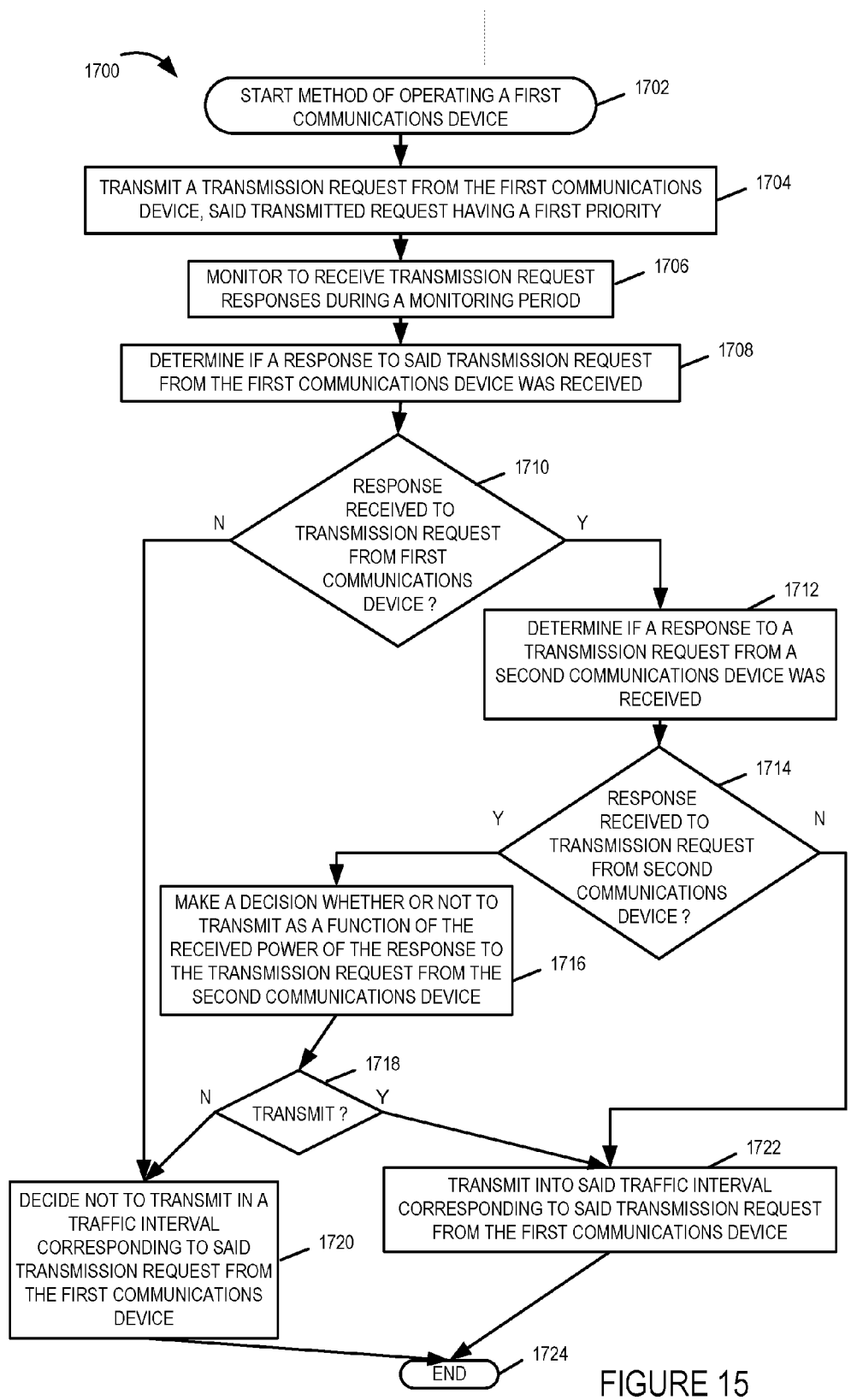
FIG. 15 is a flowchart of an exemplary method of operating a first communications device in accordance with various embodiments.

FIG. 15 is a flowchart 1700 of an exemplary method of operating a first communications device in accordance with various embodiments. The exemplary first communications device is, e.g., a mobile communications device supporting peer to peer communications. The exemplary first communications device may be any of the peer to peer wireless terminals of FIG. 1.

Operation starts in step 1702, where the first communications device is powered on and initialized, and proceeds to step 1704. In step 1704, the first communications device transmits a transmission request from the first communications device, said transmitted request having a first priority. Operation proceeds from step 1704 to step 1706.

In step 1706, the first communications device monitors to receive transmission request responses during a monitoring period. In some embodiments, responses to transmission request received on a predetermined communications resource during the monitoring period are responses to use a first traffic resource during a traffic interval.

Operation proceeds from step 1706 to step 1708. In step 1708 the first communications device determines if a response to said transmission request from the first communications device was received. Operation proceeds from step 1708 to step 1710. In step 1710, if the determination of step 1708 indicated that a response was received to the transmission request from the first communications device then operation is controlled to proceed from step 1710 to step 1712. However, in step 1710, if the determination of step 1708 indicated that a response was not received to the transmission request from the first communications device then operation is controlled to proceed from step 1710 to step 1720.

Returning to step 1712, in step 1712, the first communications device determines if a response to a transmission request from a second communications device was received. In various embodiments the transmission request from the second communications device has a second priority. In some such embodiments, the first and second priorities are different. In some embodiments, the priority structure is such that different transmission requests corresponding to the same air link traffic resource have different priorities. Operation proceeds from step 1712 to step 1714. In step 1714, if the determination of step 1712 indicated that a response was received to a transmission request from a second communications device then operation is controlled to proceed from step 1714 to step 1716. However, in step 1714, if the determination of step 1712 indicated that a response was not received to the transmission request from a second communications device then operation is controlled to proceed from step 1714 to step 1722.

Returning to step 1716, in step 1716, the first communications device makes a decision whether or not to transmit as a function of the received power of the response to the transmission request from the second communications device. In some embodiments in addition to using the received power, the first communications device makes the decision of step 1716 as whether or not to transmit as a function of a power reference level, e.g., a power reference level based on an expected TX power that the first communications device expects to use for transmission in the traffic interval. In some embodiments, the power reference level is the TX power level that the first communications device intends to use in the traffic interval. In various embodiments, the function includes use of a power level threshold. In some embodiments, the function includes use of an interference based cost threshold. In some embodiments, the function compares the interference based cost threshold to one of: (i) a predicated signal to interference ratio value and (ii) a predicated total interference value. In some embodiments, the function used to make the decision is based on whether the second priority is greater than the first priority. In various embodiments, making a decision whether or not to transmit includes making a decision not to transmit when the second priority is greater than the first priority and the received power of the response to the transmit request from the second device has a received power greater than a threshold power level. In various embodiments, making a decision whether or not to transmit includes making a decision not to transmit when the second priority is greater than the first priority and the calculated interference cost value associated with the response to the transmit request from the second device is a value greater than an interference cost threshold. In some embodiments, making a decision whether or not to transmit includes deciding to transmit when it is determined that the first priority is higher than the priority of any transmission request from a device other than the first device for which a response is received during said monitoring period.

In some embodiments, prior to making the decision whether or not to transmit in step 1716, the first communications device calculates an interference cost value as a function of the received power of the response to the transmission request from the second device and a power reference signal. In some such embodiments, the power reference signal is an expected transmission power level that the first communications device intends to use for transmission in a traffic slot to which the decision corresponds.

Operation proceeds from step 1716 to step 1718. If the decision of step 1716 was to transmit, then operation proceeds from step 1718 to step 1722. However, if the decision of step 1716 was to refrain from transmitting, then operation proceeds from step 1718 to step 1720. In step 1720 the first communications device decides not to transmit in a traffic interval corresponding to said transmission request from the first communications device and refrains from transmitting. In various embodiments there is a predetermined relationship between the monitoring period and the corresponding traffic interval.

Returning to step 1722, in step 1722 the first communications device transmits into said traffic interval corresponding to said transmission request from the first communications device. Operation proceeds from step 1720 or step 1722 to end step 1724.

Figure 16:
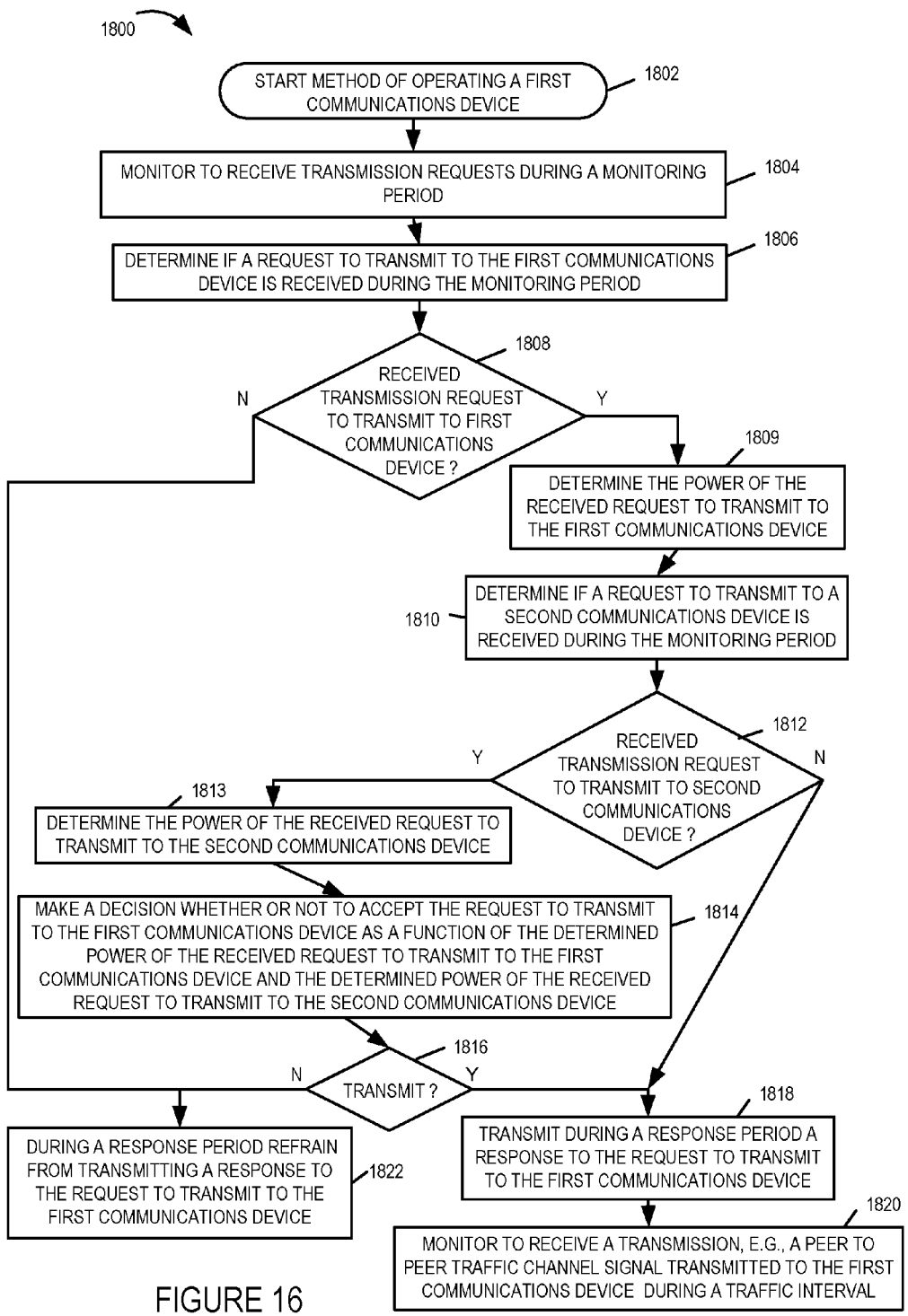
FIG. 16 is a flowchart of an exemplary method of operating a first communications device, e.g., a wireless communications device supporting peer to peer communications, in accordance with various embodiments.

FIG. 16 is a flowchart 1800 of an exemplary method of operating a first communications device, e.g., a wireless communications device supporting peer to peer communications, in accordance with various embodiments. Operation starts in step 1802, where the first communications device is powered on and initialized and proceeds to step 1804. In step 1804, the first communications device monitors to receive transmission requests during a monitoring period. Operation proceeds from step 1804 to step 1806. In step 1806, the first communications device determines if a request to transmit to the first communications device was received during the monitoring period. Operation proceeds from step 1806 to step 1808.

If a transmission request was received to transmit to the first communications device, then operation proceeds from step 1808 to step 1809; otherwise, operation proceeds from step 1808 to step 1822.

Returning to step 1809, in step 1809 the first communications device determines the power of the request to report to the first communications device. Operation proceeds from step 1809 to step 1810. In step 1810, the first communications device determines if a request to transmit to a second communications device is received during the monitoring period. Then, in step 1812, if a transmission request to transmit to a second communications device was received, operation proceeds from step 1812 to step 1813; otherwise, operation proceeds from step 1812 to step 1818.

Returning to step 1813, in step 1813, the first communications device determines the power of the request to transmit to the second communications device. Operation proceeds from step 1813 to step 1814 in which the first communications device makes a decision whether or not to accept the request to transmit to the first communications device as a function of the determined power of the received request to transmit to the first communications device and the determined power of the received request to transmit to the second communications device. In some embodiments, the function includes comparison of a ratio generated from the determined power of the received request to transmit to the first device and the determined power of the received request to transmit to the second device to a power ratio threshold.

Then, in step 1816, if the decision of step 1814 was to refrain from transmitting operation proceeds from step 1816 to step 1822, where during a response period the first communications device is controlled to refrain from transmitting a response to the request to transmit to the first communications device. However, in step 1816, if the decision of step 1814 was to transmit then, operation proceeds from step 1816 to step 1818.

In step 1818, the first communications device transmits during a response period a response to the request to transmit to the first communications device. In some embodiments, the response is transmitted at a fixed predetermined power level. In some other embodiments, the response is transmitted at a power level which is a function of the determined received power level of the received request to transmit to the first device. In some such embodiments, the transmitted power level of the response is inversely proportional to the determined received power level of the received request to transmit to the first device.

Operation proceeds from step 1818 to step 1820. In step 1820, the first communications device monitors to receive a transmission, e.g., a peer to peer traffic channel signal transmitted to the first communications device during a traffic interval. In various embodiments, the response period of step 1818 follows the monitoring period of step 1804, and the response period of step 1818 precedes a traffic interval of step 1820.

In some embodiments, there is a predetermined relationship between the monitoring period and the corresponding traffic interval. In some such embodiments, requests to transmit received on a predetermined communications resource during the monitoring period are requests to use a first traffic resource, e.g., first traffic segment, during said traffic interval.

Figure 17:
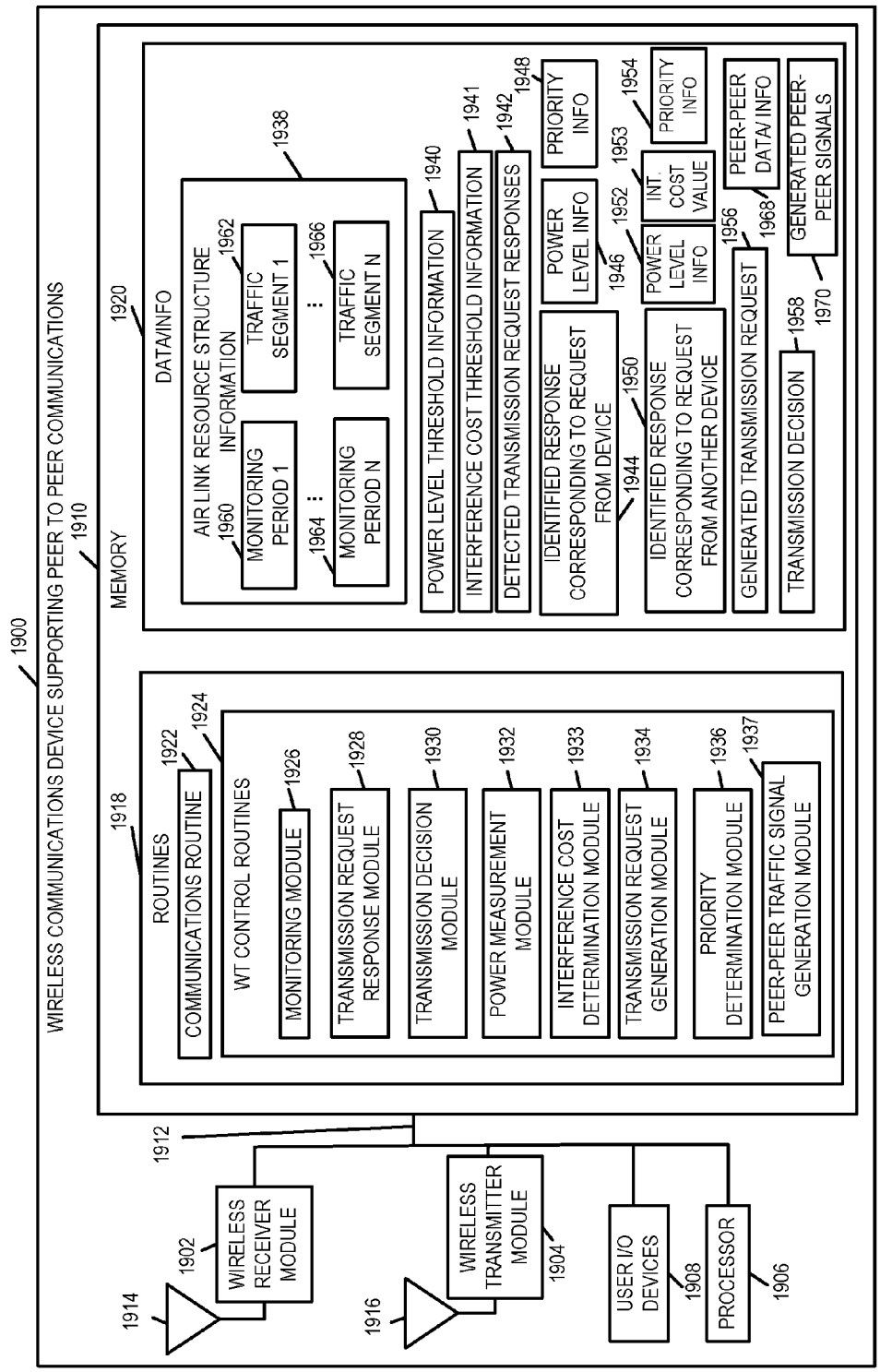
FIG. 17 is a drawing of an exemplary wireless communications device supporting peer to peer communications in accordance with various embodiments.

FIG. 17 is a drawing of an exemplary wireless communications device 1900 supporting peer to peer communications in accordance with various embodiments. Exemplary wireless communications device 1900 may be any of the peer to peer wireless terminals of FIG. 1. Exemplary wireless communications device 1900 includes a wireless receiver module 1902, a wireless transmitter module 1904, user I/O devices 1908, a processor 1906, and a memory 1910 coupled together via a bus 1912 over which the various elements may interchange data and information. Memory 1910 includes routines 1918 and data/information 1920. The processor 1906, e.g., a CPU, executes the routines 1918 and uses the data/information 1920 in memory 1910 to control the operation of the wireless communications device 1900 and implement methods, e.g., the method of flowchart 1500 of FIG. 13 or the method of flowchart 1700 of FIG. 15.

Routines 1918 include a communications routine 1922 and wireless terminal control routines 1924. The communications routine 1922 implements the various communications protocols used by the wireless communications device 1900. The wireless terminal control routines 1924 include a monitoring module 1926, a transmission request response module 1928, a transmission decision module 1930, a power measurement module 1932, an interference cost determination module 1933, a transmission request generation module 1934, a priority determination module 1936, and a peer to peer traffic signal generation module 1937.

Data/information 1920 includes air link resource structure information 1938, power level threshold information 1940, interference cost threshold information 1941, detected transmission request responses 1942, an identified response 1944 corresponding to a request from device 1900, power level information 1946 including information identifying the measured power of the received response 1944, priority information 1948 including information identifying the priority level or relative priority level of the received response 1944, an identified response corresponding to a request from another device 1950, power information 1952 including information identifying the measured power of the received response 1950, a calculated interference cost value 1953 which is associated with the identified received response of information 1950, priority information 1954 including information identifying the priority level or relative priority level of the received response 1950, a generated transmission request 1956, and a transmission decision 1958. Data/information 1920 also includes peer to peer data/information 1968 and generated peer to peer signals 1970. Air link resource structure information 1938 includes information identifying a plurality of sets of monitoring periods and corresponding traffic segments ((monitoring period 1 1960, traffic segment 1 1962), ..., (monitoring period N 1964, traffic segment N 1966)), e.g., as part of a recurring timing/frequency structure. Air link resource structure information 1938 identifies a predetermined relationship between a monitoring period and a corresponding traffic interval. In some embodiments, responses to transmission requests on a predetermined communications resource are responses to requests to use a first traffic resource during a traffic interval.

Wireless receiver module 1902, e.g., an OFDM receiver, is coupled to receive antenna 1914 via which the wireless communications device 1900 receives peer to peer signals from other wireless communications devices. Received peer to peer signals include response signals in response to transmission request messages. Wireless transmitter module 1904, e.g., an OFDM transmitter, is coupled to transmit antenna 1916 via which the wireless communications device 1900 transmits peer to peer signals to other wireless communications devices. Transmitted peer to peer signals include generated transmission requests and generated peer to peer traffic channel signals.

In some embodiments, the same antenna is used for both transmitter and receiver. In some embodiments, multiple antennas are used for reception and/or transmission, e.g., as part of MIMO communications.

User I/O devices 1908 include, e.g., microphone, keyboard, keypad, mouse, camera, speaker, display, etc. User I/O devices 1908 allow a user of device 1900 to input data/information, e.g., traffic data/information to be communicated to a peer, access output data/information, e.g., received peer to peer traffic data/information, and control at least some functions of the wireless communications device 1900, e.g., initiate a transmission request to send peer to peer traffic signals.

Monitoring module 1926 monitors to receive transmission request responses during a monitoring period. In this example, detected transmission request responses 1942 is an output of module 1926. Transmission request response module 1928 determines if a response to a transmission request from wireless communications device 1900 was received and determines if a response to a transmission request from a second communications device was received. Detected transmission request responses 1942 is an input to module 1928, while identified response 1944 corresponding to a request from device 1900 and identified response corresponding to a request from another device 1950 are outputs of module 1928.

Transmission decision module 1930 makes a decision whether or not to transmit as a function of the received power of the received response to the transmission request from the another device when it is determined that a response to a transmission request from device 1900 was received and it is also determined that a response from the another communications device was received. Transmission decision 1958 is an output of module 1930.

Power measurement module 1932 measures the received power of transmission request response signals. Power level information 1946 includes a measured received power value corresponding to the identified response of information 1944, while power level information 1952 includes a measured received power value corresponding to the identified response of information 1950. In various embodiments, the function of the transmission decision module 1930 uses the measured received power level and a power level threshold, e.g., a power level threshold specified in power level threshold information 1940.

Interference cost determination module 1933 calculates an interference cost associated with a received transmission request response signal. In various embodiments, the transmission decision module 1930 uses a calculated interference cost value and an interference based cost threshold in making a transmission decision. The interference cost threshold is stored in information 1941. In various embodiments, the interference cost determination module 1933 calculates an interference cost value from a ratio of a measured received power level of a received transmission request response signal and a power reference level. In some embodiments, the power reference level is based on an expected transmission power level that the device 1900 intends to use in a traffic slot, e.g., a present traffic slot. In some embodiments, the power reference level is an expected transmission power level that the device 1900 intends to use in a traffic slot, e.g., a present traffic slot.

In some embodiments, the calculated interference cost value is a predicated signal to interference ratio value. In some embodiments, the calculated interference cost value is a predicated total interference value.

Transmission request generation module 1934 generates a transmission request, e.g., generated transmission request 1956. The generated transmission request is a request to use a corresponding traffic segment to transmit peer to peer traffic channel signals to the device to which the request is sent. Various peer to peer communications devices may be, and sometimes are, requesting to use the same traffic channel segment. In various embodiments, both the potential transmission device and the potential receiver device of the potential traffic make decisions as to whether or not to allow the transmission, e.g., as a function of priority information and/or power level information.

Priority determination module 1936 determines a priority level associated with a received transmission request response signal. Priority information 1948 and priority information 1954 represent outputs of priority determination module 1936, corresponding to received response signals (1944, 1950), respectively. In some embodiments, each received request corresponding to the same monitoring period has a different priority level. In various embodiments, transmission decision modules 1930 decision function based its decision upon information including whether the priority associated with the identified received response for another device is greater than the priority associated with the identified received response for device 1900. In some such embodiments, the transmission decision module 1930 makes a decision not to transmit when the priority of the received response signal associated with the another device is greater than the priority of the received response directed to communications device 1900 and the received power of the response request associated with the another device has a received power greater than a threshold power level. In some such embodiments, the transmission decision module 1930 makes a decision to transmit when it is determined that the priority level associated with the received response corresponding to the transmission request from device 1900 is greater than the priority of any transmission request from a device other than device 1900 for which a response was received during the monitoring period.

In some embodiments, the decision module 1930 makes a decision not to transmit in a traffic interval corresponding to a transmission request from device 1900 when it is determined that a response to the transmission request is not received during the monitoring period.

Peer to peer traffic signal generation module 1937 generates peer to peer signals, e.g., signals 1970 from peer to peer data/information 1968. In some embodiments, the transmission request generation module 1934 generates a request as a function of an amount of backlog of data/information in peer to peer data/information 1968.

Figure 18:
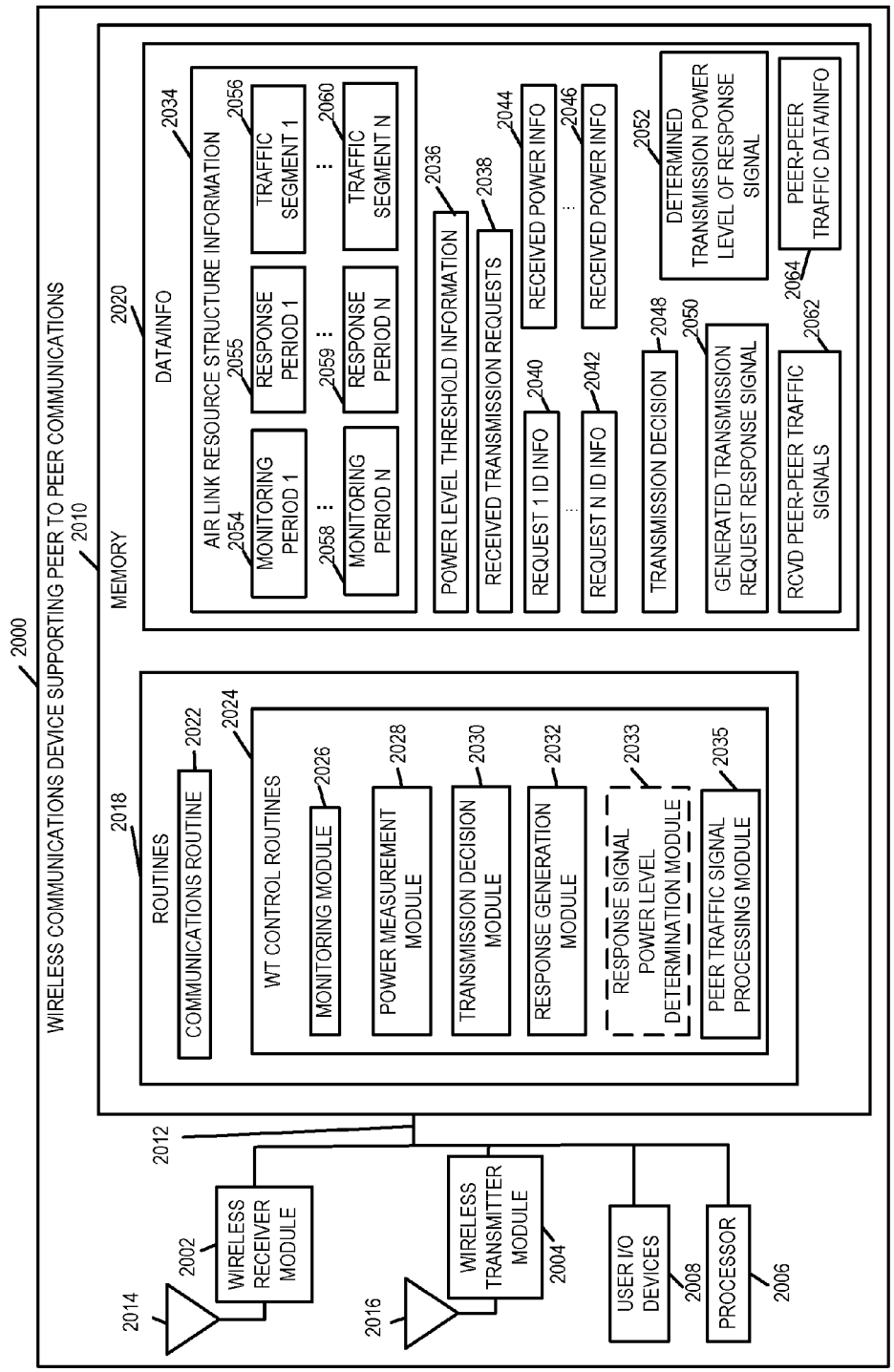
FIG. 18 is a drawing of an exemplary wireless communications device supporting peer to peer communications in accordance with various embodiments.

FIG. 18 is a drawing of an exemplary wireless communications device 2000 supporting peer to peer communications in accordance with various embodiments. Exemplary wireless communications device 2000 may be any of the peer to peer wireless terminals of FIG. 1. Exemplary wireless communications device 2000 includes a wireless receiver module 2002, a wireless transmitter module 2004, user I/O devices 2008, a processor 2006, and a memory 2010 coupled together via a bus 2012 over which the various elements may interchange data and information. Memory 2010 includes routines 2018 and data/information 2020. The processor 2006, e.g., a CPU, executes the routines 2018 and uses the data/information 2020 in memory 2010 to control the operation of the wireless communications device 2000 and implement methods, e.g., the method of flowchart 1600 of FIG. 14 or the method of flowchart 1800 of FIG. 16.

Routines 2018 includes a communications routine 2022 and wireless terminal control routines 2024. The communications routine 2022 implements the various communications protocols used by the wireless communications device 2000. The wireless terminal control routines 2024 include a monitoring module 2026, a power measurement module 2028, a transmission decision module 2030, a response generation module 2032, and a peer to peer signal processing module 2035. In some embodiments, the wireless communications device 2000 includes a response signal power level determination module 2033.

Data/information 2020 includes air link resource structure information 2034, power level threshold information 2036, received transmission requests 2038, information corresponding to received transmission requests ((request 1 identification information 2040, corresponding received power information 2044), . . . , (request N identification information 2042, corresponding received power information 2046)), transmission decision information 2048, a generated transmission request response signal 2050, and a determined transmission power level of the generated response signal 2052. Data/information 2020 also includes received peer to peer traffic signals 2062 and peer to peer traffic data/information 2064. Air link resource structure information 2034 includes information identifying a plurality of sets of monitoring periods, corresponding response periods and corresponding traffic segments ((monitoring period 1 2054, response period 1 2055, traffic segment 1 2056), . . . , (monitoring period N 2058, response period N 2059, traffic segment N 2060)), e.g., as part of a recurring timing/frequency structure. Air link resource structure information 2034 identifies a predetermined relationship between a monitoring period, a response period and a corresponding traffic interval. In some embodiments, requests for transmission conveyed on a first predetermined communications resource are requests to use a first traffic resource during a traffic interval. In some embodiments, a response period follows a monitoring period and precedes a traffic interval corresponding to a received request to transmit to device 2000. For example, monitoring period 1 2054 precedes response period 2055, which precedes traffic segment 1 2056.

Wireless receiver module 2002, e.g., an OFDM receiver, is coupled to receive antenna 2014 via which the wireless communications device 2000 receives peer to peer signals from other wireless communications devices. Received peer to peer signals include transmission request signals and peer to peer traffic signals. Wireless transmitter module 2004, e.g., an OFDM transmitter, is coupled to transmit antenna 2016 via which the wireless communications device transmits peer to peer signals to other wireless communications devices. Transmitted peer to peer signals include generated transmission request response signals. For example, wireless transmitter module 2004 transmits generated transmission response signal 2050 during response period 2055 corresponding to monitoring period 2054 and corresponding to traffic segment 2056, wherein the response is a positive authorization by device 2000 to the request received during monitoring period 2054 to transmit peer to peer traffic signals to device 2000 during the traffic interval identified by traffic segment 1 2056.

In some embodiments, the same antenna is used for both transmitter and receiver. In some embodiments, multiple antenna are used for reception and/or transmission, e.g., as part of MIMO communications.

User I/O devices 2008 include, e.g., microphone, keyboard, keypad, mouse, camera, speaker, display, etc. User I/O devices allow a user of device 2000 to input data/information, e.g., traffic data/information to be communicated to a peer, access output data/information, e.g., received peer to peer traffic data/information, and control at least some functions of the wireless communications device 2000, e.g., initiate a request to send peer to peer traffic signals.

Monitoring module 2026 monitors to receive a transmission request during a monitoring period. A received transmission request is, e.g., a request from a peer to peer communications device to transmit peer to peer traffic signals to another particular peer to peer communications device using a predetermined peer to peer traffic channel segment associated with the monitoring period. The particular peer to peer device to which the request is directed can be, and sometimes is, device 2000. Alternatively, the particular peer to peer device to which the request is directed can be, and sometimes is another device. Thus monitoring module 2026 receives transmission requests directed to itself and transmission requests directed to other nodes. Received transmission requests 2038 represent exemplary request signals detected by monitoring module 2026.

Power measurement module 2028 determines the power of a received request detected by monitoring module 2026. Received power information 2044 is an output of power measurement module 2028 corresponding to a received transmission request of received transmission requests 2038 identified by request 1 identification information 2040. Received power information 2046 is an output of power measurement module 2028 corresponding to a received transmission request of received transmission requests 2038 identified by request N identification information 2042. Request 1 ID information 2040, e.g., identifies that the request is directed to wireless communications device 2000, while request N ID information 2042, e.g., identifies that the request is directed to another communications device other than device 2000. Thus power measurement module 2028 can, and sometimes does, determine the power of a received request to transmit to device 2000 if a request to transmit to device 2000 is received during a monitoring period and determines the power of a received request to transmit to another device if a request to transmit to the another device is received during the monitoring period.

Transmission decision module 2030 makes a decision whether to accept the request to transmit to device 2000 as a function of the determined power of the received request to transmit to device 2000 and the determined power of the received request to transmit to another device, when a request to transmit to device 2000 and a request to transmit to said another device has been received during the monitoring period. In some embodiments, the function of the transmission decision module 2030 includes comparison of a ratio generated from the determined power of the received request to transmit to device 2000 and the determined power of the received request to transmit to the another device to a power ratio threshold, e.g., a predetermined power ratio threshold stored in power level threshold information 2036.

Transmission decision 2048 is an output of transmission decision module 2030 and is an input of response generation module 2032. Response generation module 2032 generates a response to a received request to transmit to device 2000 in response to making a decision to accept the request to transmit to device 2000. Generated transmission request response signal is an output of response generation module 2032.

In some embodiments, a generated response signal is transmitted at a fixed predetermined power level. In some other embodiments, the power level of the response signal varies. Response signal power level determination module 2033 determines the transmission power level of a generated response signal as a function of the determined received power level of the received request to transmit to device 2000. In some such embodiments, the transmit power level of the response is inversely proportional to the determined received power level of the received request to transmit to device 2000.

Peer to peer traffic signal processing module 2035 processes received peer to peer signals intended for device 2000, e.g., signals 2062, communicated on a peer to peer traffic segment, e.g., the traffic segment identified by traffic segment 1 information 2056, and recovers the peer to peer traffic data/information being communicated, e.g., data/information 2064.

Figure 19B:
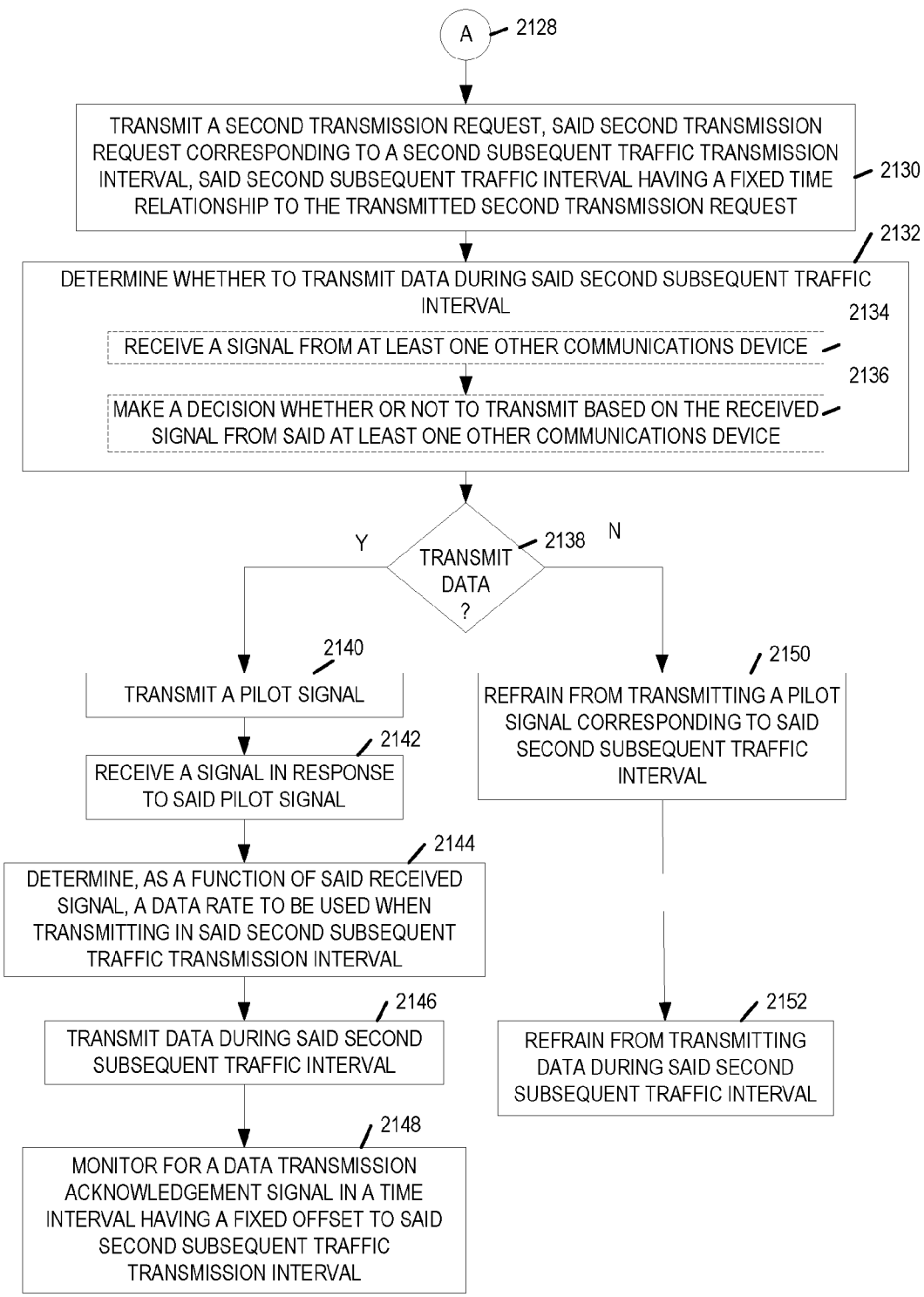
FIG. 19, comprising the combination of FIG. 19A and FIG. 19B, is a drawing of an exemplary method of operating a communications device in accordance with various embodiments.

FIG. 19 comprising the combination of FIG. 19A and FIG. 19B is a flowchart 2100 of an exemplary method of operating a communications device, e.g., a peer to peer communications device, in accordance with various embodiments. Operation starts in step 2102, where the communications device is powered on and initialized. Operation proceeds from step 2102 to step 2104.

In step 2104, the communications device transmits a transmission request, said transmission request corresponding to a subsequent traffic transmission interval, said subsequent traffic transmission interval having a fixed time relationship to the transmitted transmission request. In various embodiments, said fixed time relationship includes a predetermined offset in time from a point in time during which said transmission request is transmitted and a point in time in said subsequent traffic transmission interval. In some embodiments, the fixed time relationship is different for different transmission requests. In some embodiments, the fixed time relationship is communicated in the transmission request. Operation proceeds from step 2104 to step 2106.

In step 2106, the communications device determines whether to transmit data during said subsequent traffic interval. Step 2106, in some embodiments during at least some times, includes sub-steps 2108 and 2110. In sub-step 2108, the communications device receives a signal from at least one other communications device. Operation proceeds from sub-step 2108 to sub-step 2110. In sub-step 2110, the communications device makes a decision whether or not to transmit based on the received signal from said at least one other communications device.

In some embodiments, the transmission request is directed to a first communications device and the at least one other communications device is said first communications device. For example, the first communications device may be, and sometimes is, a peer to peer communications device with which the communications device has an active connection, and the received signal is a response signal, e.g., an RX echo signal transmitted in response to the request, the response notifying the communications device that from the first communications device's perspective it is acceptable for the communications device to transmit in the transmission traffic interval. In some embodiments, the transmission request is directed to a first communications device and the at least one other communications device is a second communications device which is different from the first communications device. Operation proceeds from step 2106 to step 2112.

In step 2112, the communications device proceeds from step 2112 to step 2114, if the determination of step 2106 was to transmit during said subsequent traffic interval. However, if the determination of step 2112 was to refrain from transmitting during said subsequent traffic interval, then operation proceeds from step 2112 to step 2124.

Returning to step 2114, in step 2114 the communications device transmits a pilot signal, then in step 2116 the communications device receives a signal in response to said pilot signal. Operation proceeds from step 2116 to step 2118. In step 2118, the communications device determines, as a function of said received signal of step 2116, a data rate to be used in said subsequent traffic transmission interval. Operation proceeds from step 2118 to step 2120.

In step 2120 the communications device transmits data during said subsequent traffic interval. In some embodiments, the transmission request of step 2104 is transmitted at a first power level and the traffic data of step 2120 is transmitted at a second power level, said first and second power levels have a first predetermined relationship. In some such embodiments, the first predetermined relationship specifies that the per tone transmission power of the traffic data is less than or equal to the per tone transmit power of the transmission request signal.

In some embodiments, the transmission request of step 2104 is transmitted at a first power level and the pilot of step 2114 is transmitted at a third power level, said first and third power levels having a second predetermined relationship. In some such embodiments, the second predetermined relationship specifies that the per tone transmission power of the pilot signal be less than or equal the per tone transmit power of the transmission request.

In some embodiments, the traffic data is transmitted at a second power level, said second power level having a third predetermined relationship with the third power level. In some such embodiments, the third predetermined relationship specifies that the second power level has a per tone power which is less than or equal the per tone power of the third power level.

Operation proceeds from step 2120 to step 2122. In step 2122 the communications device monitors for a data transmission acknowledgement signal in a time interval having a fixed offset to said subsequent traffic transmission interval. Operation proceeds from step 2122 to connecting node A 2128.

Returning to step 2124, in step 2124 the communications device refrains from transmitting a pilot signal corresponding to said subsequent traffic interval. Operation proceeds from step 2124 to step 2126. In step 2126 the communications device refrains from transmitting data during said subsequent traffic interval. Operation proceeds from step 2126 to connecting node A 2128.

Returning to connecting node A 2128, operation proceeds from connecting node A 2128 to step 2130. In step 2130, the communications device transmits a second transmission request, said second transmission request corresponding to a second subsequent traffic transmission interval, said second subsequent traffic transmission interval having a fixed relationship to the transmitted second transmission request. Operation proceeds from step 2130 to step 2132.

In step 2132, the communications device determines whether to transmit data during said second subsequent traffic interval. Step 2132, in some embodiments during at least some times, includes sub-steps 2134 and 2136. In sub-step 2134, the communications device receives a signal from at least one other communications device. Operation proceeds from sub-step 2134 to sub-step 2136. In sub-step 2136, the communications device makes a decision whether or not to transmit based on the received signal from said at least one other communications device. Operation proceeds from step 2132 to step 2138.

In step 2138, the communications device proceeds from step 2138 to step 2140, if the determination of step 2132 was to transmit during said second subsequent traffic interval. However, if the determination of step 2132 was to refrain from transmitting during said second subsequent traffic interval, then operation proceeds from step 2138 to step 2150.

Returning to step 2140, in step 2140 the communications device transmits a pilot signal, then in step 2142 the communications device receives a signal in response to said pilot signal. Operation proceeds from step 2142 to step 2144. In step 2144, the communications device determines, as a function of said received signal of step 2142, a data rate to be used in said second subsequent traffic transmission interval. Operation proceeds from step 2144 to step 2146.

In step 2146 the communications device transmits data during said subsequent traffic interval. Operation proceeds from step 2146 to step 2148. In step 2148 the communications device monitors for a data transmission acknowledgement signal in a time interval having a fixed offset to said second subsequent traffic transmission interval.

Returning to step 2150, in step 2150 the communications device refrains from transmitting a pilot signal corresponding to said second subsequent traffic interval. Operation proceeds from step 2150 to step 2152. In step 2152 the communications device refrains from transmitting data during said subsequent traffic interval.

Figure 20:
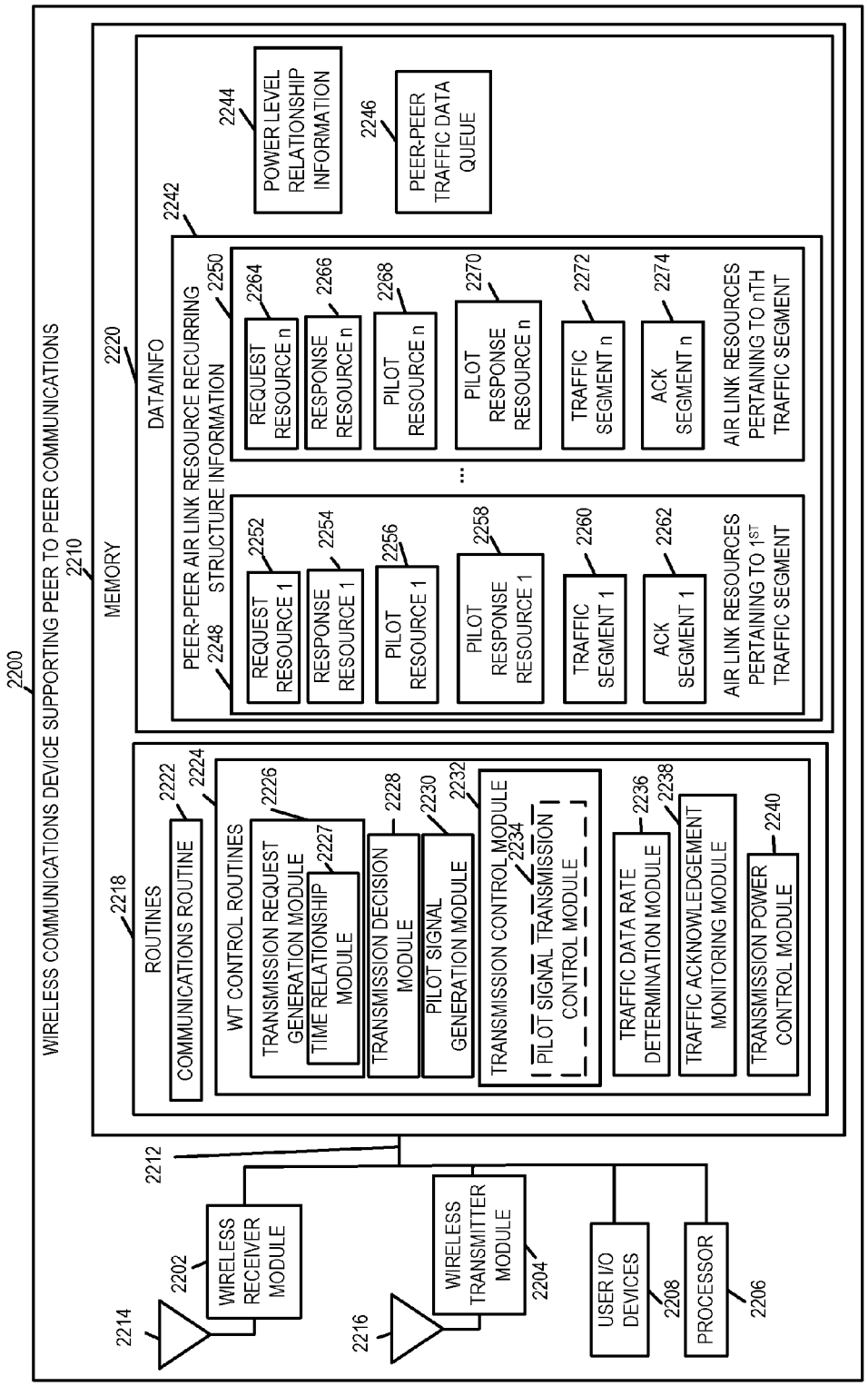
FIG. 20 is a drawing of an exemplary wireless communications device supporting peer to peer communications in accordance with various embodiments.

FIG. 20 is a drawing of an exemplary wireless communications device 2200 supporting peer to peer communications in accordance with various embodiments. Exemplary wireless communications device 2200 may be any of the exemplary peer to peer wireless terminals of FIG. 1. Exemplary wireless communications device 2200 includes a wireless receiver module 2202, a wireless transmitter module 2204, user I/O devices 2208, a processor 2206 and a memory 2210 coupled together via a bus 2212 over which the various elements may interchange data and information.

Wireless receiver module 2202, e.g., an OFDM receiver, is coupled to receive antenna 2214 via which the wireless communications device 2200 receives peer to peer signals from other wireless communications devices, e.g., responses to transmission requests, signals used to determinate a data rate for traffic, and traffic acknowledgment signals. Wireless receiver module 2202 receives a signal from at least one other communications device, e.g., a response signal to a transmission request from device 2200 or from a different device. Wireless receiver module 2202 receives a signal, e.g., a signal communicating information used in determining a data rate for peer to peer traffic signals, in response to a peer to peer pilot signal which it transmitted.

Wireless transmitter module 2204, e.g., an OFDM transmitter, is coupled to transmit antenna 2216 via which the communications device 2200 transmits peer to peer signals, e.g., a transmission request for transmitting traffic, a peer to peer pilot signal, and a peer to peer traffic signal. Wireless transmitter module 2204 transmits a generated transmission request, e.g., as a function of backlog information corresponding to its peer to peer transmission traffic queue. Wireless transmitter module 2204 transmits a peer to peer pilot signal when its transmission decision module 2228 decides that it intends to transmit traffic. Wireless transmitter module 2204 also transmits data, subsequent to the pilot signal transmission, when its transmission decision module 2228 decides that it intends to transmit traffic. In some embodiments, the same antenna is used for receiver and transmitter. In some embodiments, multiple antennas or antenna elements are used for at least one of the receiver and transmitter. In some embodiments, the wireless communications device 2200 supports MIMO signaling.

User I/O devices 2208 include, e.g., microphone, keyboard, keypad, switches, camera, mouse, speaker, display, etc. User I/O devices 2208 allow a user of device 2200 to input data/information, access output data/information and control at least some functions of the communications device 2200, e.g., initiate a peer to peer communications session with another communications device.

Memory 2210 includes routines 2218 and data/information 2220. The processor 2206, e.g., a CPU, executes the routines 2218 and uses the data/information 2220 in memory 2210 to control the operation of the communications device 2200 and implement methods, e.g., the method of flowchart 2000 of FIG. 18 or flowchart 2100 of FIG. 19.

Routines 2218 include a communications routine 2222 and wireless terminal control routines 2224. The communications routine 2222 implements the various communications protocols used by the wireless communications device 2200. Wireless terminal control routines 2224 include a transmission request generation module 2226, a transmission decision module 2228, a pilot signal generation module 2230, a transmission control module 2232, a traffic data rate determination module 2236, a traffic acknowledgment monitoring module 2238, and a transmission power control module 2240. Transmission control module 2232 includes, in some embodiments, pilot signal transmission control module 2234.

Data/information 2220 includes peer-peer air link resource recurring structure information 2242, power level relationship information 2244, and a peer to peer traffic data queue 2246. Peer to peer air link resource recurring structure information 2242 includes a plurality of sets of air link resources information pertaining to different traffic segments in the recurring structure (air link resources information pertaining to a $1^{st}$ traffic segment 2248, . . . , air link resources information pertaining to an $n^{th}$ traffic segment 2250). Air link resources information pertaining to a $1^{st}$ traffic segment 2248 includes request resource 1 2252, response resource 1 2254, pilot resource 1 2256, pilot response resource 1 2258, traffic segment 1 2260 and acknowledgment segment 1 2262. Air link resources information pertaining to an $n^{th}$ traffic segment 2250 includes request resource n 2264, response resource n 2266, pilot resource n 2268, pilot response resource n 2270, traffic segment n 2272 and acknowledgment segment n 2274.

Request resource 1 2252 is, e.g., information identifying a segment used to convey a generated transmission request message, the transmission request message conveying a request to use the peer to peer traffic segment identified by traffic segment 1 information 2260. Response resource 1 information 2254 is, e.g., information identifying a segment used to convey a response to a request conveyed in the segment identified by request resource 1 2254. In some embodiments, a communications device sends a RX echo signal using the air link resource identified by response resource 1 2254 when the device desires to convey a grant to the request. In some such embodiments, the communications device refrains from transmitting using the segment identified by response resource 1 2254 if the device does not receive a request directed to itself on request resource 1 2252 or decides not to grant the request.

Pilot resource 1 2256 is, e.g., information identifying a segment used to convey a peer to peer pilot signal, when the transmission decision module 2228 decides that a subsequent traffic signal transmission will occur using the segment identified by traffic segment 1 2260. Pilot response resource 1 2258 is, e.g., information, identifying a segment conveying a response signal to the pilot signal communicated using the resource identified by pilot resource 1 2256. The information conveyed in the segment identified by pilot response resource 1 2258 is used by the traffic data rate determination module 2236 to determine a data rate to be used for traffic signals communicated using the traffic segment identified by traffic segment 1 2260. Traffic segment 1 information 2260 is, e.g., information identifying a peer to peer traffic segment corresponding to the request communicated in request resource 1 2252 and corresponding to the pilot transmitted in pilot resource 1 2256. In some embodiments, the actual data rate used for the traffic signals communicated in traffic segment 1 2260 is communicated with the traffic data signals in the same traffic data segment. Acknowledgement segment 1 information 2262 identifies the acknowledgment segment corresponding to the traffic segment identified by traffic segment 1 information 2260.

Transmission request generation module 2226 generates transmission requests, e.g., a transmission request corresponding to a subsequent traffic transmission interval, said subsequent traffic transmission interval having a fixed time relationship to the transmitted transmission request.

Transmission decision module 2228 determines whether to transmit data during a subsequent traffic transmission interval corresponding to a transmitted transmission request. In some embodiments, the fixed time relationship between the subsequent traffic transmission interval and the transmitted transmission request includes a predetermined offset in time from a point in time during which the transmission request is transmitted and a point in time in said subsequent traffic transmission interval. In some such embodiments the fixed time relationship is different for at least some different transmission requests.

In various embodiments, the transmission decision module 2228 makes a decision whether or not to transmit based on the received signal from at least one other communications device, e.g., a received response signal in response to a request to transmission request from device 2200 or from a different device. In some embodiments, during some times, the transmission request is directed to a first communications device and the received response signal used in making the transmission decision is from the first communications device. In some embodiments during some times, the transmission request is directed to a first communications device and the received response is from a second communications device which is different from the first communications device. In some embodiments, the transmission decision module 2288 makes a decision whether or not to transmit based on received responses to transmission request from multiple communications devices corresponding to same traffic transmission interval, each of the received responses communicating that the request has been granted by the communications device to which the request was directed.

In some embodiments, the fixed time relationship is communicated in the transmission request. In some such embodiments, the transmission request generation module 2226 includes a time relationship module 2227 which encodes time relationship information in a generated transmission request.

Pilot signal generation module 2230 generates a pilot signal when it is determined to transmit traffic during the subsequent traffic transmission interval.

Transmission control module 2232 controls the transmitter module 2204 to transmit the generated pilot signal prior to transmitting traffic in the subsequent traffic transmission interval. In some embodiments, transmission control module 2232 includes pilot signal transmission control module 2234. Pilot signal transmission control module 2234 controls the wireless transmitter module 2204 to transmit a pilot signal using an air link resource for a pilot signal associated with a first traffic transmission interval, e.g., resource identified by 2256, when the transmission decision module 2228 determines to transmit traffic data during the associated first traffic transmission interval, e.g., interval including traffic segment 1 2260, and controls the wireless transmitter module 2204 to refrain from transmitting a pilot signal using an air link resource for a pilot signal associated with the first traffic transmission interval when the transmission decision module 2228 determines to refrain from transmitting traffic data during the associated first traffic transmission interval. Pilot signal transmission control module 2234 controls the wireless transmitter module 2204 to transmit a pilot signal using an air link resource for a pilot signal associated with a second traffic transmission interval, e.g., resource 2270, when the transmission decision module 2228 determines to transmit traffic data during the associated second traffic transmission interval, e.g., interval including traffic segment n 2272, and controls the wireless transmitter module 2204 to refrain from transmitting a pilot signal using an air link resource for a pilot signal associated with the second traffic transmission interval when the transmission decision module 2228 determines to refrain from transmitting traffic data during the associated second traffic transmission interval.

Traffic data rate determination module 2236 determines as a function of a received signal, e.g., a received response signal communicated in response to a peer to peer pilot signal, a data rate to be used when transmitting in a subsequent traffic transmission interval.

Traffic acknowledgement monitoring module 2238 monitors for a data transmission acknowledgment signal in a time interval having a fixed offset to a traffic transmission interval in which wireless communications device 2200 transmitted traffic signals.

Transmission power control module 2240 controls the power levels of the transmission request, the peer to peer pilot signal, and the traffic signals. In some embodiments, the transmission power control module 2240 controls the transmission request to be transmitted at a first power level and the corresponding traffic data to be transmitted at a second power level, said first and second power levels having a first predetermined relationship. Power level relationship information 2244 in data/information 2220 is used by transmission power control module 2240. In various embodiments, the first predetermined relationship specifies that the per tone transmission power of the traffic data be less than or equal to the per tone transmission power of the transmission request signal.

In various embodiments, the transmission power control module 2240 controls the transmission request to be transmitted at a first power level and the pilot to be transmitted at a third power level, said first and third power levels having a second predetermined relationship. In some such embodiments, the second predetermined relationship specifies that the per tone transmission power of the pilot signal be less than or equal to the per tone transmit power of the transmission request.

In some embodiments, the transmission power control module 2240 controls the traffic data to be transmitted at a second power level, said second power level having a third predetermined relationship with the third power level. In some such embodiments, the third predetermined relationship specifies that the second power level has a per tone power which is less than or equal to the per tone power of the third power level.

Figure 21:
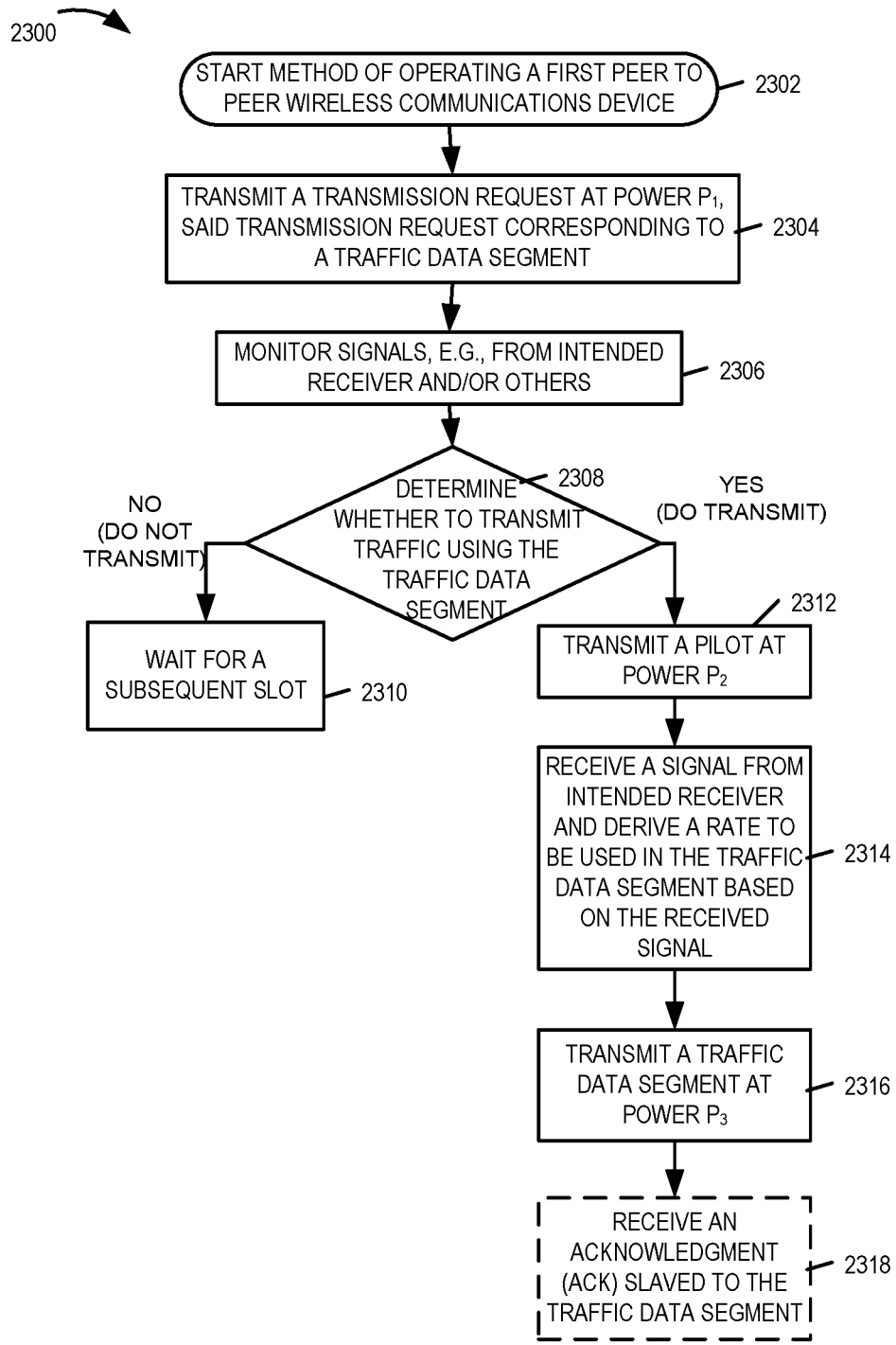
FIG. 21 is a flowchart of an exemplary method of operating a first peer to peer wireless communications device in accordance with various embodiments.

FIG. 21 is a flowchart 2300 of an exemplary method of operating a first peer to peer communications device in accordance with various embodiments. Operation starts in step 2302 where the first peer to peer wireless communications device is powered on and initialized. Operation proceeds from step 2302 to step 2304.

In step 2304, the first device transmits a transmission request at a power $P_1$, said transmission request corresponding to a traffic data segment. In various embodiments, the transmission request is only for the corresponding traffic data segment and is not applicable to other traffic data segments. The transmission request is, e.g., directed to a second peer to peer communications device which is the intended receiver of traffic data signals that the first device would like to transmit using said corresponding traffic data segment. In various embodiments, prior to the first device transmitting the transmission request, the first and second devices have established a peer to peer connection.

Operation proceeds from step 2304 to step 2306. In step 2306, the first device monitors for signals, e.g., from the intended receiver and/or others, e.g., request response positive acknowledgment signals. For example, the first device monitors to detect for signals indicating that an intended receiver or receivers of traffic signals is signaling that, from its perspective, it is ok for the requesting device to transmit traffic data signals using the corresponding traffic data segment. Sometimes such response signals are referred to as RX echo signals. Thus the RX echo can be viewed as a signal indicating that a device is willing to be a receiver.

Operation proceeds from step 2306 to step 2308. In step 2308 the first device determines whether to transmit traffic data using the traffic data segment corresponding to the transmitted request of step 2304. The determination of step 2308 includes using the detected response signals from step 2306. If the determination of step 2308 is not to transmit on the corresponding traffic data segment, then operation proceeds from step 2308 to step 2310, where the first device refrains from transmitting the corresponding traffic data segment and waits for a subsequent slot. Under such a situation, the first device can transmit a request signal corresponding to the traffic data segment for the subsequent slot and repeat the process. However, if the first device determines that it will transmit using the corresponding traffic data segment, then operation proceeds from step 2308 to step 2312.

In step 2312, the first device transmits a pilot at power $P_2$. Operation proceeds from step 2312 to step 2314, in which the first device receives a signal from the intended receiver and derives a rate to be used in the traffic data segment based on the received signal. Then, in step 2316, the first device transmits a traffic data using the corresponding traffic data segment at power $P_3$.

In some embodiments, step 2318 is further performed, in which the first device receives an acknowledgment signal (ACK) corresponding to the transmitted traffic data segment signals, wherein said acknowledgment is slaved to the traffic data segment.

In various embodiments, the power $P_2$ is a function of $P_1$, e.g., $P_2 = f(P_1)$. For example, $P_2 = x\, P_1$, where x is a constant. A device may choose a different value for parameter x depending on the amount and type of the data traffic it intends to transmit in the traffic interval. In some such embodiments, $P_2$ is less than or equal to $P_1$. For example, for a corresponding peer to peer traffic segment transmission request signal and a corresponding peer to peer pilot signal, the pilot signal is transmitted the same or a lower power level than the request signal on average per tone basis. In one exemplary embodiment $P_2=P_1$, e.g., when the device has a first size data packet to transmit, while set $P_2=P_1/10$, e.g., when the device has a second size data packet to transmit, wherein said first size is larger than said second size. In one embodiment, the information about the value of x is signaled in the traffic request sent by the device.

In various embodiments, the power $P_3$ is a function of $P_2$, e.g., $P_3=g(P_2)$. For example, $P_3=y\,P_2$, where y is a fixed constant and the same for each of the devices. In some such embodiments, $P_3$ is less than or equal to $P_2$. For example, for a corresponding peer to peer pilot signal and a corresponding peer to peer traffic signal, the traffic signal is transmitted the same or a lower power level than the pilot signal on average per tone basis. In various embodiments, f and g are predetermined functions.

In some embodiment, the power values of $P_1$, $P_2$, $P_3$ represent the total transmission powers of the corresponding signals (request, pilot, and data traffic). In another embodiment, the power values of $P_1$, $P_2$, $P_3$ represent the per degree of freedom transmission powers of the corresponding signals (request, pilot, and data traffic). In an OFDM system, one degree of freedom can be a tone in an OFDM symbol.

Various aspects of de-centralized control, used in various embodiments, will now be described. Consider that there are two pairs of peer to peer wireless terminals, each pair having a connection. In some embodiments, a pair of wireless terminals having a connection can, and sometimes is, associated with a priority level. In some embodiments, a pair of wireless terminal having a connection and corresponding to a particular traffic flow direction is associated with a priority level. The priority association can be, e.g., randomly selected, using a predetermined scheme, e.g., a round robin scheme, can vary from one traffic slot to another, can be associated with a type of traffic, e.g., voice, best effort, data, etc., can be associated with latency considerations, and/or can be associated with quality of service (QoS) considerations.

Consider that A transmits a transmission request to B (A→B) and C transmits a transmission request to D (C→D), and both transmission request are requests to use the same peer to peer air link traffic segment. Assume that "A→B" has a higher priority than "C→D" according to the implemented priority scheme. Also assume that WTs B and D are able to receive and identity the requests directed to them. Device B, recognizing that the connection flow "A→B" has higher priority than the connection flow "C→D", generates and transmits a positive acknowledgement signal to device A, e.g., an RX echo signal to device A indicating that device B is willing to be a receiver of the traffic from device A for the traffic segment. Now device D, recognizing that the connection flow "C→D" has lower priority than the connection flow "A→B" performs a determination as to whether or not it should send an RX echo signal to device C or whether it should yield the traffic data segment and thus refrain from transmitting a RX echo signal to device C. In one exemplary embodiment the determination by device D includes comparing the ratio of (i) the received request signal from C and (ii) the received request signal from A which represents interference from A, to a criteria, e.g., a predetermined criteria. For example, device D determines whether (signal from C)/(interference from A)>γ, and if the determined ratio is greater than γ, then device D transmits an RX echo to device C; otherwise device D implements RX yielding and does not sent an RX echo signal to device C. An exemplary value of γ is, e.g., 0 dB, −3 dB, or −10 dB. In some such embodiments, a device which does not receive an RX echo to its traffic data transmission request does not participate in a subsequent rate part. For example, assume that device A received an RX echo from device B, but device C did not receive an RX echo from device D, device A goes on to transmit a peer to peer pilot signal to device B, receive a rate information signal from device B and subsequently transmit traffic data signals in the traffic data segment at a rate which is a function of the received rate information signal. However, device C, which did not receive an RX echo from device D, terminates signaling with regard to the traffic segment and does not transmit a peer to peer pilot signal and does not transmit traffic data signals in the traffic data segment.

Figure 22:
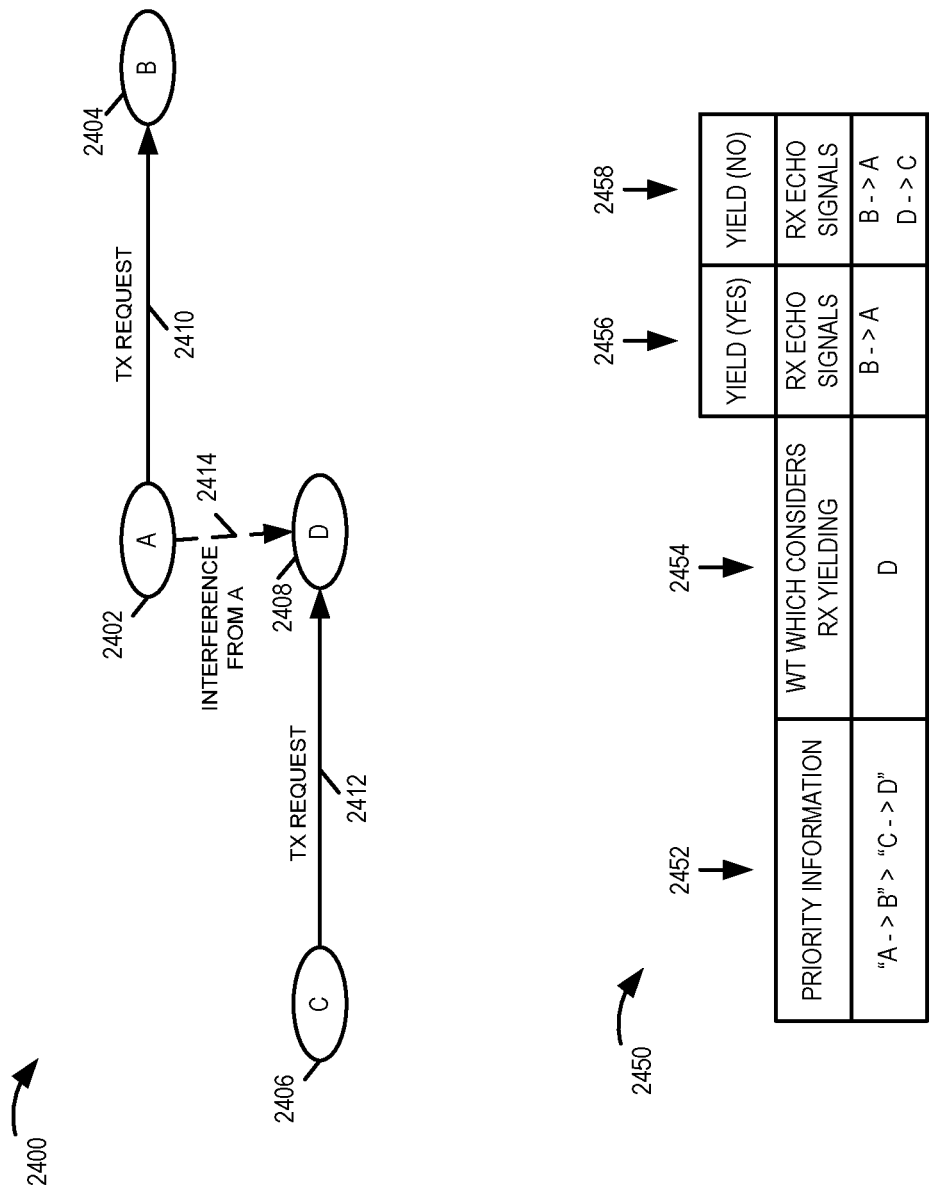
FIG. 22 includes a drawing of two exemplary pairs of connected peer to peer wireless terminals and a corresponding table used for illustrating various features of receiver yielding in accordance with various embodiments.

FIG. 22 includes a drawing 2400 of two exemplary pairs of connected peer to peer wireless terminals and a corresponding table 2450. FIG. 22 illustrates various features of receiver yielding in accordance with various embodiments. In drawing 2400 peer to peer wireless terminal A 2402 and peer to peer wireless terminal B 2404 form a first pair, while peer to peer wireless terminal C 2406 and peer to peer wireless terminal D 2408 form a second pair. Drawing 2400 also illustrates peer to peer traffic transmission request signals (2410, 2412) from WTs (2402, 2406), respectively, intended for WTs (2404, 2408), respectively. The transmission request signal 2410 from WT A 2402 intended for WT B 2404 is considered as an interference signal from the perspective of WT D 2408, and is indicated by dotted line 2414.

Table 2450 includes first column 2452 which indicates priority information, a second column 2454 which indicates which of the wireless terminals consider RX yielding, a third column 2456 which indicates which RX echo signals are transmitted if the WT considering the RX yielding decides to yield, and a fourth column 2458 which indicates which RX echo signals are transmitted if the WT considering RX yielding decides not to yield. In this example, connection for traffic flow "A→B" has higher priority than the connection for traffic flow "C→D". The intended wireless terminal receiver corresponding to the lower priority connection is the wireless terminal which considers RX yielding, which in this case is WT D 2408. WT B 2404, which corresponds to the higher priority connection, transmits an RX echo signal from B to A. WT D 2408, if it determines that it should yield, refrains from transmitting an RX echo signal; however, if it determines not to yield then WT D 2408 transmits an RX echo signal from D to C.

Now consider a situation with where "C→D" has higher priority than "A→B", and consider that from intended receivers perspectives (D, B), it is ok to proceed and both device D and device B have transmitted RX echo signals. Device C recognizes that its connection has the higher priority and proceeds to the rate control operations, e.g., in which it transmits a peer to peer pilot signal. However, device A, which recognizes that its connection has the lower priority, makes a determination as to whether or not it should proceed to the rate control portion or whether it should perform transmission yielding (TX yielding) in which it does not proceed to the rate control and does not transmit a peer to peer pilot signal and will not transmit traffic data signals on the traffic data segment corresponding to the request. In some embodiments, A in its determination as to whether or not to proceed considers its impact on D's SIR if it should proceed. For example, if A and D are very close, e.g., A receives a strong RX echo signal from WT D which is responding to WT C's request, A, in some embodiments, decides not to proceed, since its transmission would seriously degrade recovery by device D of traffic signals from device C.

FIG. 23 includes a drawing 2500 of two exemplary pairs of connected peer to peer wireless terminals and a corresponding table 2550. FIG. 23 illustrates various features of transmitter yielding in accordance with various embodiments. In drawing 2500 peer to peer wireless terminal A 2502 and peer to peer wireless terminal B 2504 form a first pair, while peer to peer wireless terminal C 2506 and peer to peer wireless terminal D 2508 form a second pair. Drawing 2500 also illustrates peer to peer traffic transmission request signals (2510, 2512) from WTs (2502, 2506), respectively, intended for WTs (2504, 2508), respectively. In this example, both WTs (2504, 2508) transmit RX echo signals (2514, 2516), respectively, to WTs (2502, 2506), respectively. The echo signal 2516 from WT D 2508 intended for WT C 2506 is considered as an interference signal from the perspective of WT A 2502, and is indicated by dotted line 2518.

Table 2550 includes first column 2552 which indicates priority information, a second column 2554 which indicates which of the wireless terminals consider TX yielding, a third column 2556 which indicates which peer to peer pilot signals are transmitted if the WT considering the TX yielding decides to yield, and a fourth column 2558 which indicates which peer to peer pilot signals are transmitted if the WT considering TX yielding decides not to yield. In this example, connection for traffic flow "C→D" has higher priority than the connection for traffic flow "A→B". The intended wireless terminal receiver corresponding to the lower priority connection is the wireless terminal which considers TX yielding, which in this case is WT A 2502. WT C 2506, which corresponds to the higher priority connection, transmits a peer to peer pilot signal from C to D. WT A 2502, if it determines that it should yield, refrains from transmitting a peer to peer pilot signal; however, if it determines not to yield then WT A 2502 transmits a peer to peer pilot signal from A to B.

Consider an exemplary embodiment where peer to peer wireless terminals A and B have a connection, and WT A transmits a traffic transmission request signal (TX request) and WT B responds with a receiver echo signal (RX echo); also consider that there is a channel gain h. In one exemplary embodiment, peer to peer wireless terminal A transmits its TX requests at a fixed power level $P_0$.

In some such embodiments, the power level for a TX request is fixed and the same for each of the peer to peer wireless terminals in the system. This universality facilitates comparison of received signals from different wireless terminals.

With respect to the transmission power level of the RX echo signal, two exemplary schemes shall be described. In the first scheme the RX echo from WT B is transmitted at power level $P_0$. In the second scheme the RX echo from WT B is transmitted at a power level which is a function of the transmission power level of the request signal and the channel conditions, e.g., the transmission power level of the RX echo signal=$z/(h*P_0)$, where z is a fixed constant and the same for each of the peer to peer devices, e.g., z=1. Here h represents the channel gain between the transmitter and the intended receiver. Small variations can be added to the above basic idea of inverse power rule. For example, when h is very small, to avoid the transmission power level of the RX echo signal to become infinite, the transmission power level can be set to min($z/(h*P_0)$, $P_{max}$), where $P_{max}$ represents a maximum transmission power level. Alternatively, the transmission power level can be set to $z/(\epsilon h*P_0)$, where $\epsilon$ is a small constant.

Exemplary transmission power scheme 1 is illustrated by FIG. 24 which includes two pairs of connected peer to peer wireless terminals ((WT A 2602, WT B 2604), (WT C 2606, WT D 2608)). There is a channel gain between WT A 2602 and WT B 2604, which is $h_{AB}$ as indicated by box 2618. There is a channel gain between WT C 2606 and WT D 2608, which is $h_{CD}$ as indicated by box 2620. WT A 2602 transmits TX request signal 2610 at power level $P_0$ as indicated by box 2622 to WT B 2604. WT B transmits positive response RX echo signal 2614 at power level $P_0$ as indicated by box 2624 to WT A 2602. WT C 2606 transmits TX request signal 2612 at power level $P_0$ as indicated by box 2626 to WT D 2608. WT D transmits positive response RX echo signal 2616 at power level $P_0$ as indicated by box 2628 to WT C 2606. In some other embodiments, the TX request signals are transmitted at a first fixed predetermined power level and the RX echo signals are transmitted at a second fixed predetermined power level, wherein said first and second levels are different.

Exemplary transmission power scheme 2 is illustrated by FIG. 25 which includes two pairs of connected peer to peer wireless terminals ((WT A 2702, WT B 2704), (WT C 2706, WT D 2708)). There is a channel gain between WT A 2702 and WT B 2704, which is $h_{AB}$ as indicated by box 2718. There is a channel gain between WT C 2706 and WT D 2708, which is $h_{CD}$ as indicated by box 2720. WT A 2702 transmits TX request signal 2710 at power level $P_0$ as indicated by box 2722 to WT B 2704. WT B 2704 transmits positive response RX echo signal 2714 at power level $1/(h_{AB}*P_0)$ as indicated by box 2724 to WT A 2702. WT C 2706 transmits TX request signal 2712 at power level $P_0$ as indicated by box 2726 to WT D 2708. WT D 2708 transmits positive response RX echo signal 2716 at power level $1/(h_{CD}*P_0)$ as indicated by box 2728 to WT C 2706. It should be appreciated that the measured received value of TX signal 2710 by WT B is $h_{AB}*P_0$. WT B 2704 reciprocals this value and obtains $1/(h_{AB}*P_0)$, which is the setting for the transmit level of the RX echo signal 2714. It should also be appreciated that the measured received value of TX signal 2712 by WT D is $h_{CD}*P_0$. WT D 2708 reciprocals this value and obtains $1/(h_{CD}*P_0)$, which is the setting for the transmit level of the RX echo signal 2716. This approach communicates channel condition information in the RX echo signal and is advantageous in determining anticipated signal interference information.

Figure 26:
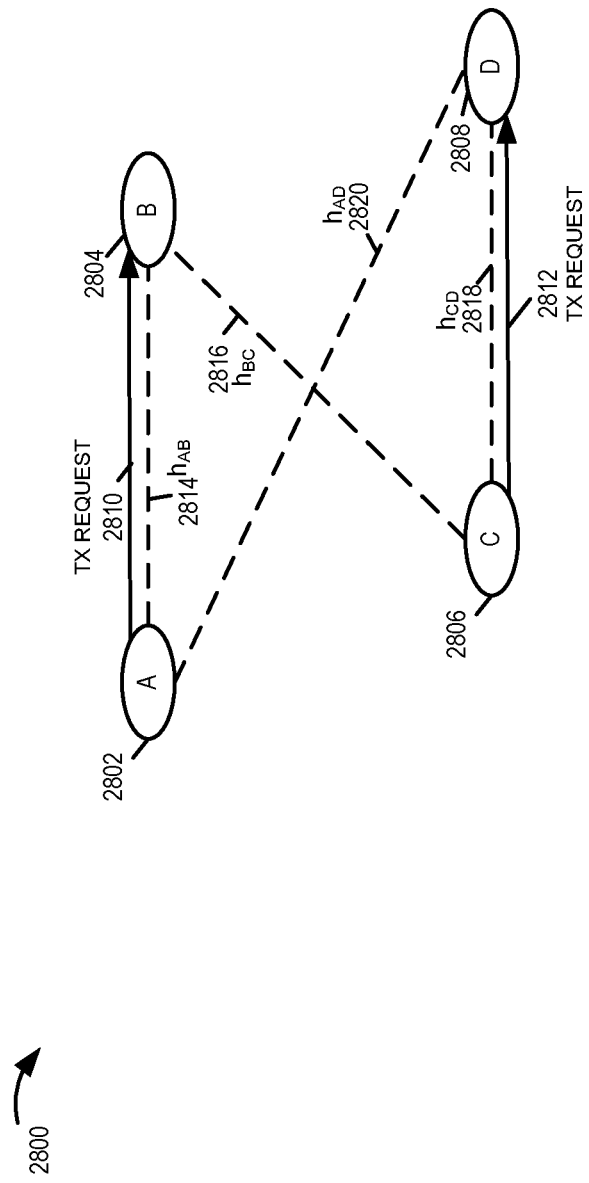
FIG. 26 illustrates exemplary peer to peer wireless terminals, peer to peer traffic transmission request signals, and channel gains, and is used in describing features of various embodiments, e.g., in regard to interference determinations.

Drawing 2800 of FIG. 26 illustrates four exemplary peer to peer wireless terminals (WT A 2802, WT B 2804, WT C 2806, WT D 2808) and channel gains between the wireless terminals. Channel gain ($h_{AB}$ 2814, $h_{BC}$ 2816, $h_{CD}$ 2818, $h_{AD}$ 2820) corresponds to WT pairs ((A/B, B/C, C/D, A/D) respectively. Drawing 2800 also illustrates exemplary TX request signal 2810 from A to B and exemplary TX request signal 2812 from C to D. RX echo signals may be transmitted as a function of priority information, received signal power information, and RX yielding determinations.

Now consider two pairs of WTs ((A,B), (C,D)), and assume that A has transmitted an TX request signal to B, and C has transmitted a TX request signal to D, and the "C→D" traffic signaling flow has priority over the "A→B" traffic signaling flow. Therefore, WT B makes a determination as to whether it should authorize proceeding to rate control, e.g., transmit an RX echo signal, or should implement RX yielding. In one exemplary embodiments B determines if (signal power/interference power) is greater than a value γ. If the ratio is greater than γ, then WT B notifies that from its perspective operation can proceed with rate control and thus it transmits an RX echo signal to A; otherwise it performs RX yielding and refrains from transmitting an RX echo signal. In one exemplary embodiment, where each of the traffic transmission requests are at the same fixed power level $P_0$, the determination equation used by WT B checks if (measured received power/measured interference power) is >γ. An exemplary value of γ is, e.g., 0 dB, −3 dB, or −10 dB. Measured received power is, e.g., $P_0*h_{AB}$, and measured interference power is, e.g., $P_0*h_{BC}$, where $P_0$ is the transmit power level used for requests, $h_{AB}$ is channel gain between A and B and $h_{BC}$ is the channel gain between B and C.

Now consider scheme 1 in which a fixed power level, e.g., power level $P_0$ is used for RX echo signals, and assume that both WTs B and D transmit RX echo signals. Again consider that the "A→B" connection is considered the lower priority, so WT A considers whether it should proceed to rate control or perform TX yielding. At WT A the RX echo from WT B is received as $P_0*h_{AB}$, and the RX echo signal from WT D is received as $P_0*h_{AD}$, where $h_{AB}$ represents channel gain between A and B, and $h_{AD}$ represents channel gain between A and D. $P_0*h_{AD}$ represents the interference caused by WT A to WT D; however, WT A has no idea of the SIR at WT D.

Alternatively, consider the second approach in which RX echo signals are transmitted at power levels which are a function of channel conditions. In one exemplary embodiment, B transmits its RX echo signal at power level $1/(P_0*h_{AB})$ and D transmits its RX echo signal at power level $1/(P_0*h_{CD})$. Assume that both WTs B and D transmit RX echo signals. Again consider that the "A→B" connection is considered the lower priority, so WT A considers whether it should proceed to rate control or perform TX yielding. At WT A the RX echo from WT B is received as $h_{AB}/(P_0*h_{AB})=1/P_0$, and the RX echo signal from WT D is received as $h_{AD}*(1/(P_0*h_{CD}))=(h_{CD}/h_{AD})*(1/P_0)$, where $h_{AB}$ represents channel gain between A and B, $h_{AD}$ represents channel gain between A and D, and $h_{CD}$ represents the channel gain between C and D. WT A can multiply the received power of the RX echo signal $(h_{CD}/h_{AD})(1/P_0)$ and its own intended transmission power $P_0$, and get $(h_{CD}/h_{AD})*(1/P_0)*P_0=(h_{CD}/h_{AD})$. Note that the ratio $(h_{CD}/h_{AD})$ is a measure of SIR at wireless terminal D. The received power of the RX echo signal from D at WT A represents the SIR of D if A proceeds. Thus, when this approach is utilized WT B advantageously is knowledgeable of estimated SIR information at WT D and can make an informed decision as to whether or not it should continue on with the rate portion and transmit a pilot signal, or whether it should perform TX yielding and refrain from signaling a pilot and refrain from signaling traffic data in this slot. In exemplary embodiment, WT A proceeds with the rate portion if $h_{AD}/h_{CD}<\alpha$, otherwise WT A performs TX yielding. An exemplary value of α is, e.g., 0 dB, 3 dB, 5 dB or 10 dB.

FIG. 27 is a drawing 2900 illustrating features of some embodiments in which a plurality of peer to peer transmission requests are associated with the same peer to peer traffic air link resource, e.g., same peer to peer traffic segment. Drawing 2900 plots frequency on the vertical axis 2902 vs time on the horizontal axis 2904. Corresponding to a first slot, a plurality of transmission requests can be, and sometimes are transmitted. In this example, the transmission request resources (TX request for $1^{st}$ WT for slot 1 2906, . . . , TX request for Nth WT for slot 1 2908) are associated with the peer to peer traffic resource for slot 1 2910, as indicated by arrows (2912, . . . , 2914). In this example, there is a fixed time relationship 2916 between the start of TX request segments (2906, . . . 2908) and the start of corresponding peer to peer traffic segment 2910. Corresponding to a second slot, a plurality of transmission requests can be, and sometimes are transmitted. In this example, the transmission request resources (TX request for $1^{st}$ WT for slot 2 2918, . . . , TX request for Nth WT for slot 2 2920) are associated with the peer to peer traffic resource for slot 2 2922, as indicated by arrows (2924, . . . , 2926). In this example, there is a fixed time relationship 2928 between the start of TX request segments (2918, . . . 2920) and the start of corresponding peer to peer traffic segment 2922.

FIG. 28 is a drawing 3000 illustrating features of some embodiments in which a plurality of peer to peer transmission requests are associated with the same peer to peer traffic air link resource, e.g., same peer to peer traffic segment. Drawing 3000 plots frequency on the vertical axis 3002 vs time on the horizontal axis 3004. Corresponding to a first slot, a plurality of transmission requests can be, and sometimes are transmitted. In this example, the transmission request resources (TX request for $1^{st}$ WT for slot 1 3006, TX request for 2nd WT for slot 1 3008, TX request for $3^{rd}$ WT for slot 1 3010) are associated with the peer to peer traffic resource for slot 1 3012, as indicated by arrows (3014, 3016, 3018). Corresponding to a second slot, a plurality of transmission requests can be, and sometimes are transmitted. In this example, the transmission request resources (TX request for 1st WT for slot 2 3020, TX request for 2nd WT for slot 2 3022, TX request for $3^{rd}$ WT for slot 2 3024) are associated with the peer to peer traffic resource for slot 2 3026, as indicated by arrows (3028, 3030, 3032).

Figure 29:
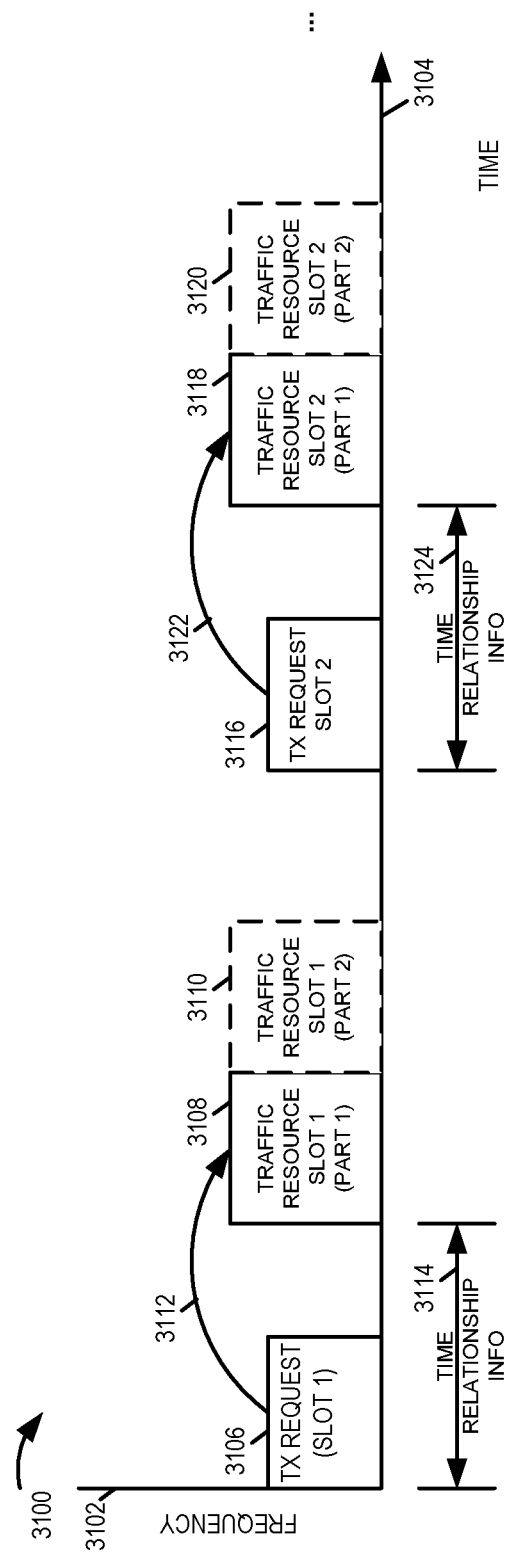
FIG. 29 is a drawing illustrating various features used in some embodiments including timing relationships and variable size traffic segments.

FIG. 29 is a drawing 3100 illustrating various features used in some embodiments. Drawing 3100 plots frequency on the vertical axis 3102 vs time on the horizontal axis 3104. Corresponding to a first slot, there is a TX request 3106 and corresponding traffic resources (3108, 3110), as indicated by arrow 3112. In some embodiments, traffic resources associated with a request can be different size. The traffic resource associated with TX request 1 3106 can include traffic resource slot 1 part 1 3108 and not traffic resource slot 1 part 2 3110 or the traffic resource associated with TX request 1 3106 can include both traffic resource slot 1 part 1 3108 and traffic resource slot 1 part 2 3110. In some embodiments, the request signal conveys information identifying the size of the requested traffic resource for peer to peer traffic data signals. There is a timing relationship between the request and the associated traffic resources as indicated by arrow 3114. In some embodiments, the timing relationship is fixed and predetermined. In some embodiments, the timing relationship information is conveyed in the TX request signal 3106.

Corresponding to a second slot, there is a TX request 3116 and corresponding traffic resources (3118, 3120), as indicated by arrow 3122. In some embodiments, traffic resources associated with a request can be different size. The traffic resource associated with TX request 2 3116 can include traffic resource slot 2 part 1 3118 and not traffic resource slot 2 part 2 3120 or the traffic resource associated with TX request 2 3116 can include both traffic resource slot 1 part 1 3118 and traffic resource slot 1 part 2 3120. In some embodiments, the request signal conveys information identifying the size of the requested traffic resource for peer to peer traffic data signals. There is a timing relationship between the request and the associated traffic resources as indicated by arrow 3124. In some embodiments, the timing relationship is fixed and predetermined. In some embodiments, the timing relationship information is conveyed in the TX request signal 3116.

While described in the context of an OFDM system, the methods and apparatus of various embodiments are applicable to a wide range of communications systems including many non-OFDM and/or non-cellular systems. Some exemplary systems include a mixture of technologies utilized in the peer to peer signaling, e.g., some OFDM type signals and some CDMA type signals.

In various embodiments nodes described herein are implemented using one or more modules to perform the steps corresponding to one or more methods, for example, transmitting a peer to peer pilot signal, receiving a rate information signal, transmitting peer to peer traffic data, receiving a peer to peer pilot signal, transmitting a rate information signal, receiving peer to peer traffic data, monitoring for transmission requests for peer to peer traffic segments, determining whether or not to transmit a response signal, transmitting a transmission request for a peer to peer traffic segment, monitoring for response signals, determining whether or not to proceed to rate scheduling, measuring received power levels, setting power levels of response signals, evaluating signal interference, determining priority information, using determined priority information in yielding determinations regarding peer to peer traffic transmission air link resources, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a first communication device, comprising:
    monitoring to receive transmission requests during a monitoring period;
    receiving, from a second communication device, a first transmit request for transmitting from the second communication device to the first communication device using a peer to peer air link traffic segment;
    receiving, from a third communication device, a second transmit request for transmitting from the third communication device to a fourth communication device using the peer to peer air link traffic segment;
    determining a priority of the first transmit request and a priority of the second transmit request;
    determining a communication device priority using the priority of the first transmit request and the priority of the second transmit request; and
    determining whether to send a receive echo signal from the first communication device to the second communication device based on the communication device priority.

2. The method of claim 1 further comprising comparing a received power of the first transmit request with a received power of the second transmit request and determining whether to transmit a receive echo signal from the first communication device to the second communication device based on the comparison.

3. The method of claim 1 wherein the first communication device transmits an echo signal if the first communication device has a higher priority than the third communication device.

4. The method of claim 1 wherein the receive echo signal is transmitted at a power that is a function of channel conditions.

5. The method of claim 1 wherein the receive echo is transmitted at a fixed predetermined power level.

6. The method of claim 1, wherein there is a predetermined relationship between the monitoring period and a corresponding traffic interval.

7. The method of claim 1, wherein the first monitoring period is a peer discovery period.

8. A first peer to peer communication device comprising:
    a receiver configured to receive transmission requests during a monitoring period;
    a processing module for processing a first transmit request for transmitting from a second communication device to the first communication device using a peer to peer air link traffic segment, and a second transmit request for transmitting from a third communication device to a fourth communication device using the peer to peer air link traffic segment, for determining a priority of the first transmit request and a priority of the second transmit request, and for determining a communication device priority using the priority of the first transmit request and the priority of the second transmit request; and a transmitter for transmitting a receive echo signal from the first communication device to the second communication device based on the communication device priority.

9. The method of claim 8 wherein the processing module is configured to compare a received power of the first transmit request with a received power of the second transmit request and determine whether to transmit a receive echo signal from the first communication device to the second communication device based on the comparison.

10. The method of claim 8 wherein the first communication device transmits an echo signal if the first communication device has a higher priority than the third communication device.

11. The method of claim 8 wherein the receive echo signal is transmitted at a power that is a function of channel conditions.

12. The method of claim 8 wherein the receive echo is transmitted at a fixed predetermined power level.

13. The method of claim 8, wherein there is a predetermined relationship between the monitoring period and a corresponding traffic interval.

14. A first peer to peer communication device comprising:
means for receiving transmission requests during a monitoring period;
means for processing a first transmit request for transmitting from a second communication device to the first communication device using a peer to peer air link traffic segment, and a second transmit request for transmitting from a third communication device to a fourth communication device using the peer to peer air link traffic segment;
means for determining a priority of the first transmit request and a priority of the second transmit request;
means for determining a communication device priority using the priority of the first transmit request and the priority of the second transmit request; and
means for transmitting a receive echo signal from the first communication device to the second communication device based on the communication device priority.

15. The method of claim 14 wherein the means for processing is configured to compare a received power of the first transmit request with a received power of the second transmit request and determine whether to transmit a receive echo signal from the first communication device to the second communication device based on the comparison.

16. The method of claim 14 wherein the first communication device transmits an echo signal if the first communication device has a higher priority than the third communication device.

17. The method of claim 14 wherein the receive echo signal is transmitted at a power that is a function of channel conditions.

18. A non-transitory computer readable medium having instructions for:
monitoring for receive transmission requests during a monitoring period;
processing a first transmit request for transmitting from a second communication device to a first communication device using a peer to peer air link traffic segment;
processing a second transmit request for transmitting from a third communication device to a fourth communication device using the peer to peer air link traffic segment;
determining a priority of the first transmit request and a priority of the second transmit request;
determining a communication device priority using the priority of the first transmit request and the priority of the second transmit request; and
determining whether to send a receive echo signal from the first communication device to the second communication device based on the communication device priority.

19. The non-transitory computer readable medium of claim 18, further comprising instructions for comparing a received power of the first transmit request with a received power of the second transmit request and determining whether to transmit a receive echo signal from the first communication device to the second communication device based on the comparison.

* * * * *